US00RE43763E

(19) United States
(12) Reissued Patent
Hoshino et al.

(10) Patent Number: US RE43,763 E
(45) Date of Reissued Patent: *Oct. 23, 2012

(54) IMAGE FORMING APPARATUS

(75) Inventors: Naoki Hoshino, Ageo (JP); Yuko Kimoto, Yokohama (JP)

(73) Assignees: Kabushiki Kaisha Toshiba, Tokyo (JP); Toshiba Tec Kabushiki Kaisha, Tokyo (JP)

( * ) Notice: This patent is subject to a terminal disclaimer.

(21) Appl. No.: 12/567,512

(22) Filed: Sep. 25, 2009

Related U.S. Patent Documents

Reissue of:
(64) Patent No.: 7,546,055
Issued: Jun. 9, 2009
Appl. No.: 11/373,011
Filed: Mar. 9, 2006

(51) Int. Cl.
*G03G 15/00* (2006.01)

(52) U.S. Cl. ..... 399/81; 399/382

(58) Field of Classification Search ..... 399/81, 399/382, 80
See application file for complete search history.

(56) References Cited

U.S. PATENT DOCUMENTS

| | | | | |
|---|---|---|---|---|
| 6,442,368 | B1 * | 8/2002 | Ohtsuka et al. | 399/382 |
| 6,751,426 | B2 * | 6/2004 | Akiba et al. | 399/82 |
| 7,512,354 | B2 * | 3/2009 | Hoshino et al. | 399/81 |
| 7,532,837 | B2 * | 5/2009 | Kimoto et al. | 399/81 |
| 7,539,433 | B2 * | 5/2009 | Hoshino et al. | 399/81 |
| 7,747,185 | B2 * | 6/2010 | Kimoto et al. | 399/81 |
| 7,782,497 | B2 * | 8/2010 | Kimoto et al. | |
| 8,174,727 | B2 * | 5/2012 | Hoshino et al. | 399/81 |
| 2004/0046797 | A1 * | 3/2004 | Perry | |
| 2006/0110177 | A1 * | 5/2006 | Ushio et al. | 399/81 |
| 2007/0211264 | A1 * | 9/2007 | Hoshino et al. | |

FOREIGN PATENT DOCUMENTS

JP 2003091390 A * 3/2003

OTHER PUBLICATIONS

Hoshino, Naoki, Pending U.S. Appl. No. 11/373,645, filed Mar. 9, 2006.
Kimoto, Yuko, Pending U.S. Appl. No. 11/373,000, filed Mar. 9, 2006.
Hoshino, Naoki, Pending U.S. Appl. No. 11/373,403, filed Mar. 9, 2006.
Kimoto, Yuko Pending U.S. Appl. No. 11/373,799, filed Mar. 9, 2006.

(Continued)

*Primary Examiner* — Susan Lee
(74) *Attorney, Agent, or Firm* — SoCal IP Law Group LLP; Steven C. Sereboff; John E. Gunther

(57) ABSTRACT

An operation device displays, in a display unit, an input screen to input setting information on an insertion sheet designated by a user, and sets the insertion sheet based on contents input in the input screen of an insertion sheet setting displayed in the display unit, in a case where a specific sheet designated by the user is set to be inserted as the insertion sheet in a mode to print a plurality of pages of images onto a plurality of sheets, and the operation device further displays, in the display unit, a check screen which displays set contents of the insertion sheet set by a setting unit, in a case where the input of the setting information on the insertion sheet by the user ends in the input screen.

54 Claims, 28 Drawing Sheets

OTHER PUBLICATIONS

Hoshino, Naoki Pending U.S. Appl. No. 11/373,013, filed Mar. 9, 2006.

Hoshino, Naoki, Pending U.S. Appl. No. 11/373,395, filed Mar. 9, 2006.

Kimoto Yuko, Pending U.S. Appl. No. 11/373,012, filed Mar. 9, 2006.

* cited by examiner

IMAGE FORMING APPARATUS

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,546,055. The reissue applications are application Ser. No. 12/567,512 (the present application—a reissue of U.S. Pat. No. 7,546,055) and application Ser. No. 12/642,608 (a continuation reissue of application Ser. No. 12/567,512).*

BACKGROUND OF THE INVENTION

1. Field of the Invention

The present invention relates to an operation device for a user to set photocopy processing, and an image forming apparatus which performs photocopy processing based on user's designated setting of the photocopy processing.

2. Description of the Related Art

Heretofore, an image forming apparatus such as a photocopier is provided with an operation panel to perform various settings. However, in the conventional operation panel, an operation for setting predetermined photocopy processing is complicated or is not easy to understand. Therefore, in the image forming apparatus provided with the operation panel, it is difficult to set the desired photocopy processing, and a result of the photocopy processing becomes different from that intended by a user in many cases.

Especially, in a case where an insertion sheet is inserted with respect to a plurality of sheets (photocopy result) (i.e., in a case where the insertion sheet is set), a user has to instruct various settings concerning the insertion sheet. However, in the conventional photocopier, the setting of the insertion sheet is complicated, particulars which can be designated by the user are limited, set contents of the set insertion sheet cannot be easily confirmed, and another setting cannot be changed after the insertion sheet is set in many cases. Therefore, in an operation device for use in the conventional photocopier, it is difficult to securely set the insertion sheet as intended by the user.

BRIEF SUMMARY OF THE INVENTION

In an aspect of the present invention, an object is to provide an operation device and an image forming apparatus in which operability in setting photocopy processing has been improved.

An image forming apparatus of one aspect of the present invention has: a printer which prints an image on an image forming medium; a display unit which displays a setting screen of print processing to print, on the image forming medium by the printer, an image of a draft including a plurality of pages; an operation unit to input setting information on the print processing in a state in which the setting screen is displayed in the display unit; a first display control unit to display, in the display unit, an input screen which inputs setting information on an insertion sheet designated by a user in the operation unit; a setting unit which sets the insertion sheet based on contents input in the input screen of an insertion sheet setting displayed in the display unit by the first display control unit; and a second display control unit to display, in the display unit, a check screen which displays set contents of the insertion sheet set by the setting unit, in a case where the input of the setting information on the insertion sheet by the user ends in the input screen.

In another aspect of the present invention, a method of setting an image forming apparatus is a method of setting an image forming apparatus having: a printer which prints an image on an image forming medium; a display unit which displays a setting screen of print processing to print, on the image forming medium by the printer, an image of a draft including a plurality of pages; and an operation unit to input setting information on the print processing in a state in which the setting screen is displayed in the display unit, the method comprising: displaying, in the display unit, an input screen which inputs setting information on an insertion sheet designated by a user in the operation unit; setting the insertion sheet based on contents input in the input screen of an insertion sheet setting displayed in the display unit; and displaying, in the display unit, a check screen which displays set contents of the set insertion sheet, in a case where the input of the setting information on the insertion sheet by the user ends in the input screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

Figure 1:
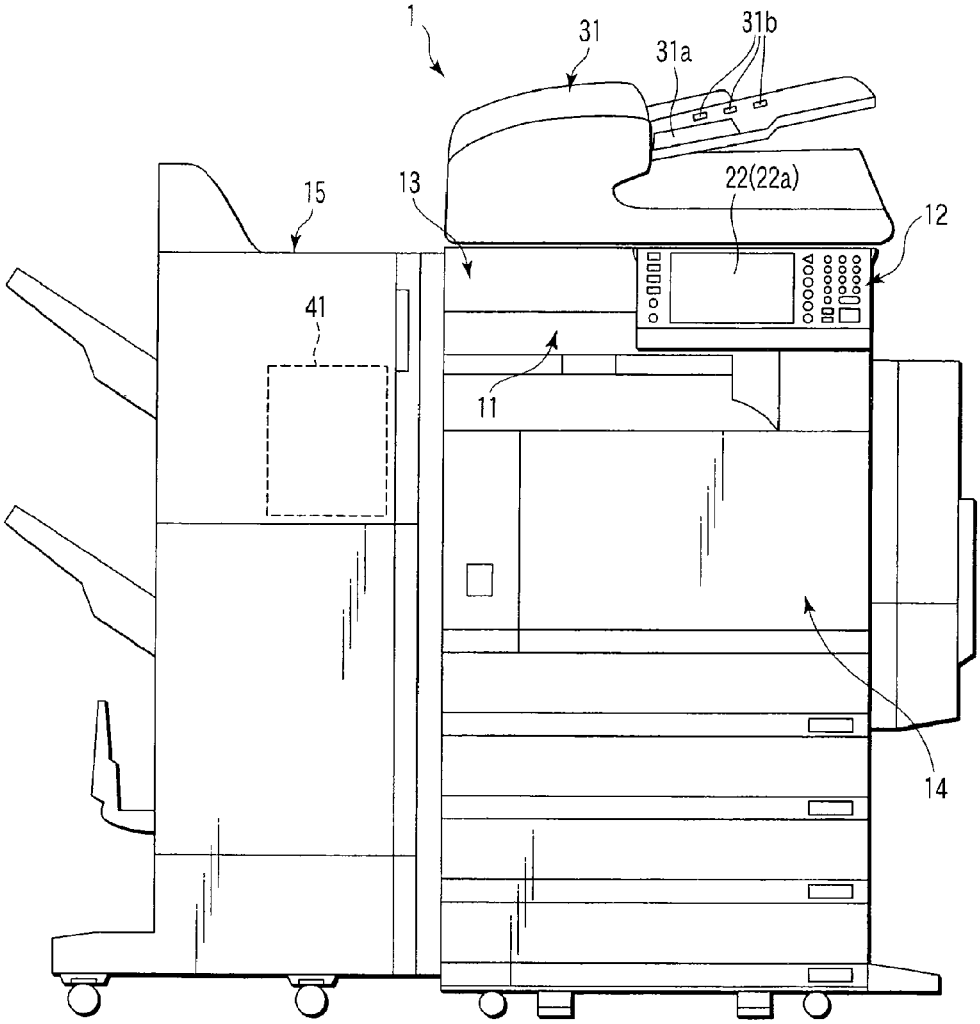
FIG. 1 is a diagram showing an appearance constitution of a digital multifunctional photocopier 1 as an image forming apparatus in an embodiment of the present invention.

FIG. 1 is a diagram showing an appearance constitution of a digital multifunctional photocopier 1 as an image forming apparatus in the embodiment of the present invention.

As shown in FIG. 1, this digital multifunctional photocopier 1 is constituted of a system control unit 11, an operation panel 12, a scanner unit 13, a printer unit 14, a finisher unit 15 and the like.

The system control unit 11 controls the whole digital multifunctional photocopier 1. The system control unit 11 is disposed in a main body of the digital multifunctional photocopier 1. The system control unit 11 is connected to the operation panel 12, the scanner unit 13, the printer unit 14, the finisher unit 15 and the like. Accordingly, the system control unit 11 performs various controls with respect to the respective units.

The operation panel 12 is disposed on a front surface of the digital multifunctional photocopier main body. The operation panel 12 is a user interface. An operation surface of the operation panel 12 is provided with hardware keys 21 as an operating section, a display section 22 in which a touch panel 22a is built and the like.

The scanner unit 13 functions as an image reading unit which reads an image of a draft. The scanner unit 13 is disposed in an upper part of the digital multifunctional photocopier main body. The scanner unit 13 main body is constituted of: a scanning section (not shown) which optically scans a draft surface; a photoelectric converting section (not shown) such as a CCD line sensor which converts, into an electric signal, light reflected by the draft surface optically scanned by the scanning section and the like.

Moreover, the scanner unit 13 has an auto document feeder (ADF) 31. The ADF 31 conveys the surface of the draft to be read to an image reading position of the scanner unit 13 main body. That is, the image of the draft conveyed by the ADF 31 is read by the scanner unit 13 main body. The ADF 31 has: a draft table on which the draft is to be set; a conveying mechanism which conveys the drafts set on the draft table one by one; and a draft discharge section to which the draft conveyed by the conveying mechanism is discharged. The draft table of the ADF 31 is provided with a guide section 31a which guides the conveyed drafts and a plurality of sensors 31b for detecting a size of the draft. The guide section 31a and each sensor 31b function as a detector for detecting the size of the draft on the draft table.

The printer unit 14 forms an image on a sheet (photocopy sheet) as an image forming medium. The printer unit 14 is constituted of, for example, a conveying section which conveys the sheet, an image forming section which forms an image on the sheet conveyed by the conveying section and the like.

The finisher unit 15 performs various types of finish processing with respect to the sheet as the image forming medium printed by the printer unit 14. The finisher unit 15 has finishing functions such as: a stapling function of stapling together a plurality of sheets printed by the printer unit 14; a sorting function of sorting the sheets printed by the printer unit 14 based on a set sorting method; and a stacking function of discharging the sheet printed by the printer unit 14 based on a set sheet discharging order or a set sheet discharging method. The finisher unit 15 has finishing functions realized by a control similar to that of the stapling function, such as: a hole punching function of making a hole in a predetermined position in the sheet printed by the printer unit 14; and a saddle stitching function of folding back a plurality of sheets printed by the printer unit 14 along the center line of each sheet to staple together the sheets.

The finisher unit 15 has a stapler 41 or the like as a mechanism for performing the stapling function. For example, the stapler 41 staples together the plurality of sheets sorted by the sorting function. The stapler 41 has a function of stapling together the sheets by multi-positions thereof. Therefore, the stapling function staples together the positions to be stapled, selected by the user, with respect to the plurality of sheets sorted by the sorting function.

Figure 2:
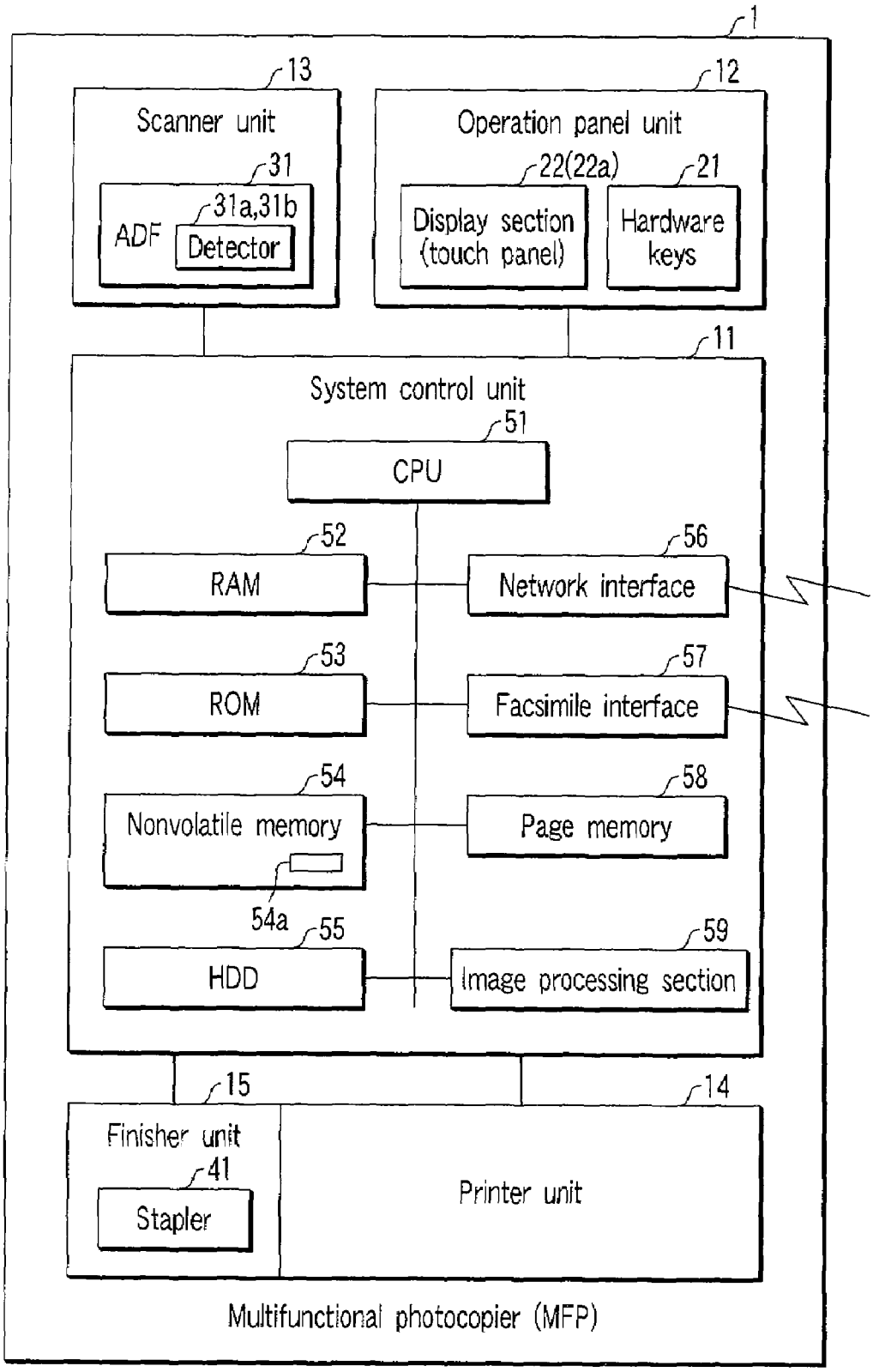
FIG. 2 is a block diagram showing a constitution of a control system of the digital multifunctional photocopier 1 as the image forming apparatus in the embodiment of the present invention.

FIG. 2 is a block diagram showing a constitution of a control system of the digital multifunctional photocopier 1 as an image forming apparatus in the embodiment of the present invention.

As shown in FIG. 2, in this digital multifunctional photocopier 1, the system control unit 11 is connected to the operation panel 12, the scanner unit 13, the printer unit 14, and the finisher unit 15.

The system control unit 11 controls the operation panel 12, the scanner unit 13, the printer unit 14, the finisher unit 15 and the like. The system control unit 11 has various functions of performing various types of processing based on signals supplied from the operation panel 12, the scanner unit 13, the printer unit 14 and the finisher unit 15.

The operation panel 12 has the hardware keys 21, the display section 22 in which the touch panel 22a is built and the like. In the display section 22, there are displayed an operation guidance, keys (icons) selectable by the touch panel 22a and the like under a display control of the system control unit 11. In the operation panel 12, the user operates the hardware keys 21, or inputs the icon selectable by the touch panel 22a. The operation panel 12 supplies, to the system control unit 11, information input by the user (the information indicating the hardware key 21 pressed by the user or the icon selectable by the touch panel 22a touched by the user).

The scanner unit 13 converts the image of the draft into image data under the control of the system control unit 11. The scanner unit 13 converts the draft image into color or monochromatic digital image data. The scanner unit 13 supplies the digital image data as the read draft image to the system control unit 11.

Moreover, the scanner unit 13 has the ADF 31 provided with the detectors 31a, 31b. Detection signals of the detectors 31a, 31b of the ADF 31 are supplied to the system control unit 11. The system control unit 11 realizes an ADF draft size detecting function of detecting a size of the draft set in the ADF 31 based on the detection signals of the detectors 31a, 31b.

The printer unit 14 prints the image on the sheet as the image forming medium under the control of the system control unit 11. A result of the print processing performed by the printer unit 14 and the like are notified to the system control unit 11. The printer unit 14 performs color printing to form a color image on the image forming medium based on the color image data, or monochromatic printing to form a monochromatic image on the image forming medium based on the monochromatic image data. The printer unit 14 is constituted of: for example, the conveying section (not shown) which conveys the image forming medium; the image forming section (not shown) which forms the color image or the monochromatic image on the image forming medium conveyed by the conveying section and the like.

The finisher unit 15 performs various types of processing with respect to the sheet as the image forming medium printed by the printer unit 14 under the control of the system control unit 11. The processing result and the like of the finisher unit 15 are notified to the system control unit 11. The finisher unit 15 executes a finishing function such as the stapling function, the sorting function, or the stacking function based on the control by the system control unit 11.

Moreover, as shown in FIG. 1, the system control unit 11 is constituted of: a central processing unit (CPU) 51; a random access memory (RAM) 52; a read only memory (ROM) 53; a nonvolatile memory 54; a hard disk drive (HDD) 55; a network interface (I/F) 56; a facsimile interface (I/F) 57; a page memory 58; an image processing section 59 and the like.

The CPU 51 controls the whole system control unit 11. The CPU 51 executes a program stored in the ROM 53, the nonvolatile memory 54 or the HDD 55 to thereby perform various types of processing. For example, the CPU 51 executes the control program to thereby realize the ADF draft size detecting function. A display control of the display section 22 of the operation panel 12 is executed by the CPU 51 based on the program and control data stored in the ROM 53, the nonvolatile memory 54, or the HDD 55.

The RAM 52 is a memory which temporarily stores data for working or which stores data to be referred to. The RAM 52 is used as a main memory for executing various types of processing based on various control programs. In the RAM 52, there is held information indicating various set contents during an operation of the digital multifunctional photocopier. For example, the information indicating the set contents of the photocopy processing is also held by the RAM 52.

It is to be noted that the set contents of the photocopy processing include set particulars such as a photocopy magnification, the number of sheets to be photocopied and a finishing mode (position to be stapled, etc.) in addition to a draft setting and a sheet setting. The draft setting includes a size of a draft, a draft setting direction, a direction of the image in the draft, the surface of the draft to be read (a draft reading mode is single-sided or double-sided) and the like. The sheet setting includes a size of the sheet, a direction of the sheet, a direction of the image in the sheet, the surface of the sheet to be printed (a sheet printing mode is single-sided or double-sided) and the like.

The ROM 53 is a nonvolatile memory. In the ROM 53, there are stored, for example, a control program, control data and the like for controlling the digital multifunctional photocopier 1. In the ROM 53, there may be stored display data and the like to be displayed in the display section 22 of the operation panel 12.

The nonvolatile memory 54 is a rewritable nonvolatile memory. In the nonvolatile memory 54, there is stored data such as system setting information. The nonvolatile memory 54 may store display data and the like to be displayed in the display section 22 of the operation panel 12.

Moreover, the nonvolatile memory 54 is provided with a default setting storage section 54a. In the default setting storage section 54a, there are stored default setting information on setting particulars of photocopy processing. It is to be noted that the default setting storage section 54a may be disposed in a nonvolatile memory such as the HDD 55.

The HDD 55 is a large-capacity storage device. In the HDD 55, there are stored various data such as various setting data, management data, control program and control data. In the HDD 55, there are also stored display data and the like to be displayed in the display section 22 of the operation panel 12. In the HDD 55, there are also stored image data and the like read by the scanner unit 13. Furthermore, the HDD 55 may be used as a backup memory for various memories.

The network interface 56 performs data communication via the network. The network interface 56 is constituted of, for example, a network interface card (NIC) and the like. The digital multifunctional photocopier 1 realizes a network printing function of printing, on the sheet, print data from an external device connected to the network interface 56 via the network.

The facsimile interface 57 transmits and receives facsimile data. In the digital multifunctional photocopier 1, a facsimile function is realized using the facsimile interface 57. For example, facsimile reception processing is realized by monochromatically printing, by the printer unit 14, the facsimile data received by the facsimile interface 57. Moreover, the facsimile interface 57 realizes facsimile transmission processing by transferring, to a destination, the facsimile data converted from the image data of the draft read by the scanner unit 13.

The page memory 58 is a memory in which the image data to be printed by the printer unit 14 and the like are stored. The page memory 58 is controlled by a page memory controller (not shown). For example, in a case where the printer unit 14 performs the print processing, in the page memory 58 there is developed (stored) the color image data or the monochromatic image data of each page to be printed by the printer unit 14.

The image processing section 59 subjects the image data to various types of image processing. The image processing section 59 is constituted of an image processing circuit and the like. The image processing section 59 performs image processing such as correction, compression, or extension of the image data.

Next, there will be described a constitution of the operation panel 12.

Figure 3:
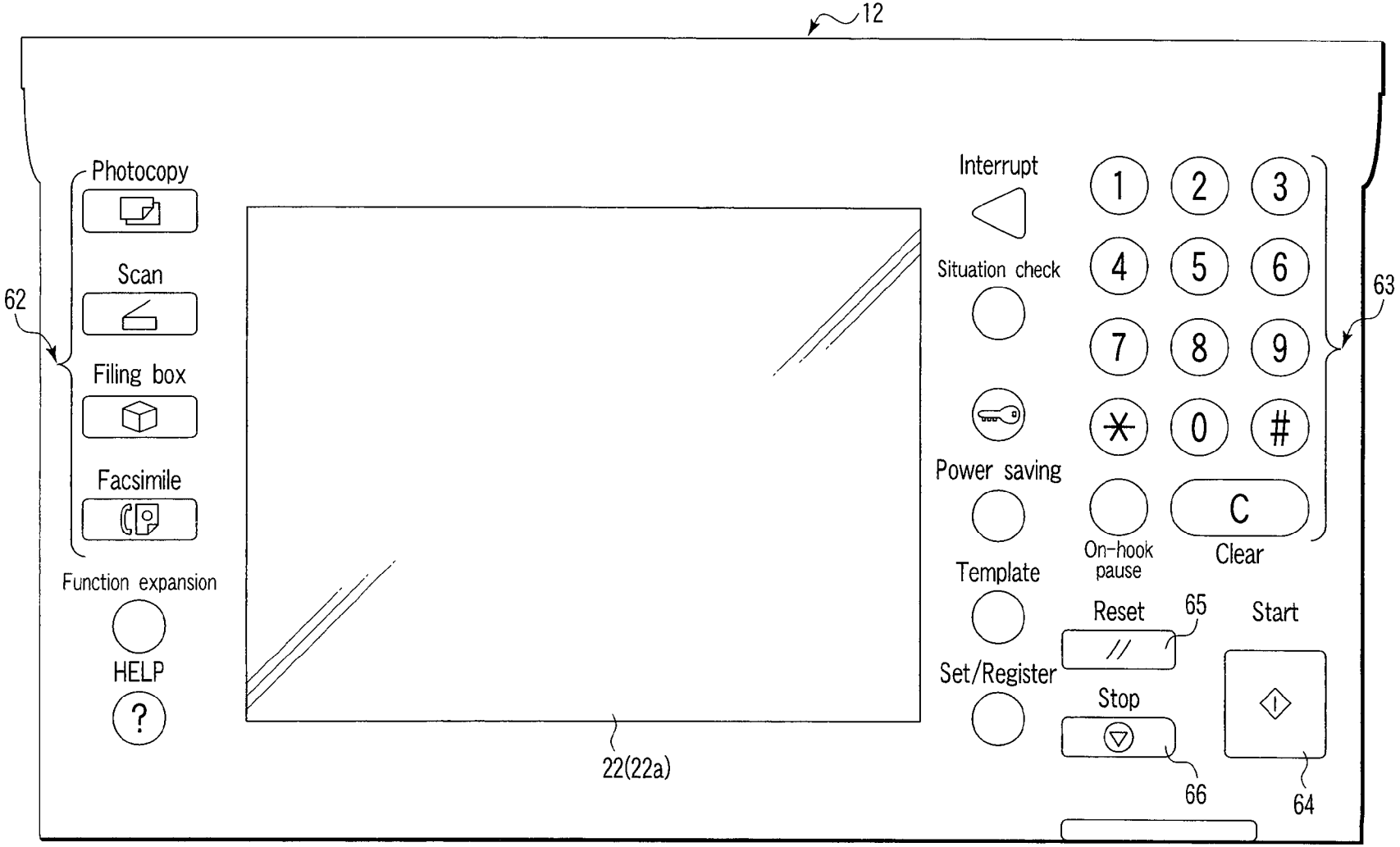
FIG. 3 is an appearance diagram showing a constitution example of an operation panel.

FIG. 3 is an appearance diagram showing a constitution example of the operation panel 12.

As shown in FIG. 3, the operation panel 12 is provided with various hardware keys 21, the display section 22 in which the touch panel 22a is built and the like. Examples of the hardware keys 21 include function selecting keys 62, ten keys 63, a start key 64, a reset key 65 and a stop key 66.

The function selecting keys 62 are hardware keys for selecting various functions. Examples of the function selecting keys 62 include a scanning function selecting key for selecting a scanning function, a photocopy function selecting key for selecting a photocopy function and a FAX function selecting key for selecting a facsimile function.

The ten keys 63 are hardware keys for inputting numerals and the like. The ten keys 63 are used in inputting information such as the number of sheets to be photocopied, a photocopy magnification and a personal identification number for management. The start key 64 is a hardware key for instruction start of an operation. For example, in the photocopy function, a photocopy operation is started in response to an instruction of the start key 64. The reset key 65 is a hardware key for instructing reset of the set contents and the like. For example, when the reset key 65 is input, the set contents and the like designated by the user are reset, and changed into a default set value. The stop key 66 is a hardware key for instructing discontinuation of the operation being executed by the digital multifunctional photocopier. For example, when the stop key 66 is indicated during the photocopy operation of the digital multifunctional photocopier, the photocopy operation is stopped.

Moreover, in addition to the above-described keys, the operation panel 12 shown in FIG. 3 includes, as the hardware keys 21: a help (HELP) key to instruct display of a user guidance; a set/register key to instruct execution of setting or registering; a template key to select a template as data registered beforehand; an interrupt key to demand an interrupt of an operation; a situation check key to confirm a state of the digital multifunctional photocopier; a key to perform security setting or the like; a power saving key for switching a power saving operation mode to reduce power consumption and a usual operation mode; an on-hook/pause key to bring a phone function into an on-hook state; a clear key to clear numerals and the like input by the ten keys and the like. Furthermore, the operation panel 12 shown in FIG. 3 also includes an alarm display to notify an abnormality of the digital multifunctional photocopier and the like.

The display section 22 is constituted of a liquid crystal display in which the touch panel 22a is built. In the display section 22, various operation screens are displayed. Each operation screen displayed in the display section 22 displays a key (icon) selectable by the touch panel 22a in addition to the operation guidance and the like. An example of a screen displayed in the display section 22 will be described later in detail.

The display contents displayed in the display section 22 are controlled by, for example, the system control unit 11. The display data to be displayed in the display section 22 is stored in a storage device of the system control unit 11, such as the HDD 55, the nonvolatile memory 54 or the ROM 53. That is, the storage device (the HDD 55, the nonvolatile memory 54 or the ROM 53) of the system control unit 11 stores data such as the screen, guidance, icon or graphical image to be displayed in the display section 22.

The CPU 51 of the system control unit 11 judges user's operation contents or display contents in accordance with an operation situation of each component. Based on this judgment, the CPU 51 of the system control unit 11 executes a control in reading the display data to be displayed in the display section 22 from the HDD 55, the nonvolatile memory 54 or the ROM 53 to display the data in the display section 22. That is, the CPU 51 of the system control unit 11 controls the display of the display section 22 in accordance with the user's operation contents or the operation situation of each component. The guidance, the icon, the graphical image and the like displayed in the screen of the display section 22 are controlled by the CPU 51 of the system control unit 11 in accordance with the user's operation contents or the operation situation of each component.

Next, there will be described various operation screens to be displayed in the display section 22 of the operation panel 12, and processing in a state in which each operation screen is displayed.

First, there will be described a display example of a basic screen 70 displayed in the display section 22 of the operation panel 12, and a processing example in a state in which the basic screen 70 is displayed.

Figure 4:
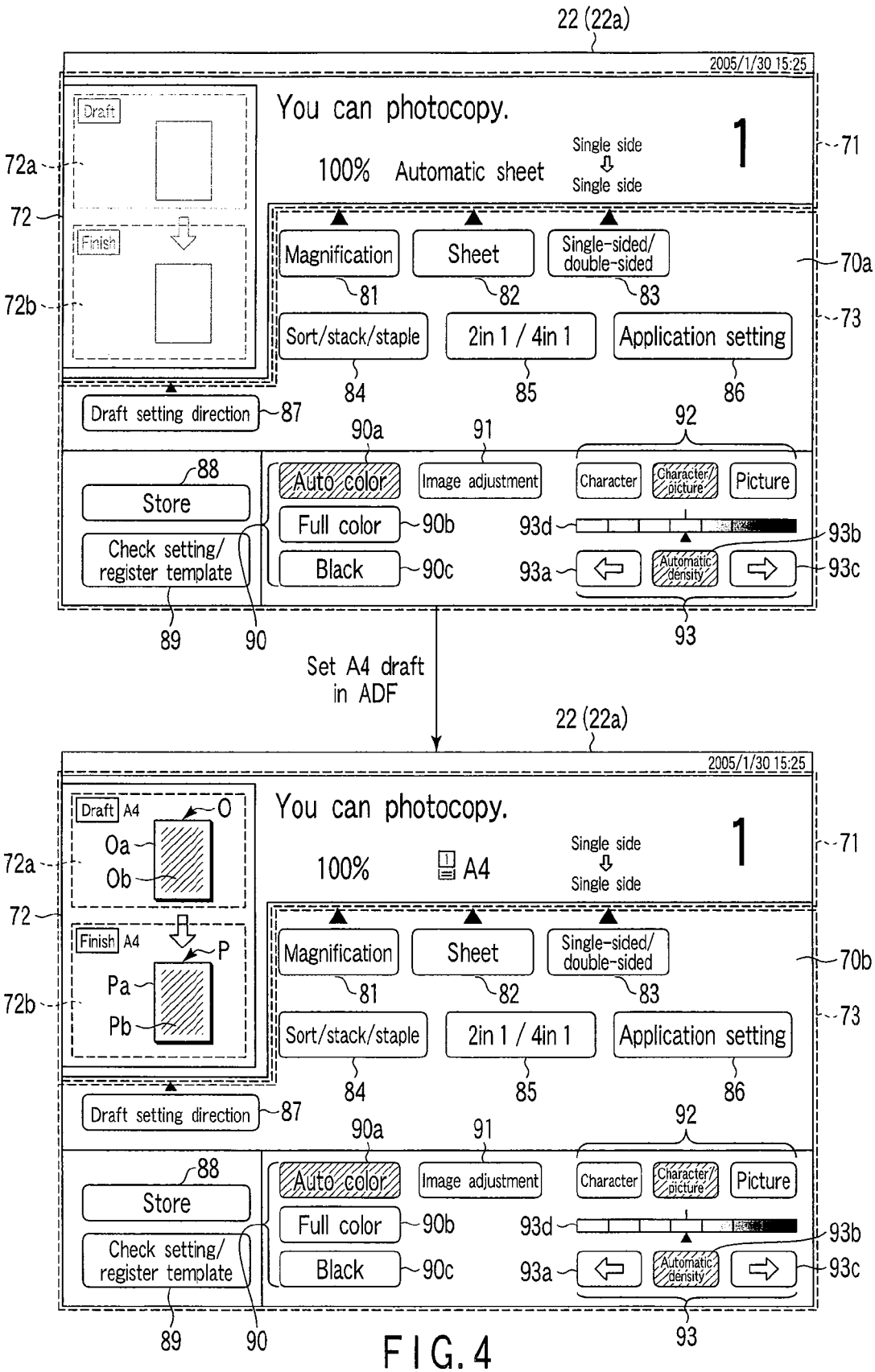
FIG. 4 is a diagram showing a display example of a basic screen in a photocopy mode.
Figure 5:
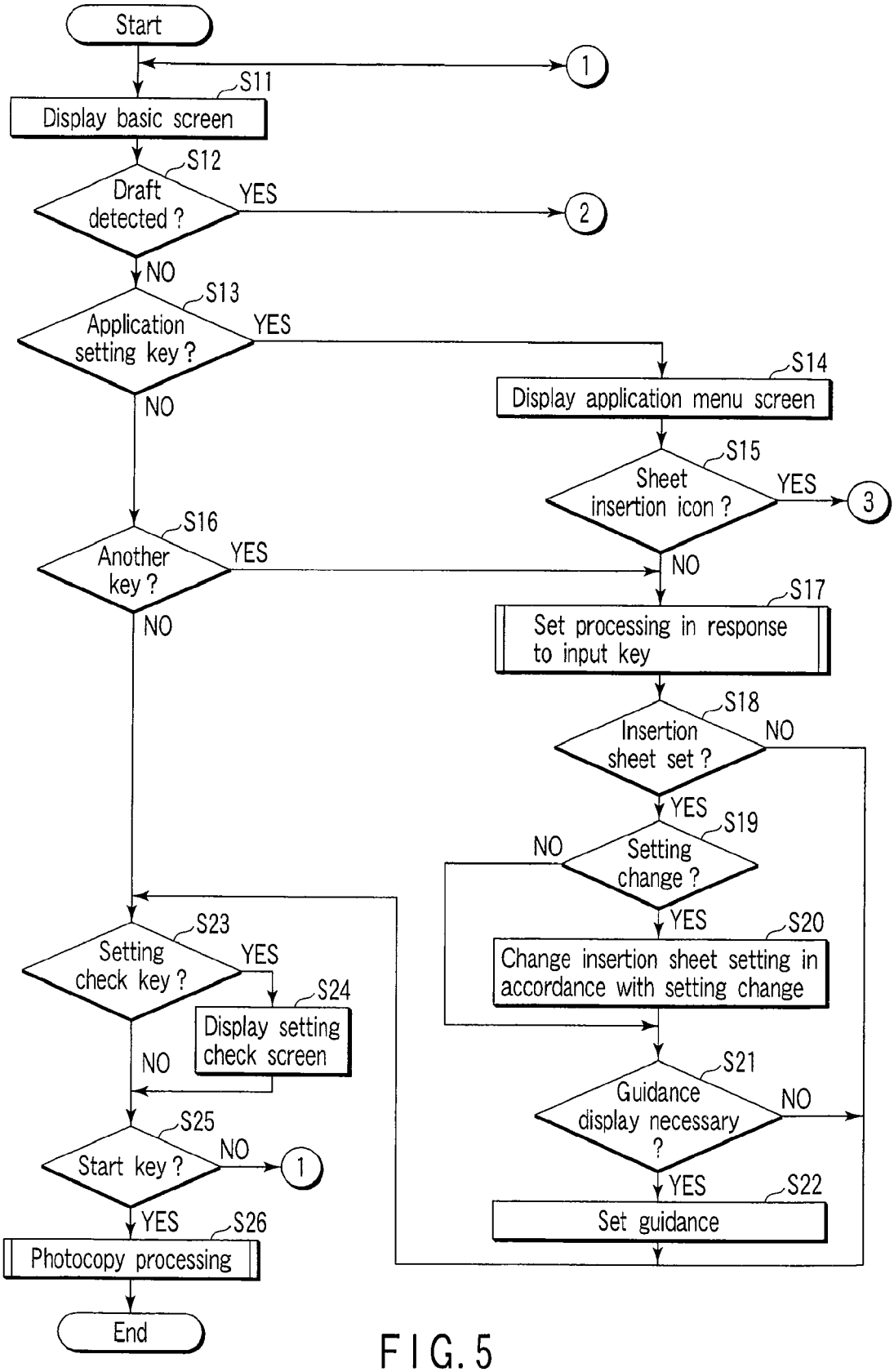
FIG. 5 is a flowchart showing a processing example in a state in which the basic screen is displayed.

FIG. 4 is a diagram showing a display example of the basic screen 70 (70a, 70b) in a photocopy mode. FIG. 5 is a flowchart showing a processing example in a state in which the basic screen 70 is displayed. It is to be noted that in the following description, there is assumed a case where the draft is set in the ADF 31.

The basic screen 70 is displayed in the display section 22 in a case where the digital multifunctional photocopier has a photocopy mode. Even in a case where various set contents are set in the photocopy mode, the basic screen 70 is displayed in a state in which the set contents are reflected. The basic screen 70a shown in FIG. 4 shows a display example of the basic screen displayed in the display section 22 in a case where the digital multifunctional photocopier is brought into a standby state in the photocopy mode (i.e., a case where various settings are brought into default set states). The basic screen 70b shown in FIG. 4 shows a display example of the basic screen displayed in the display section 22 in a case where an "A3" draft is set in the ADF 31 of the digital multifunctional photocopier brought into the standby state.

First, in a case where the digital multifunctional photocopier is brought into the photocopy mode, the CPU 51 of the system control unit 11 displays the basic screen 70a shown in FIG. 4 in the display section 22 of the operation panel 12 in the standby state (step S11). When the draft is set on the ADF 31 in this state (step S12, YES), the CPU 51 of the system control unit 11 performs draft size detection processing by the ADF draft size detecting function, and performs draft set processing and sheet set processing based on a detection result of the draft size. There will be described later in detail the draft set processing and the sheet set processing based on the detection result of this draft size.

In the display example shown in FIG. 4, the basic screen 70a or 70b has display areas such as a guidance display area 71, a draft and sheet setting display area 72, and a function setting button display area 73.

In the display area 71, there are displayed a message, a magnification, a sheet size, a photocopy side (single-sided/double-sided), the number of sheets to be photocopied and the like. As the message, a present state of the digital multifunctional photocopier or the like is displayed. As the magnification, the presently set magnification is displayed. As the sheet size, the presently set sheet size is displayed. As the photocopy side, the presently set mode is displayed: a mode (single-sided/single-sided mode) to photocopy a single side of the draft on a single side of the sheet; a mode (single-sided/double-sided mode) to photocopy the single side of the draft on double sides of the sheet; a mode (double-sided/single-sided mode) to photocopy the double sides of the draft on the single side of the sheet; or a mode (double-sided/double-sided mode) to photocopy the double sides of the draft on the double sides of the sheet. As the number of the sheets to be photocopied, the presently set print number (photocopy number) is displayed.

The display area 72 is provided with a first display area 72a and a second display area 72b.

In the first display area 72a, there is displayed information indicating the presently set draft. For example, in the first display area 72a, a draft graphical image O is displayed together with character information indicating the draft size. The draft graphical image O displayed in the first display area 72a shows the draft size, the draft disposing direction (setting direction), the direction of the image in the draft (portrait or landscape), the surface of the draft to be read (one surface or both surfaces), a state of a special setting (staple setting or the like) and the like.

The draft graphical image O is an image obtained by superimposing (synthesizing), on a graphical image (draft state image) Oa indicating the whole draft state as a draft setting, an area image (draft image area image) Ob indicating an area of the draft image on the draft and a mark (image direction mark) Oc indicating the direction of the image on the draft. The image direction mark Oc is displayed, if necessary, based on a setting situation.

For example, in the basic screen 70b of FIG. 4, in the draft graphical image O, the draft image area image Ob is synthesized with the draft state image Oa indicating that the draft setting is "A4, vertically disposed, and single-sided".

It is to be noted that on the draft graphical image O, there may be superimposed and displayed a mark (staple region mark) indicating a staple position setting.

According to such draft graphical image O, the user can visually, intuitively and easily recognize the present draft setting.

The second display area 72b displays information indicating finish (printed sheet) in a case where the sheet is printed with the present set contents. The second display area 72b displays a graphical image P of the finish together with the character information indicating a finish size (photocopy sheet size). The finished graphical image P displayed in the second display area 72b indicates the size of the sheet (photocopy sheet) on which the draft image is to be printed, the direction of the sheet, the direction of the image (portrait or landscape) to be printed on the sheet, the surface of the sheet to be printed (single-sided/double-sided) and the like.

The finished graphical image P is an image obtained by superimposing (synthesizing), on a graphical image (sheet state image) Pa indicating the whole finish (sheet) state as a sheet setting, a graphical image (printed image area image) Pb indicating an area (printed region) of the draft image to be printed on the sheet and a mark (image direction mark) Pc indicating the direction of the image to be printed on the sheet. The image direction mark Pc is displayed if necessary based on a setting situation in the same manner as in the image direction mark Oc.

For example, in the basic screen 70b of FIG. 4, in the finished graphical image P, the printed image area image Pb is synthesized with the sheet state image Pa indicating that the sheet setting is "A4, vertically, disposed, and single-sided". In this case, the image direction mark Pc is not displayed in the finished graphical image P.

It is to be noted that on the finished graphical image P, there may be superimposed and displayed a mark (staple region mark) indicating a staple position setting or a graphical image (insertion sheet image) indicating a sheet to be inserted.

According to such finished graphical image P, the user can visually, intuitively and easily recognize the present sheet setting, and can further easily predict the finished state.

Moreover, as shown in FIG. 4, the first display area is adjacent to the second display area. Furthermore, the draft graphical image O displayed in the first display area is associated with the finished graphical image P displayed in the second display area by a mark such as an arrow. Therefore, the user can visually and intuitively associate contents of the draft setting with those of the sheet (finish) setting to confirm them.

In the display area 73, there are displayed a plurality of keys for setting various functions selectable by the touch panel 22a. The various keys displayed in the display area 73 are keys for performing various settings. The various keys displayed in the display area 73 are icons in which there are displayed characters, patterns, graphics and the like indicating the set contents and the like.

The display area 73 displays: a magnification key 81; a sheet key 82; a photocopy side (single-sided/double-sided) key 83; a finishing setting (sort/stack/staple) key 84; an Nin1 (2in1/4in1) key 85; an application setting key 86; a draft setting (draft setting direction) key 87; a store key 88; a setting check key 89; a color mode setting portion (an auto color key 90a, a full color key 90b, and a black key 90c) 90; an image adjustment key 91; a draft mode setting portion (a character key 92a, a character picture key 92b, and a picture key 92c) 92; a density adjustment portion (a density down key 93a, a density up key 93b, an automatic density key 93c, and a density display portion 93d) 93 and the like.

The magnification key 81 is constituted of an icon in which "magnification" is displayed. The magnification key 81 is a key to be touched by the user in setting the magnification of the image to be printed on the sheet with respect to the image of the draft. To the magnification key 81, there is set beforehand a setting screen (magnification setting screen) for setting the magnification.

Therefore, when the magnification key 81 is touched (step S16, YES), the CPU 51 of the system control unit 11 displays, in the display section 22, the magnification setting screen for setting the photocopy magnification. In this case, the CPU 51 performs magnification set processing in response to the key input by the user in a state in which the magnification setting screen is displayed (step S17).

The sheet key 82 is constituted of an icon in which "sheet" is displayed. The sheet key 82 is a key to be touched by the user in setting the sheet size or the draft size. That is, when the sheet key 82 is touched (step S16, YES), the CPU 51 of the system control unit 11 displays, in the display section 22, a sheet setting screen for setting the sheet (or a sheet supply cassette or tray in which sheets are stored). In this case, the CPU 51 performs the sheet set processing in response to the key input in a state in which the sheet setting screen is displayed (step S17).

The photocopy side key 83 is constituted of an icon in which "single-sided/double-sided" is displayed. The photocopy side key 83 is a key to be touched by the user in setting the photocopy side. When the photocopy side key 83 is touched (step S16, YES), the CPU 51 displays, in the display section 22, a photocopy side setting screen for setting the photocopy side (setting a draft image reading mode to be single-sided (single-sided reading mode) or double-sided (double-sided reading mode) and a sheet image printing mode to be single-sided (single-sided printing mode) or double-sided (double-sided printing mode)), In a state in which this photocopy side setting screen is displayed, the CPU 51 performs photocopy side set processing in response to the key input by the user (step S17). It is to be noted that in the photocopy side setting screen, there is displayed a key for setting, as a photocopy mode, one of: the single-sided/single-sided mode (single-sided reading mode and single-sided printing mode); the single-sided/double-sided mode (single-sided reading mode and double-sided printing mode); the double-sided/single-sided mode (double-sided reading mode and single-sided printing mode); and the double-sided/double-sided mode (double-sided reading mode and double-sided printing mode).

Moreover, the magnification key 81, the sheet key 82 and the photocopy side key 83 are disposed in the vicinity of the setting information display area 71. A magnification setting, a sheet setting and a photocopy side setting are basic setting particulars having a high setting frequency in the setting of the photocopy processing. Therefore, setting information such as a magnification, a sheet and a photocopy side (single-sided/double-sided) are constantly displayed in the setting information display area 71.

Furthermore, the setting information display area 71 is disposed in an upper area of the display screen of the display section 22, and the button display area 73 is adjacent to the setting information display area 71, and disposed in a lower area of the display screen of the display section 22. Among the setting information displayed in the setting information display area 71, the magnification, the sheet and the photocopy side (single-sided/double-sided) are disposed in positions close to the magnification key 81, the sheet key 82 and the photocopy side key 83 displayed in the button display area 73. Furthermore, the magnification key 81, the sheet key 82 and the photocopy side key 83 are associated with the magnification, the sheet and the photocopy side displayed in the setting information display area 71 by triangular graphics C, respectively.

Accordingly, in the basic screen 70, various types of setting information and keys for performing various settings are displayed together in the display areas, respectively. Moreover, the various types of setting information displayed in the setting information display area 71 can be associated and displayed with various keys (icons) displayed in the button display area 73 so that the user easily sees them.

The finishing (sort/stack/staple) setting key 84 is constituted of an icon in which "sort/stack/staple" is displayed. The finishing (sort/stack/staple) setting key 84 is a key to be touched in setting contents of finishing processing performed by the finisher unit 15. The finishing setting key 84 is set beforehand as described above.

Therefore, in a case where the finishing setting key 84 is touched (step S16, YES), the CPU 51 of the system control unit 11 displays, in the display section 22, a finishing setting screen for setting a finishing function (sort/stack/staple) such as stapling. In a state in which this finishing setting screen is displayed, the CPU 51 performs the finishing set processing in response to the key input by the user (step S17).

The Nin1 (2in1/4in1) key 85 is constituted of an icon in which "2in1/4in1" is displayed. The Nin1 key 85 is a key to be touched in setting photocopy in an Nin1 mode (Nin1 photocopy) in which an image of N (e.g., 2 or 4) pages of the draft is to be printed on one sheet. When the Nin1 key 85 is touched (step S16, YES), the CPU 51 of the system control unit 11 displays, in the display section 22, an Nin1 setting screen for setting the Nin1 photocopy. In a state in which this Nin1 setting screen is displayed, the CPU 51 performs sheet set processing in response to the key input by the user (step S17).

The application setting key 86 is constituted of an icon in which "application setting" is displayed. When the application setting key 86 is touched (step S13, YES), the CPU 51 of the system control unit 11 displays, in the display section 22, an application menu screen for the user to select various functions as application settings (step S14). In this application menu screen, there is displayed a list of various icons corresponding to various functions as application settings. The icons (keys) displayed in this application menu screen include a sheet insertion icon (sheet insertion key) for setting a specific sheet (insertion sheet) to be inserted into at least a printing result. The CPU 51 displays the application menu screen in the display section 22. In a state in which this application menu screen is displayed, when the user touches the sheet insertion icon, the CPU 51 performs insertion sheet set processing to set the insertion sheet. It is to be noted that the insertion sheet set processing will be described later in detail. In a state in which the application menu screen is displayed, when the user touches an icon other than the sheet insertion icon, the CPU 51 sets a function corresponding to the icon touched by the user (step S17).

It is to be noted that the application menu screen displays, in addition to the insertion sheet setting key, keys for setting, for example, a binding margin, border erase, eliminating of booklet center joints, continuous page photocopy, magazine sorting (bookbinding mode), mirror image, negative/positive reversing, independent scaling, addition of date and time, addition of pages and the like. The Nin1 photocopy may be set in the application menu screen.

The draft setting key 87 is constituted of an icon in which the "draft setting direction" is displayed. The draft setting key 87 is a key to be touched in setting a direction in which the draft is to be set. When the draft setting key 87 is touched (step S16, YES), the CPU 51 of the system control unit 11 displays, in the display section 22, a draft direction setting screen for setting the draft setting direction. In this case, the CPU 51 performs the draft set processing in response to the key input in a state in which the draft direction setting screen is displayed (step S17). It is to be noted that there will be described later in detail the draft direction setting screen and the draft direction set processing.

Moreover, in a case where the ADF draft size detecting function is invalid, the draft setting key 87 is constituted of an icon in which the "draft size/setting direction" is displayed. In this case, when the draft setting key 87 is touched (step S16, YES), the CPU 51 of the system control unit 11 displays, in the display section 22, the draft setting screen (draft direction setting screen) for setting the draft size and the draft setting direction in the ADF (step S17).

It is to be noted that, as shown in FIG. 4, in the button display area 73, the draft setting key (icon) 87 is disposed in a position close to the display area 72 in which the draft graphical image and the finished graphical image are displayed. Furthermore, the draft setting key 87 is associated with the display area 72 by the triangular graphic C. Accordingly, in the setting information display area 71, the display area 72 displays the draft graphical image and the finished graphical image. Moreover, the draft setting key (icon) 87 for setting the draft is displayed in the button display area. The draft graphical image and the finished graphical image can be associated and displayed with the draft setting key 87 so that the user easily sees them.

The color mode setting portion 90 is constituted of keys for designating a color mode. The color mode setting portion 90 is constituted of the auto color key 90a, the full color key 90b, and the black key 90c. The auto color key 90a is constituted of an icon in which "auto color" is displayed. The full color key 90b is constituted of an icon in which "full color" is displayed. The black key 90c is constituted of an icon in which "monochromatic photocopy" is displayed.

The auto color key 90a is a key for judging whether the draft is chromatic or monochromatic, and setting color photocopy or monochromatic photocopy in accordance with the judgment result. The full color key 90b is a key for setting the color photocopy. The black key 90c is a key for setting the monochromatic photocopy. Any specific setting screen is not set to the auto color key 90a, the full color key 90b or the black key 90c. Therefore, when the auto color key 90a, the full color key 90b or the black key 90c is touched (step S16, YES), the CPU 51 sets a color mode in response to the touched key (step S17) while the basic screen 70 remains to be displayed.

The image adjustment key 91 is constituted of an icon in which "image adjustment" is displayed. The image adjustment key 91 is a key to be touched in performing setting to adjust the image. When the image adjustment key 91 is touched (step S16, YES), the CPU 51 displays, in the display section 22, a setting screen for adjusting the image with respect to a color balance, RGB, image quality, substrate, sharpness, two-color photocopy or the like. In a state in which this setting screen for adjusting the image is displayed, the CPU 51 performs image adjustment processing in response to the key input by the user (step S17).

The draft mode setting portion 92 is a key for selecting a type of the image to be photocopied. The draft mode setting portion 92 is constituted of the character key 92a, the character picture key 92b and the picture key 92c. The character key 92a is constituted of an icon in which "character" is displayed. The character picture key 92b is constituted of an icon in which "character picture" is displayed. The picture key 92c is constituted of an icon in which "picture" is displayed.

The character key 92a is a key to be selected in a case where the image to be photocopied is a binary image (image constituted of white or black pixels) or an image to be processed as the binary image. For example, since the image constituted of characters has less grey-level pixels, the image is preferably photocopied as the binary image. Therefore, in a case where the image to be photocopied is constituted of the characters, the character key 92a is selected.

The picture key 92c is a key to be selected in a case where the image to be photocopied is an image having multiple tones. For example, since an image such as a picture has many grey-level pixels, the image is preferably photocopied as the multiple-tone image. Therefore, when the image to be photocopied is constituted of the picture, the picture key 92c is selected.

The character picture key 92b is a key to be selected in a case where the image to be photocopied is an image mixed with the binary image and the multiple-tone image. For example, the character picture key 92b is selected in a case where the image to be photocopied is an image mixed with the characters and the picture.

To the character key 92a, the character picture key 92b and the picture key 92c, any specific setting screen is not set. Therefore, in a case where the character key 92a, the character picture key 92b or the picture key 92c is touched (step S16, NO), the CPU 51 sets a type of the draft image in response to the touched key (step S17) while the basic screen 70 remains to be displayed.

The density adjustment portion 93 is constituted of keys for setting a photocopy density. The density adjustment portion 93 is constituted of the density down key 93a, the density up key 93b, the automatic density key 93c, the density display portion 93d and the like. The density down key 93a is constituted of an icon in which "←" is displayed. The density up key 93b is constituted of an icon in which "→" is displayed. The automatic density key 93c is constituted of an icon in which "automatic density" is displayed. In the density display portion 93d, the presently set photocopy density is displayed.

The density down key 93a is a key to be touched in a case where the photocopy density is reduced. Every time the density down key 93a is touched, the photocopy density is set to gradually decrease from the presently set photocopy density. The density up key 93b is a key to be touched in a case where the photocopy density is increased. Every time the density up key 93b is touched, the photocopy density is set to gradually increase from the presently set photocopy density. The automatic density key 93c is a key to be touched in a case where the photocopy density is set based on a predetermined reference value.

To the density down key 93a, the density up key 93b and the automatic density key 93c, any specific setting screen is not set. Therefore, in a case where the density down key 93a, the density up key 93b or the automatic density key 93c is touched (step S16, YES), the CPU 51 sets a density in response to the touched key (step S17) while the basic screen 70 remains to be displayed.

As described above, in a case where the key other than the sheet insertion icon is touched (step S16, YES), the CPU 51 performs the set processing other than the insertion sheet set processing in response to the touched key (step S17). Every time the set processing other than such insertion sheet set processing is executed, the CPU 51 judges whether or not the insertion sheet has been set (step S18). In a case where this judgment judges that the insertion sheet has been set, the CPU 51 judges whether or not to change the set insertion sheet setting in accordance with the set contents of the set processing (step S19). For example, in a case where the printing mode is changed from the single-sided mode to the double-sided mode (or from the double-sided mode to the single-sided mode), the CPU 51 judges that the insertion sheet set contents be changed.

In a case where it is judged that the insertion sheet set contents be changed, the CPU 51 changes the insertion sheet setting in accordance with the set contents (step S20). The contents of the insertion sheet setting changed in accordance with the set contents are appropriately set in accordance with an operation mode or the like. For example, in a case where the printing mode is changed from the single-sided mode to the double-sided mode in a state in which the printing of the insertion sheet is set as the insertion sheet setting, the CPU 51 changes the image (insertion position) to be printed on the insertion sheet to the page and the next page of the draft set as the image to be printed on the insertion sheet.

Moreover, when the above judgment judges that the insertion sheet has been set (step S18, YES), the CPU 51 judges whether or not to display, in the basic screen 70 of the photocopy mode, a guidance indicating that the insertion sheet setting be confirmed in accordance with the set contents of the set processing (step S21). It is judged whether or not to display the guidance in accordance with, for example, the set contents. For example, when the printing mode or the draft reading mode is changed from the single-sided mode to the double-sided mode (or from the double-sided mode to the single-sided mode), or the Nin1 photocopy is set, the CPU 51 judges that the guidance to confirm the insertion sheet setting be displayed in the basic screen.

In a case where the above judgment judges that the guidance be displayed (step S21, YES), the CPU 51 sets the guidance indicating that the insertion sheet setting be confirmed in the basic screen 70 of the photocopy mode (step S22). This guidance is set to be displayed in association with the application setting key 86 for setting the insertion sheet as described later (see, e.g., FIG. 31 or 32). Accordingly, in a case where the set contents other than those of the insertion sheet setting are changed in a state in which the insertion sheet has been set, the guidance indicating that the insertion sheet setting be confirmed is appropriately displayed in the basic screen 70 of the photocopy mode.

Moreover, the store key 88 is constituted of an icon in which "store" is displayed. The store key 88 is a key to be touched in storing the present set contents.

The setting check key 89 is constituted of an icon in which "check setting/register template" is displayed. The setting check key 89 is a key to be touched in a case where the present set contents are confirmed, or registered as a template. In a case where the setting check key 89 is touched (step S23, YES), the CPU 51 of the system control unit 11 displays, in the display section 22, a setting check screen which displays the present set contents (step S24).

Various set contents of the above-described photocopy processing are retained as setting information in the RAM 52. Therefore, the CPU 51 displays, in the display section 22, the setting check screen indicating the present set contents based on the setting information stored in the RAM 52.

Moreover, in a case where the start key 64 is input in a state in which the basic screen 70 is displayed (step S25, YES), the CPU 51 executes the photocopy processing based on the present set contents retained as the setting information (step S26).

Next, there will be described a processing example of automatic draft set processing based on a detection result of the ADF draft size detecting function.

Figure 6:
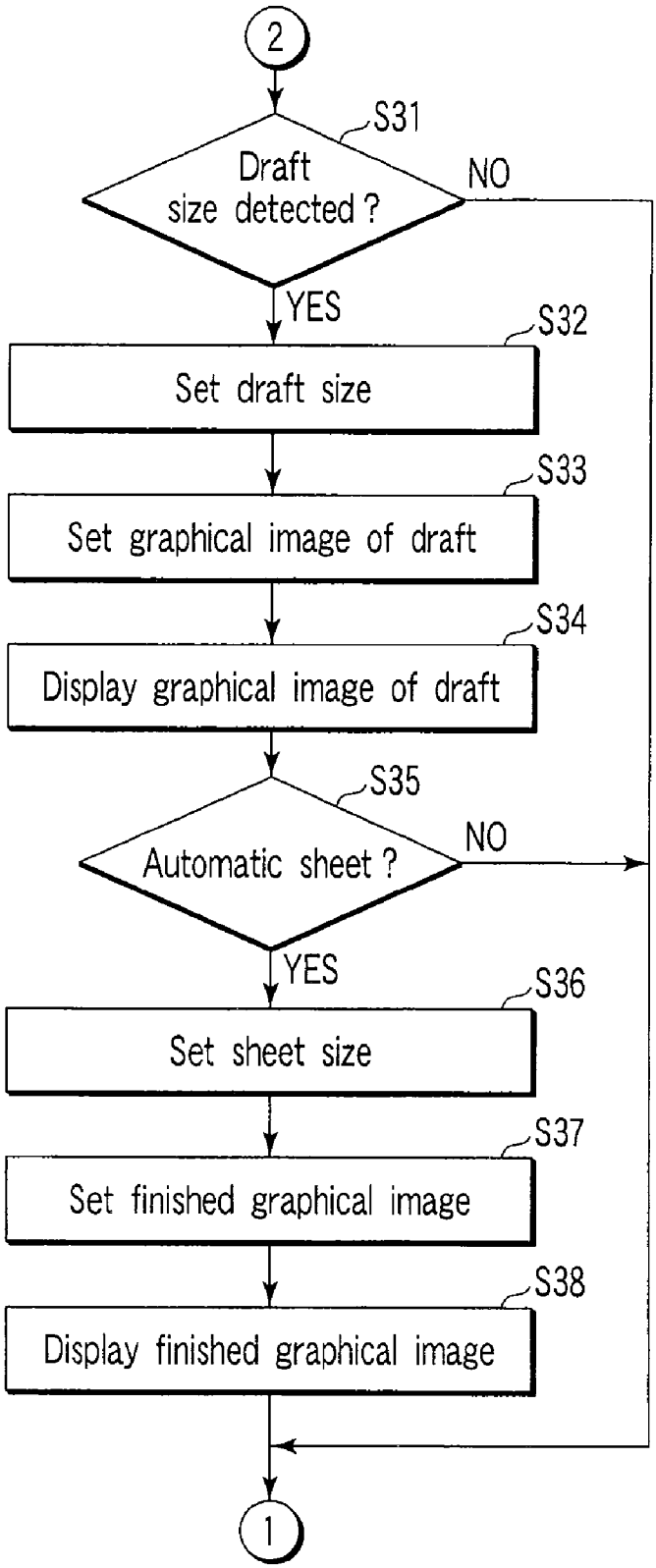
FIG. 6 is a flowchart showing a processing example of automatic draft set processing.

FIG. 6 is a flowchart showing a processing example of the automatic draft set processing. Here, it is assumed that the ADF draft size detecting function is valid. In the following description, it is assumed that the basic screen 70 is displayed in the display section 22 of the operation panel 12.

In a case where the draft is set on the draft table of the ADF 31, when the ADF draft size detecting function is effective, the CPU 51 of the system control unit 11 performs the automatic draft set processing.

First, when the draft is set on the draft table of the ADF 31, among a plurality of sensors 31b disposed on the draft table of the ADF 31, the sensor 31b corresponding to a position where the draft has been set supplies a detection signal indicating that the draft has been detected to the CPU 51 of the system control unit 11. On receiving, from any sensor 31b, the detection signal indicating that the draft has been detected, the CPU 51 of the system control unit 11 judges that the draft has been set on the draft table.

When it is judged that the draft has been set on the draft table of the ADF 31, the CPU 51 judges whether or not the ADF draft size detecting function is valid (step S31). In a case where the ADF draft size detecting function is invalid (step S31, NO), processing of steps S32 to S38 described later is cancelled. When the ADF draft size detecting function is valid (step S31, YES), the CPU 51 detects the size of the draft set on the draft table based on a signal indicating a position of the guide section 31a functioning as a draft size detector and a detection signal of each sensor 31b indicating whether or not the draft exists.

For example, the ADF draft size detecting function judges a length of the draft in a direction perpendicular to a direction in which the draft is conveyed by the ADF 31 based on a signal indicating the position of the guide section 31a. Furthermore, the ADF draft size detecting function judges a length of the draft in a direction parallel to the direction in which the draft is conveyed by the ADF 31 based on the detection signal of each sensor 31b indicating the presence of the draft. Therefore, the CPU 51 of the system control unit 11 judges the draft size and the draft direction based on the length of the draft in the direction perpendicular to the direction of the draft conveyed by the ADF 31 and that in the direction parallel to the direction of the draft conveyed by the ADF 31.

On judging the size and the disposing direction of is the draft set in the ADF 31, the CPU 51 sets the draft size and a draft setting method as draft settings based on the judgment result (step S32). When the draft size and the draft setting direction are set, the CPU 51 performs draft graphical image set processing to set the draft graphical image O in accordance with the set draft size and setting method (step S33). When the draft graphical image O is set, the CPU 51 displays the draft graphical image O in the first display area 72a (step S34).

In this automatic draft set processing, there are set the draft size and the draft setting direction which are judged by the ADF draft size detecting function. Therefore, in the draft graphical image set processing, as the draft graphical image O, the draft state image Oa is set which indicates at least the draft size and the draft setting direction. The draft graphical image set processing will be described later in detail.

Moreover, when the draft size is judged by the ADF draft size detecting function, the CPU 51 judges whether or not the sheet setting mode is set to "automatic sheet" (step S35). Here, the "automatic sheet" as the sheet setting mode is a mode to set the sheet size matched with the draft size as the sheet setting. For example, when the magnification is 100%, the sheet having a size equal to that of the draft is set. It is to be noted that when the sheet setting mode is not the "automatic sheet" (step S35, NO), the CPU 51 cancels processing of steps S35 to S37 described later.

When the sheet setting mode is the "automatic sheet" (step S35, YES), the CPU 51 sets the sheet size as the sheet setting to the size (magnitude and direction) in accordance with the draft size (step S36). After setting the sheet size, the CPU 51 determines the finished graphical image P in accordance with the set sheet size (step S37).

The finished graphical image P shows a graphical image of the sheet (finish) printed based on the present set contents. Here, the sheet size (magnitude and direction) is set. Therefore, as the finished graphical image P, the graphical image is determined which indicates at least the sheet size (magnitude and direction).

As the finished graphical image P, the image matched with the sheet size is selected from a plurality of types of graphical images stored beforehand in the HDD 55, the nonvolatile memory 54, or the ROM 53. In a case where sizes such as A3, A4, A4-R, and B4 are presumed as the sheet sizes, graphical images of various sizes corresponding to the presumed sheet sizes are stored beforehand in the HDD 55, the nonvolatile memory 54, or the ROM 53. The finished graphical image P may be prepared by the CPU 51 every time the sheet size setting is changed.

In a case where the image is determined which is to be displayed as the finished graphical image P, the CPU 51 displays the determined image as the finished graphical image P in the second display area 72b (step S38).

According to the above-described automatic draft set processing, the size judged by the ADF draft size detecting function is set as the draft size, and the draft graphical image indicating the draft size is displayed in the first display area. Accordingly, the user can visually and intuitively confirm the draft size (magnitude and direction) judged by the ADF draft size detecting function.

Furthermore, in a case where the "automatic sheet" is set as the sheet setting mode, the size judged by the ADF draft size detecting function in accordance with the draft size is set as the sheet size, and the finished graphical image indicating the sheet size is displayed in the second display area. Accordingly, the user can visually confirm the size of the photocopy sheet (finish) together with the draft size (magnitude and direction).

Next, there will be described photocopy magnification and sheet set processing.

Here, there will be described a display example of the magnification and sheet setting screen (magnification/sheet setting screen) and processing examples of the magnification set processing and the sheet set processing in a state in which the magnification/sheet setting screen is displayed.

Figure 7:
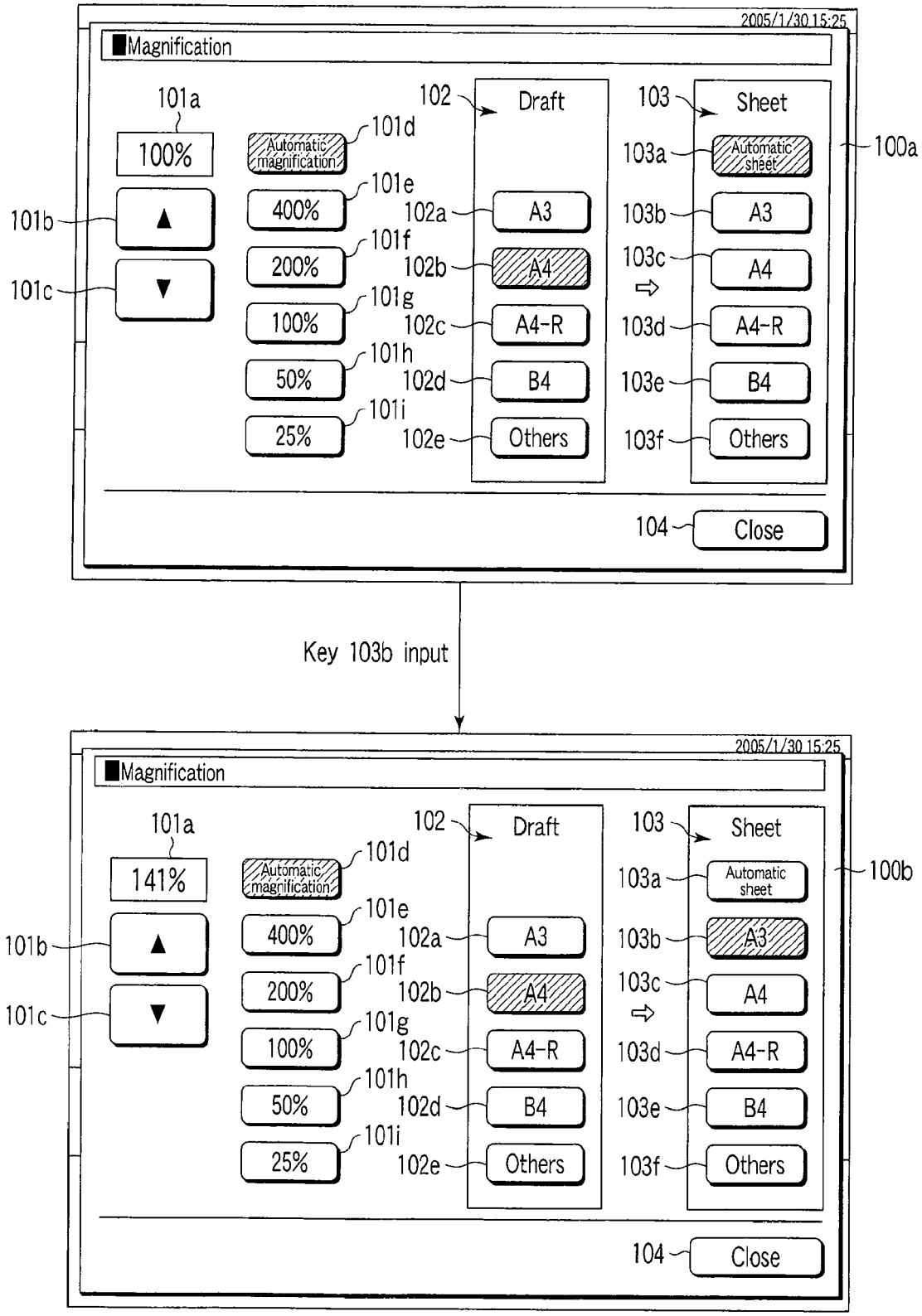
FIG. 7 is a diagram showing a first display example of a magnification/sheet setting screen.
Figure 8:
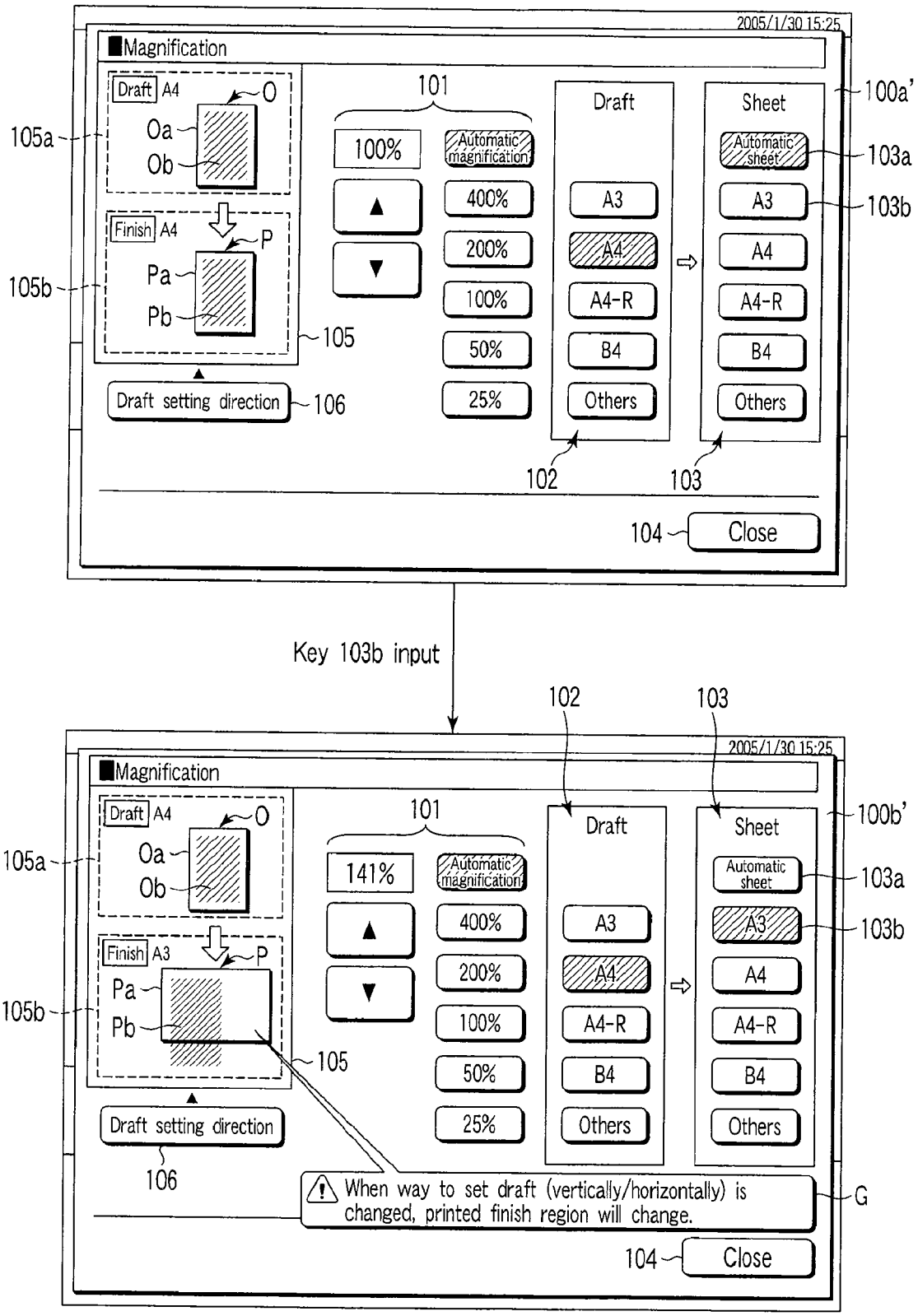
FIG. 8 is a diagram showing a second display example of a magnification/sheet setting screen.

FIG. 7 is a diagram showing a first display example of a magnification/sheet setting screen 100. FIG. 8 is a diagram showing a second display example of a magnification/sheet setting screen 100'. FIG. 7 shows, as first display examples, display examples of a magnification/sheet setting screen 100a in a case where the draft setting is "A4 and vertical" and the sheet setting is the "automatic sheet" and a magnification/sheet setting screen 100b in a case where the sheet setting is changed to "A3 and horizontal". FIG. 8 shows, as second display examples, display examples of a magnification/sheet setting screen 100a' in a case where the draft setting is "A4 and vertical" and the sheet setting is the "automatic sheet" and a magnification/sheet setting screen 100b' in a case where the sheet setting is changed to "A3 and horizontal".

It is to be noted that in the magnification/sheet setting screen 100' shown in FIG. 8, display contents of the magnification/sheet setting screen 100 shown in FIG. 7 further include a display area 105 having a first display area 105a and a second display area 105b, and a draft setting key 106. The first display area 105a and the second display area 105b are areas where contents are displayed which are similar to those of the first display area 72a and the second display area 72b displayed in the basic screen 70, respectively. That is, the draft graphical image O is displayed in the first display area 72a, and the finished graphical image P is displayed in the second display area 72b. The draft setting key 106 is a key to be touched in a case where the direction of the image in the draft is set in the same manner as in the draft setting key 87 of the basic screen 70b.

In the display examples shown in FIGS. 7 and 8, the same setting screen (magnification/sheet setting screen) is used as a photocopy magnification setting screen and a sheet size and draft size setting screen. This is because, for example, in a case where the draft size and the sheet size are determined, a photocopy magnification (optimum photocopy magnification) is determined at which the whole draft image just fits the photocopy sheet. Conversely, in a case where the draft size and the photocopy magnification are determined, a sheet size (optimum sheet size) is determined in which the whole draft image can be printed. Since the photocopy magnification setting is closely related to the photocopy sheet setting in this manner, the photocopy magnification and the sheet size can be set in the same screen.

In the magnification/sheet setting screen 100 shown in FIG. 7 or the magnification/sheet setting screen 100' shown in FIG. 8, there are displayed a magnification setting section 101, a draft size setting section 102, a sheet setting section 103, and a close key 104.

The magnification setting section 101 is constituted of a magnification display portion 101a, a magnification up key 101b, a magnification down key 101c, an automatic magnification key 101d, a 400% key 101e, a 200% key 101f, a 100% key 101g, a 50% key 101h, a 25% key 101i and the like. In the magnification display portion 101a, the presently set photocopy magnification is displayed. The magnification up key 101b is touched when increasing the photocopy magnification every percentage. The magnification down key 101c is touched when decreasing the photocopy magnification every percentage. The automatic magnification key 101d is a key brought into a selected state, in a case where the magnification is set in accordance with the draft size and the sheet size. The 400% key 101e, the 200% key 101f, the 100% key 101g, the 50% key 101h, and the 25% key 201i are touched in a case where the photocopy magnification is set to 400%, 200%, 100%, 50%, and 25%, respectively.

The draft size setting section 102 is constituted of an A3 key 102a, an A4 key 102b, an A4-R key 102c, a B4 key 102d, another key 102e and the like. The A3 key 102a, the A4 key 102b, the A4-R key 102c, and the B4 key 102d are keys to be touched in a case where the draft setting is set to A3 (A3 and horizontal), A4 (A4 and vertical), A4-R (A4 and horizontal), and B4 (B4 and vertical), respectively. The other key 102e is a key to be touched in a case where the draft size is set to a size other than A3, A4, A4-R, and B4. In a case where the draft size detecting function is valid, in an initial state, the key is brought into the selected state in the draft size setting section 102, the key corresponding to the draft having a size and a direction (setting direction) detected by the draft size detecting function.

The sheet size setting section 103 is constituted of an automatic sheet setting key 103a, an A3 key 103b, an A4 key 103c, an A4-R key 103d, a B4 key 103e, another key 103f and the like. The automatic sheet setting key 103a is a key brought into the selected state in a case where the sheet is set in accordance with the draft size and the photocopy magnification. For example, in a case where the automatic sheet setting key 103a is brought into the selected state, when the photocopy magnification is 100%, a sheet is selected which has a size equal to that of the draft. The A3 key 103b, the A4 key 103c, the A4-R key 103d, and the B4 key 103e are keys to be touched in a case where the sheet size is set to A3 (A3 and horizontal), A4 (A4 and vertical), A4-R (A4 and horizontal), and B4 (B4 and vertical), respectively. The other key 103f is a key to be touched in a case where the sheet having a size other than A3, A4, A4-R, and B4 is set.

The close key 104 is a key to be touched in a case where the settings of the magnification and the sheet have been completed. When the close key 104 is touched, the display section 22 displays the basic screen 70 in which the settings of the magnification and the sheet set in the magnification/sheet setting screen have been reflected.

Next, there will be described processing examples of the magnification set processing and the sheet set processing.

Figure 9:
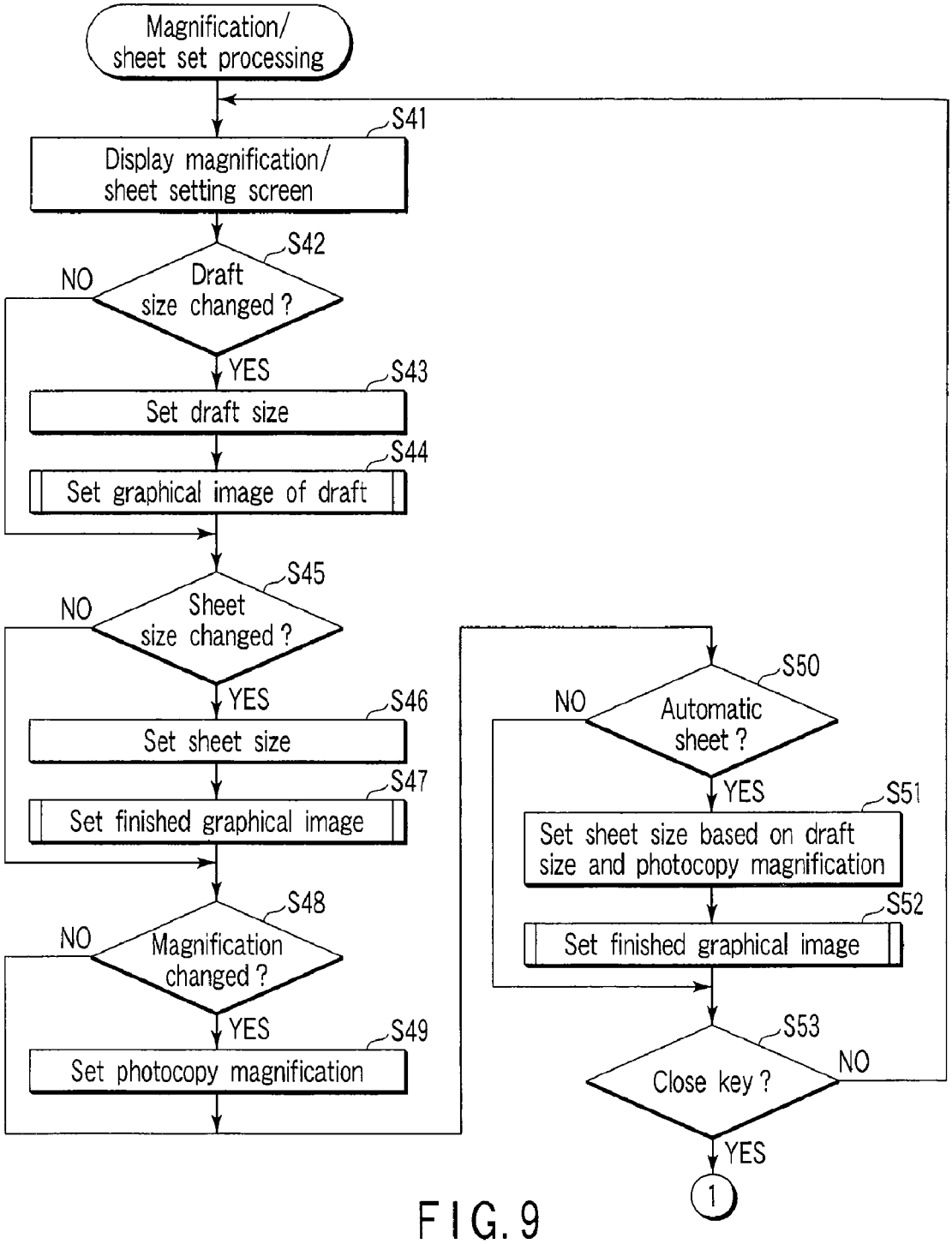
FIG. 9 is a flowchart showing processing examples of magnification set processing and sheet set processing.

FIG. 9 is a flowchart showing the processing examples of the magnification set processing and the sheet set processing in a state in which the magnification/sheet setting screen 100 shown in FIG. 7 or the magnification/sheet setting screen 100' shown in FIG. 8 is displayed.

When the magnification key 81 or the sheet key 82 is touched in the basic screen 70, the CPU 51 of the system control unit 11 displays, in the display section 22, the magnification/sheet setting screen 100 in which the present set contents have been reflected (step S41). For example, when the magnification is "100%", the draft setting is "A4 and vertical", and the sheet setting (sheet setting mode) is "automatic sheet", as shown in FIG. 7, the display section 22 displays the magnification/sheet setting screen 100 in which the magnification is "100%", the draft setting is "A4 (A4 vertical)", and the sheet is "automatic sheet".

In a case where any key (102a to 102e) of the draft size setting section 102 is input in a state in which the magnification/sheet setting screen 100 is displayed, the CPU 51 brings the input key into the selected state (a display color of the key is changed), and judges that the draft setting has been changed (step S42, YES). When it is judged that the draft setting has been changed, the CPU 51 sets the draft setting (magnitude or setting direction) corresponding to the input key (step S43). Furthermore, when the draft setting is changed, the CPU 51 sets the draft graphical image O in accordance with the draft setting (step S44).

For example, as shown in FIGS. 7 and 8, in a case where the "A4" key 102b is brought into the selected state, the CPU 51 sets the draft setting to be "A4 and vertical". When the draft is set to be "A4 and vertical", the CPU 51 sets the graphical image corresponding to "A4 and vertical" as the draft state image Oa of the draft graphical image O. The CPU 51 sets the image of the draft image area in the "A4 and vertical" draft as the draft image area image Ob of the draft graphical image O.

It is to be noted that as shown in FIG. 8, in a case where the magnification/sheet setting screen 100' is provided with the first display area 105a, the CPU 51 displays the set draft graphical image O in the first display area 105a.

Moreover, when any key (103b to 103f) of the sheet setting section 103 is input, the CPU 51 brings the input key into the selected state (changes the display color of the key), and judges that the sheet setting (finished sheet setting) has been changed (step S45, YES). When it is judged that the sheet setting has been changed, the CPU 51 changes the sheet setting to the set contents corresponding to the input key (step S46). It is to be noted that when the "automatic sheet" key 103a is input, the CPU 51 performs the sheet setting as described later in steps S51, S52. When the sheet size setting is changed, the CPU 51 sets the finished graphical image P in accordance with the sheet setting (step S47).

For example, in a case where the user touches the "A3" key 103b in the magnification/sheet setting screen 100 in which the "automatic magnification" key 103a is brought into the selected state, the CPU 51 brings the "A3" key 103b into the selected state, and sets the sheet setting to be "A3 and horizontal". When the sheet setting is set to be "A3 and horizontal", the CPU 51 sets the graphical image indicating "A3 and horizontal" as the finished state image Pa of the finished graphical image P.

Moreover, in this case, since the magnification setting (magnification setting mode) is set to the "automatic magnification", the photocopy magnification is set to "141%" based on the draft size "A4" and the sheet size "A3". Therefore, the CPU 51 sets an image area image obtained by enlarging the draft image area image Ob to 141% as the printed image area image Pb of the finished graphical image P.

It is to be noted that in the finished graphical image P, the printed image area image Pb is superimposed on the finished state image Pa in a state in which an upper left portion of the printed image area image is aligned with that of the finished state image. For example, when the magnification/sheet setting screen 100' is provided with the second display area 105b as shown in FIG. 8, the CPU 51 displays the set finished graphical image P in the second display area 105b.

Moreover, in the example shown in FIG. 8, the printed image area image Pb of the finished graphical image P protrudes from a region of the finished state image Pa. In such case, as shown in FIG. 8, there is displayed the guidance display section G associated with the finished graphical image P. In the example shown in FIG. 8, the guidance display section G displays a guidance indicating "when a way (vertical/horizontal) to set the draft is changed, a printed region of the finish changes". Such guidance display section G is set together with the finished graphical image P in the set processing of the finished graphical image as described later.

Furthermore, when any key (101b to 101i) of the magnification setting section 101 is input, the CPU 51 of the system control unit 11 judges that the photocopy magnification has been changed (step S48, YES). When it is judged that the photocopy magnification has been changed, the CPU 51 of the system control unit 11 displays the magnification in response to the input key in the magnification display portion 101a, and sets the photocopy magnification in response to the input key (step S49). When the "automatic magnification" key 101d is input, the CPU 51 calculates an optimum magnification in accordance with the draft size and the sheet size. This calculated magnification is displayed in the magnification display portion 101a, and set as the photocopy magnification.

Moreover, in a case where the draft size or the photocopy magnification is changed in a state in which the "automatic sheet" is set as the sheet setting mode (step S50, YES), the CPU 51 performs the processing (automatic sheet set processing) to set the sheet in accordance with the draft size and the photocopy magnification. Even in a case where the "automatic sheet" key 103a is input in a state in which a specific sheet is set (step S50, YES), the CPU 51 performs the processing (automatic sheet set processing) to set the sheet in accordance with the draft size and direction and the photocopy magnification.

In the automatic sheet set processing, the CPU 51 judges an optimum sheet (size and direction) based on the draft size, the draft setting direction, and the photocopy magnification. On judging the optimum sheet, the CPU 51 sets the judged sheet (step S51). Furthermore, when the sheet setting is changed, the CPU 51 sets the finished graphical image P in accordance with the set sheet setting (step S52).

It is to be noted that when the magnification/sheet setting screen 100' is provided with the second display area 105b as shown in FIG. 8, the CPU 51 displays the set finished graphical image P in the second display area 105b.

Moreover, when the close key 104 is input, the CPU 51 ends the magnification and sheet set processing. In this case, the CPU 51 changes, to the basic screen 70, the set screen displayed in the display section 22. It is to be noted that in the basic screen 70, the first display area 72a displays the draft graphical image O set in the magnification and sheet set processing, and the second display area 72b displays the finished graphical image P set in the magnification and sheet set processing.

Moreover, in a case where the above-described magnification set processing sets the magnification to a setting which is different from the default setting, the CPU 51 displays, in the basic screen 70, the magnification key 81 in a specific color different from that of the default setting. For example, when the magnification has a default setting state, the magnification key 81 is displayed in white. When the setting has a state different from that of the default setting, the magnification key 81 is displayed in blue.

Similarly, in a case where the above-described sheet set processing sets the sheet to a setting which is different from the default setting, the CPU 51 displays, in the basic screen 70, the sheet key 82 in a color different from that of the default setting. For example, when the sheet has a default setting state, the sheet key 82 is displayed in white. When the setting has a state different from that of the default setting, the sheet key 82 is displayed in blue.

As described above, as to a particular having a setting which is different from the default setting, the basic screen of copy mode 70 displays the setting key corresponding to the setting particular in a specific color. In consequence, the user can easily recognize the setting particular (particular whose setting has been changed in a lower-layer setting screen) brought into a setting different from the default setting in the basic screen (uppermost setting screen) 70. Furthermore, the user can easily recognize the present set contents by referring to the setting information (magnification or sheet) in the setting information display area 71, because the information is associated with each key by the graphic C.

Next, draft setting will be described.

The draft setting includes the draft size, the draft direction (setting direction), and the direction of the image (portrait or landscape) in the draft. The draft size and direction are detectable by the ADF draft size detecting function. That is, when the ADF draft size detecting function is valid, the size and setting direction of the draft set in the ADF 31 are judged by the ADF draft size detecting function. Therefore, as to the draft setting, there will be described a case where the ADF draft size detecting function is valid and a case where the ADF draft size detecting function is invalid.

First, there will be described the draft setting in a case where the ADF draft size detecting function is valid.

Figure 10:
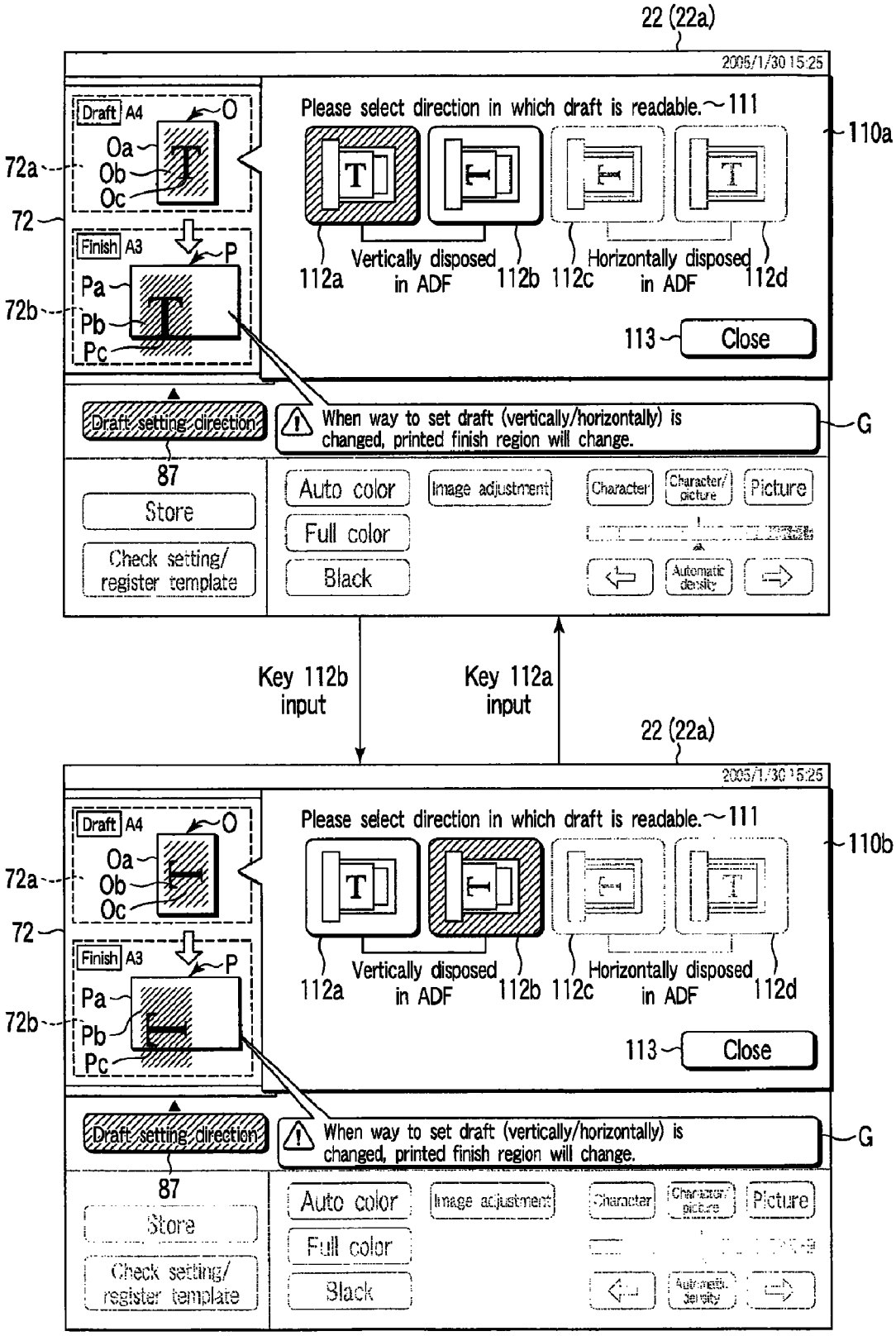
FIG. 10 is a diagram showing a display example of a draft direction setting screen in a case where a draft vertically set in an ADF is detected.
Figure 11:
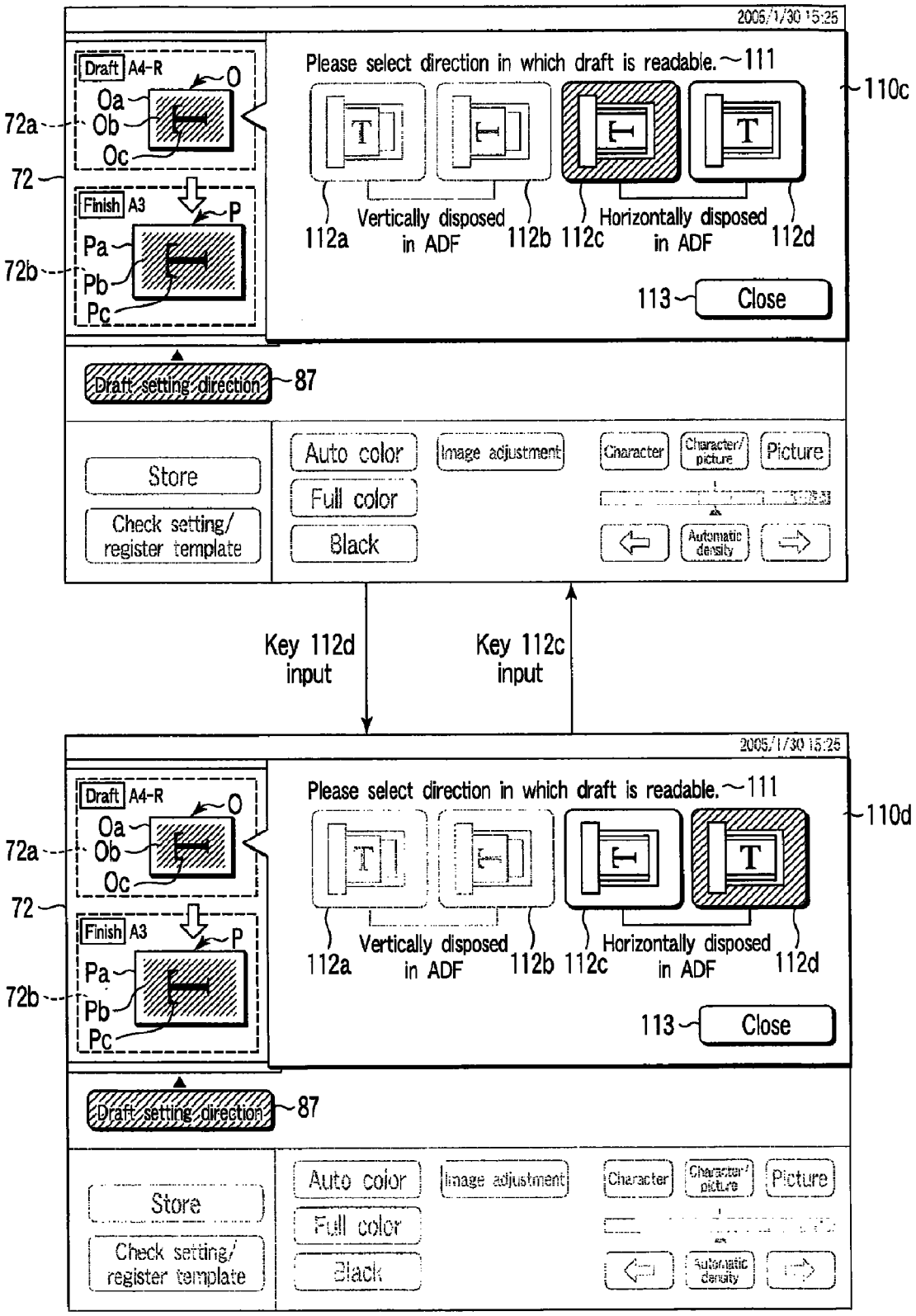
FIG. 11 is a diagram showing a display example of a draft direction setting screen in a case where a draft horizontally set in the ADF is detected.

FIGS. 10 and 11 are diagrams showing display examples of a draft direction setting screen 110 in a case where the ADF draft size detecting function is valid.

FIG. 10 is a diagram showing a display example of the draft direction setting screen 110 (110a, 110b) in a case where the draft setting as the detection result of the ADF draft size detecting function is "A4 and vertical (vertically disposed)" and the sheet setting is "A3 and horizontal". Here, it is assumed that the vertically disposing means a state in which the draft is set in the ADF 31 so that the direction of the draft conveyed by the ADF 31 is perpendicular to a longitudinal direction of the draft.

Moreover, FIG. 11 is a diagram showing a display example of the draft direction setting screen 110 (110c, 110d) in a case where the draft setting is "A4 and horizontal (horizontal disposed)" which is the detection result of the ADF draft size detecting function and the sheet setting is "A3 and horizontal". Here, it is assumed that the horizontally disposing means a state in which the draft is set in the ADF 31 so that the direction of the draft conveyed by the ADF 31 is parallel to the longitudinal direction of the draft.

The draft direction setting screen 110 (110a, 110b, 110c, and 110d) is displayed as a popup window in a partial area of the basic screen 70 as shown in FIGS. 10 and 11. The draft direction setting screen 110 displays a guidance display area 111, a vertically disposed portrait key 112a, a vertically disposed landscape key 112b, a horizontally disposed portrait key 112c, a horizontally disposed landscape key 112d, and a close key.

The draft direction setting screen 110 is displayed as the popup window in a state in which the first display area 72a, the second display area 72b and the draft setting key 87 of the basic screen 70 remain to be displayed. Furthermore, the draft direction setting screen 110 is associated with the first display area 72a by symbols, graphics or the like. In the first display area 72a, the draft graphical image O is displayed in accordance with the draft setting described later. In the second display area 72b, the finished graphical image P is displayed in accordance with the sheet setting.

The guidance display area 111 displays a guidance indicating that the direction of the image in the draft be selected. The close key is touched in a case where the setting is ended. When the close key 113 is touched, in the display section 22, the draft direction setting screen 110 is closed, and the basic screen 70 is displayed in which the set contents are reflected.

It is to be noted that in a case where the draft direction setting screen 110 is displayed, the storage key, color mode setting section, image adjustment key, draft mode setting section, density setting portion and the like in the basic screen 70b are displayed to be thin, and displayed in a state (whiteout) in which they cannot be selected.

Moreover, in the display example shown in FIGS. 10 and 11, the sheet setting is set to be "A3 and horizontal". Therefore, in a case where the draft is set to be "A4 and vertical", that is, the draft having the size "A4" is "vertically disposed", as shown in FIG. 10, the printed image area image Pb protrudes from a region of the finished state image Pa in the finished graphical image P displayed in the second display area 72b.

On the other hand, in a case where the draft is set to be "A4 and horizontal", that is, the draft having the size "A4" is "horizontally disposed", as shown in FIG. 11, the printed image area image Pb falls in a region of the finished state image Pa in the finished graphical image P displayed in the second display area 72b.

To notify the user of the finished state with respect to such draft setting direction, in a case where the printed image area image Pb protrudes from the region of the finished state image Pa, the CPU 51 displays the guidance display section G as shown in FIG. 10. As shown in FIG. 10, the guidance display section G displays an operation guidance so that the whole draft image falls in the sheet. In the example shown in FIG. 10, the guidance display section G displays a guidance indicating "when the way (vertical/horizontal) to set the draft is changed, the finished print region changes". This guidance is an operation guidance to change the draft setting direction so that the whole draft image is printed on the sheet.

It is to be noted that there will be described later in detail the set processing of the draft graphical image O and the set processing of the finished graphical image including the guidance display section G.

Moreover, in a case where the ADF draft size detecting function is valid in the draft direction setting screen 110, as shown in FIG. 10 or 11, a selectable key is limited based on the draft setting direction detected by the ADF draft size detecting function.

For example, as shown in FIG. 10, in a case where the draft vertically set in the ADF 31 is detected, the vertically disposed portrait key 112a and the vertically disposed landscape key 112b are displayed in selectable states (become valid). In this case, the horizontally disposed portrait key 112c and the horizontally disposed landscape key 112d are displayed to be thin, and displayed in non-selectable states (whiteout).

Moreover, as shown in FIG. 11, in a case where the draft horizontally set in the ADF 31 is detected, the horizontally disposed portrait key 112c and the horizontally disposed landscape key 112d are displayed in the selectable states (become valid) in the draft direction setting screen 110 (110c, 110d). In this case, the vertically disposed portrait key 112a and the vertically disposed landscape key 112b are displayed to be thin, and displayed in non-selectable states (whiteout).

The vertically disposed portrait key 112a is a key to be selected in a case where the direction of the image in the draft vertically disposed in the ADF 31 is that of the portrait. When the vertically disposed portrait key 112a is touched, the draft (set in the ADF 31) is set to the vertically disposed portrait. In this case, the draft graphical image O displayed in the first display area 72a indicates "the draft size and the vertically disposed portrait". It is to be noted that in the draft graphical image O, the draft size and setting direction are indicated by the draft state image Oa, and the direction of the image in the draft is indicated by the draft image area image Ob and the image direction mark Oc.

For example, in the draft direction setting screen 110a shown in FIG. 10, the vertically disposed portrait key 112a is brought into the selected state. In this draft direction setting screen 110a, the first display area 72a displays the draft graphical image O indicating "A4, vertically disposed, and portrait", and the second display area 72b displays the finished graphical image P indicating "A3, horizontal, and portrait" and corresponding to the draft graphical image O. Furthermore, in the finished graphical image P of the draft direction setting screen 110a, the printed image area image Pb protrudes from the finished state image Pa, and the guidance display section G is displayed.

The vertically disposed landscape key 112b is a key to be selected in a case where the direction of the image in the draft vertically disposed in the ADF 31 is that of the landscape. When the vertically disposed landscape key 112b is touched, the draft (set in the ADF 31) is set to the vertically disposed landscape draft. In this case, the draft graphical image O displayed in the display area 72a indicates "draft size, the vertically disposed, and landscape".

For example, in the draft direction setting screen 110b shown in FIG. 10, the vertically disposed landscape key 112b is brought into the selected state. In this draft direction setting screen 110b, the first display area 72a displays the draft graphical image O indicating "A4, vertically disposed, and landscape", and the second display area 72b displays the finished graphical image P indicating "A3, horizontal, and landscape (corresponding to draft)" and corresponding to the draft graphical image O. Furthermore, in the finished graphical image P of the draft direction setting screen 101b, the printed image area image Pb protrudes from the finished state image Pa, and the guidance display section G is displayed.

The horizontally disposed portrait key 112c is a key to be selected in a case where the direction of the image in the draft horizontally disposed in the ADF 31 is that of the portrait. When the horizontally disposed portrait key 112c is touched, the draft (set in the ADF 31) is set to a horizontally disposed portrait draft. In this case, the draft graphical image displayed in the display area 72a indicates "draft size, horizontally disposed, and portrait".

For example, in the draft direction setting screen 110c shown in FIG. 11, the horizontally disposed portrait key 112c is brought into the selected state. In this draft direction setting screen 110c, the first display area 72a displays the draft graphical image O indicating "A4, horizontally disposed, and portrait", and the second display area 72b displays the finished graphical image P indicating "A3, horizontal, and portrait" and corresponding to the draft graphical image O. In the finished graphical image P of the draft direction setting screen 110c, the printed image area image Pb is displayed in the finished state image Pa. Therefore, the guidance display section G is not displayed.

The horizontally disposed landscape key 112d is a key to be selected in a case where the direction of the image in the draft horizontally disposed in the ADF 31 is that of the landscape. When the horizontally disposed landscape key 112d is touched, the draft (set in the ADF 31) is set to the horizontally disposed landscape draft. In this case, the draft graphical image O displayed in the display area 72a indicates "draft size, horizontally disposed, and landscape".

For example, in the draft direction setting screen 110d shown in FIG. 11, the horizontally disposed landscape key 112d is brought into the selected state. In this draft direction setting screen 110d, the first display area 72a displays the draft graphical image O indicating "A4, horizontally disposed, and landscape", and the second display area 72b displays the finished graphical image P indicating "A3, horizontal, and landscape (corresponding to the draft)" and corresponding to the draft graphical image O. In the finished graphical image P of the draft direction setting screen 110d, the printed image area image Pb is displayed in the finished state image Pa. Therefore, the guidance display section G is not displayed.

It is to be noted that as to the direction of the image in the draft, a default may be set to the portrait or the landscape. For example, in a case where the direction of the image in the draft is set as the default to the portrait, when the ADF draft size detecting function detects the vertically disposed draft, the draft setting is set as default setting to the vertically disposed portrait draft.

Next, there will be described draft setting in a case where the ADF draft size detecting function is invalid.

Figure 12:
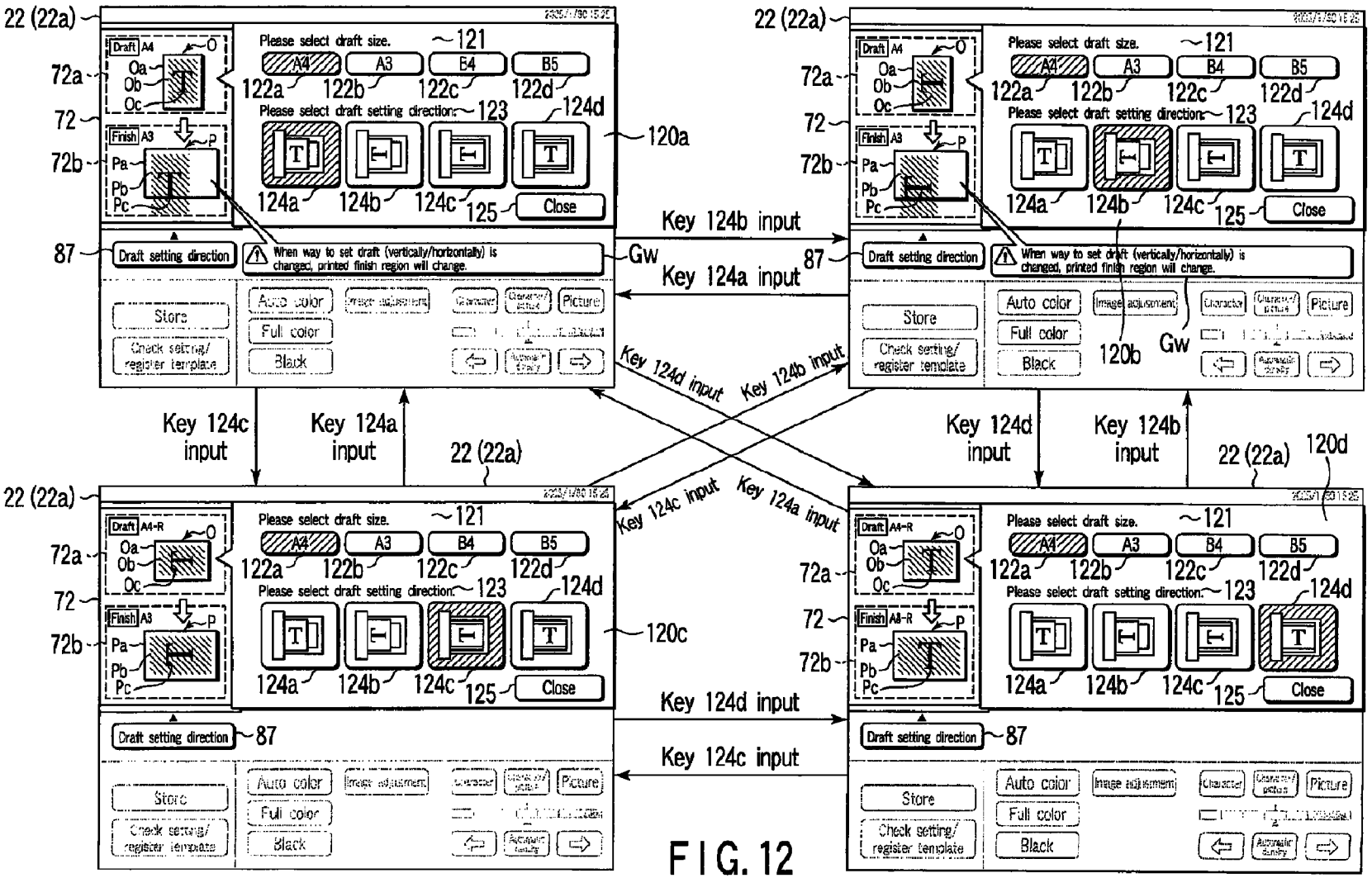
FIG. 12 is a diagram showing a display example of a draft setting screen in a case where an ADF draft size detecting function is invalid.

FIG. 12 is a diagram showing display examples of a draft direction setting screen 120 (120a, 120b, 120c, and 120d) in a case where a draft size detecting function is invalid which detects the size of the draft set in the ADF 31. When the draft size detecting function of detecting the size of the draft set in the ADF is invalid, the size and the direction of the draft set in the ADF 31 are set in the draft direction setting screens 120 (120a, 120b, 120c, and 120d) shown in FIG. 12.

As shown in FIG. 12, the draft direction setting screen 120 is displayed as a popup window in the basic screen 70. The draft direction setting screen 120 displays: a guidance display area 121; a draft size key 122 (an "A4" key 122a, an "A3" key 122b, a "B4" key 122c, and a "B5" key 122d); a guidance display area 123; a draft setting direction key 124 (a vertically disposed portrait key 124a, a vertically disposed landscape key 124b, a horizontally disposed portrait key 124c, and a horizontally disposed landscape key 124d); and a close key 125.

Moreover, the draft direction setting screen 120 is displayed as the popup window so that the first display area 72a, the second display area 72b and the draft setting key 87 in the basic screen 70 remain to be displayed. Furthermore, the draft direction setting screen 120 is displayed in association with the first display area 72a by marks, graphics or the like. It is to be noted that when the draft direction setting screen 120 is displayed, the ADF draft size detecting function is invalid.

Therefore, the draft setting key 87 is constituted of an icon in which "draft size/direction" is displayed It is to be noted that in a state in which the draft direction setting screen 120 is displayed, keys, guidance displays and the like other than the first display area 72a, the second display area 72b and the draft setting key 87 in the basic screen 70 are displayed to be thin, and they are displayed in a state in which they cannot be selected (whiteout).

The guidance display area 121 displays a guidance indicating that the draft size be selected. The draft size key 122 is constituted of the "A4" key 122a, the "A3" key 122b, the "B4" key 122c, and the "B5" key 122d. The "A4" key 122a, the "A3" key 122b, the "B4" key 122c and the "B5" key 122d are keys for selecting "A4", "A3", "B4", and "B5" as the draft sizes, respectively.

The draft setting direction key 124 is constituted of the vertically disposed portrait key 124a, the vertically disposed landscape key 124b, the horizontally disposed portrait key 124c, and the horizontally disposed landscape key 124d.

The vertically disposed portrait key 124a is a key to be selected in a case where the draft set in the ADF 31 is vertically disposed, and the direction of the image in the draft is that of the portrait. When the vertically disposed portrait key 124a is touched, the draft (set in the ADF 31) is set to "vertically disposed portrait". In this case, the first display area 72a displays the graphical image O indicating the vertically disposed draft of the portrait.

For example, in the draft direction setting screen 120a shown in FIG. 12, the vertically disposed portrait key 124a is brought into the selected state. In this draft direction setting screen 120a, the first display area 72a displays the draft graphical image O indicating "A4, vertically disposed, and portrait", and the second display area 72b displays the finished graphical image P indicating "A3, horizontal, and portrait" and corresponding to the draft graphical image O. Furthermore, in the finished graphical image P of the draft direction setting screen 120a, the printed image area image Pb protrudes from the finished state image Pa, and the guidance display section G is displayed.

The vertically disposed landscape key 124b is a key to be selected in a case where the draft set in the ADF 31 is vertically disposed, and the direction of the image in the draft is that of the landscape. When the vertically disposed landscape key 124b is touched, the draft (set in the ADF) is set to the vertically disposed landscape draft. In this case, the first display area 72a displays the graphical image O indicating the vertically disposed draft of the landscape.

For example, in the draft direction setting screen 120b shown in FIG. 12, the vertically disposed landscape key 124b is brought into the selected state. In this draft direction setting screen 120b, the first display area 72a displays the draft graphical image O indicating "A4, vertically disposed, and landscape", and the second display area 72b displays the finished graphical image P indicating "A3, horizontal, and landscape (corresponding to the draft)" and corresponding to the draft graphical image O. Furthermore, in the finished graphical image P of the draft direction setting screen 120b, the printed image area image Pb protrudes from the finished state image Pa, and the guidance display section G is displayed.

The horizontally disposed portrait key 112c is a key to be selected in a case where the draft set in the ADF is horizontally disposed and the direction of the image in the draft is that of the portrait. When the horizontally disposed portrait key 112c is touched, the draft (set in the ADF) is set to the horizontally disposed portrait draft. In this case, the first display area 72a displays the graphical image O of the horizontally disposed draft of the portrait.

The horizontally disposed portrait key 124c is a key to be selected in a case where the direction of the image in the draft horizontally disposed in the ADF 31 is that of the portrait. When the horizontally disposed portrait key 124c is touched, the draft (set in the ADF 31) is set to the horizontally disposed portrait draft. In this case, the draft graphical image displayed in the first display area 72a indicates "draft size, horizontally disposed, and portrait".

For example, in the draft direction setting screen 120c shown in FIG. 12, the horizontally disposed. portrait key 124c is brought into the selected state. In this draft direction setting screen 120c, the first display area 72a displays the draft graphical image O indicating "A4, horizontally disposed, and portrait", and the second display area 72b displays the finished graphical image P indicating "A3, horizontal, and portrait (corresponding to the draft)" and corresponding to the draft graphical image O. In the finished graphical image P of the draft direction setting screen 120c, the printed image area image Pb is displayed in the finished state image Pa. Therefore, the guidance display section G is not displayed.

The horizontally disposed landscape key 124d is a key to be selected in a case where the draft set in the ADF 31 is horizontally disposed and the direction of the image in the draft is that of the landscape. When the horizontally disposed landscape key 124d is touched, the draft (set in the ADF) is set to "horizontally disposed and landscape". In this case, the first display area 72a displays the draft graphical image O indicating "draft size, horizontally disposed, and landscape".

For example, in the draft direction setting screen 120b shown in FIG. 12, the horizontally disposed landscape key 124d is brought into the selected state. In this draft direction setting screen 120d, the first display area 72a displays the draft graphical image O indicating "A4, horizontally disposed, and landscape", and the second display area 72b displays the finished graphical image P indicating "A3, horizontal, and landscape (corresponding to the draft)" and corresponding to the draft graphical image O. Furthermore, in the finished graphical image P of the draft direction setting screen 120d, the printed image area image Pb is displayed in the finished state image Pa. Therefore, the guidance display section G is not displayed.

Next, there will be described a processing example of draft set processing.

Here, as the processing example of the draft set processing, there will be described the draft set processing in a case where the ADF draft size detecting function is valid.

Figure 13:
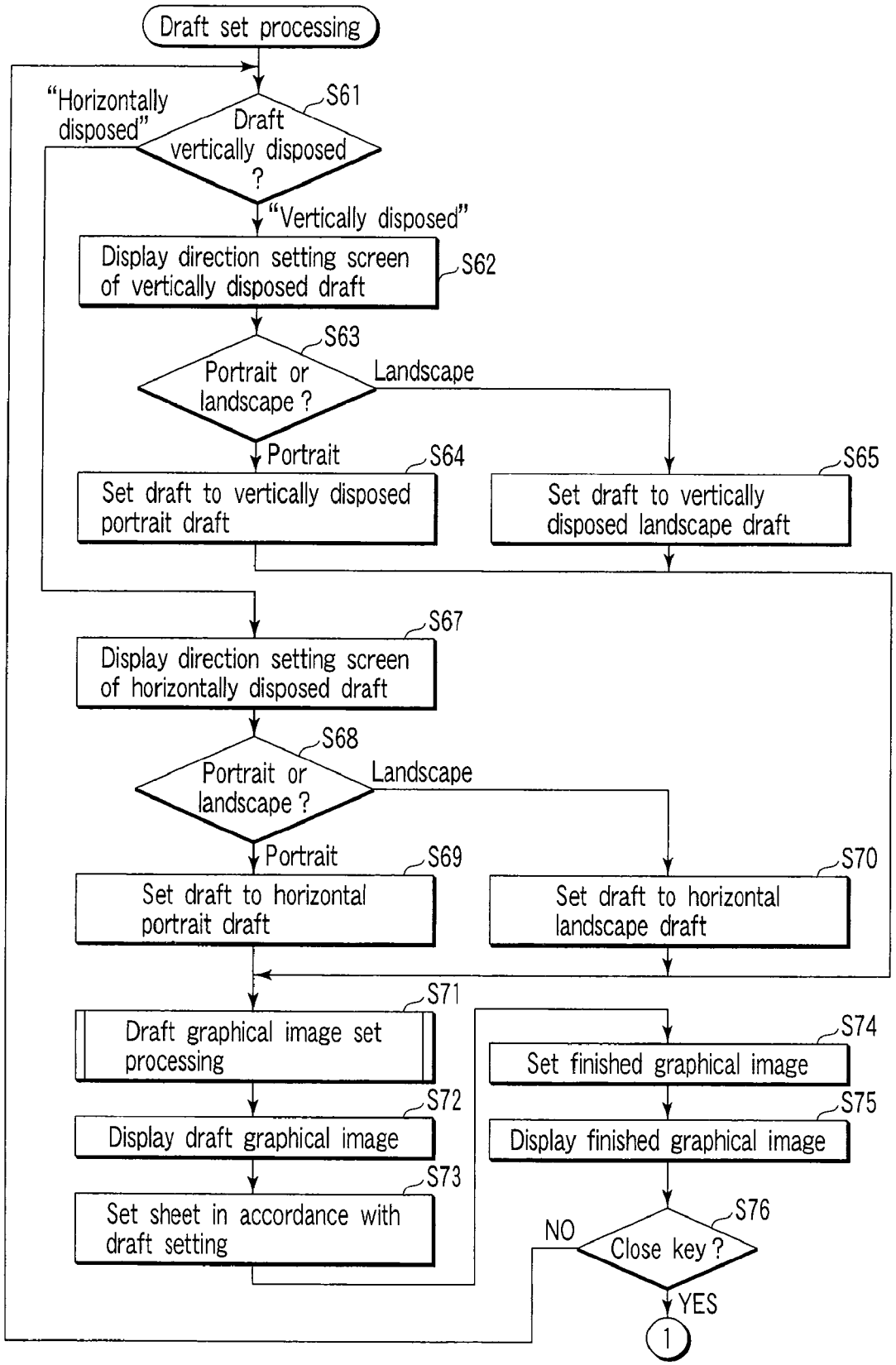
FIG. 13 is a flowchart showing a processing example of draft set processing.

FIG. 13 is a flowchart showing a processing example of the draft set processing in a state in which the draft direction setting screen 110 shown in FIG. 10 or 11 is displayed.

When the draft setting key 87 is touched in the basic screen 70, the CPU 51 of the system control unit 11 performs the draft set processing in response to user's instruction. As described above, when the ADF draft size detecting function is valid, the CPU 51 selectively displays, in the display section 22, a draft setting direction setting screen in accordance with a way to set the draft in the ADF 31, which is judged by the ADF draft size detecting function.

That is, in a case where the draft setting key 87 is touched, when the ADF draft size detecting function detects the "vertically disposed" draft (step S61, "vertically disposed"), the CPU 51 displays, in the display section 22, the setting screen 110 (110a or 110b) for setting the direction of the image in the vertically disposed draft (step S62).

In a case where the portrait is selected as the direction of the image in the vertically disposed draft, that is, the user touches the vertically disposed portrait key 112a in the draft direction setting screen 110b (step S63, portrait), the CPU 51 sets the direction of the image in the draft to that of the portrait (step S64).

When the direction of the image in the draft is set to that of the portrait, the CPU 51 sets the graphical image corresponding to the present draft setting (step S71). In this case, as the draft setting, at least the draft size, the vertically disposed draft, and the portrait are set. Therefore, the CPU 51 sets, as the draft graphical image, a graphical image indicating at least the draft size, the vertically disposed draft, and the portrait. In this case, the CPU 51 displays the set graphical image as the draft graphical image O in the first display area 72a (step S72).

Moreover, in a case where the landscape is selected as the direction of the image in the vertically disposed draft, that is, the user touches the vertically disposed landscape key 112b in the draft direction setting screen 110a (step S63, landscape), the CPU 51 sets the direction of the image in the draft to that of the landscape (step S65).

When the direction of the image in the draft is set to that of the landscape, the CPU 51 sets the graphical image corresponding to the draft setting (step S71). In this case, as the draft setting, at least the draft size, the vertically disposed draft and the landscape are set. Therefore, the CPU 51 sets, as the draft graphical image O, a graphical image indicating at least the draft size, the vertically disposed draft and the landscape. In this case, the CPU 51 displays the set graphical image as the draft graphical image O in the first display area 72a (step S72).

Moreover, in a case where the draft setting key 87 is touched, when the ADF draft size detecting function detects the "horizontally disposed" draft (step S61, "horizontally disposed"), the CPU 51 displays, in the display section 22, the setting screen 110c or 110d for setting the direction of the image in the horizontally disposed draft as shown in FIG. 11. It is to be noted that in a case where the draft setting key 87 is touched, when the draft is horizontally disposed, the CPU 51 displays either the draft direction setting screen 110c or 110d based on default setting.

In a case where the portrait is selected as the direction of the image in the horizontally disposed draft, that is, the user touches the horizontally disposed portrait key 112c in the draft direction setting screen 110d (step S68, portrait), the CPU 51 sets the direction of the image in the draft to that of the portrait (step S69).

When the direction of the image in the draft is set to that of the portrait, the CPU 51 sets the graphical image corresponding to the present draft setting (step S71). In this case, as the draft setting, at least the draft size, the horizontally disposed draft and the portrait are set. Therefore, the CPU 51 sets, as the draft graphical image O, a graphical image indicating at least the draft size, the horizontally disposed draft and the portrait. In this case, the CPU 51 displays the set graphical image as the draft graphical image O in the first display area 72a (step S72).

Moreover, in a case where the landscape is selected as the direction of the image in the horizontally disposed draft, that is, the user touches the horizontally disposed landscape key 112d in the draft direction setting screen 110c (step S68, landscape), the CPU 51 sets the direction of the image in the draft to that of the landscape (step S70).

When the direction of the image in the draft is set to that of the landscape, the CPU 51 sets the graphical image corresponding to the draft setting (step S71). IN this case, as the draft setting, at least the draft size, the horizontal disposed draft and the landscape are set. Therefore, the CPU 51 sets, as the draft graphical image O, a graphical image indicating at least the draft size, the horizontally disposed draft and the landscape. When such draft graphical image O is set, the CPU 51 displays the set graphical image as the draft graphical image O in the first display area 72a (step S72).

Moreover, when the draft setting is changed in the step S64, S65, S69 or S70, the CPU 51 also changes the sheet setting (finished setting) in accordance with the change of the draft setting (step S73). For example, when the draft setting direction (vertically or horizontally disposed draft) is changed, an area of the sheet to be printed is changed as the sheet setting. This is reflected in the printed image area image of the finished graphical image P. In a case where the direction of the image in the draft (portrait or landscape) is changed, as the sheet setting, the direction of the printed image is changed to a direction corresponding to the direction of the draft image (portrait or landscape), which is set contents to be reflected in the printed image direction mark Pc of the finished graphical image P.

When the sheet setting is changed in accordance with the change of the draft setting, the CPU 51 sets the finished graphical image (step S74). When the finished graphical image P is set by this set processing, the CPU 51 displays the set finished graphical image P in the second display area 72b (step S75).

The processing of the steps S61 to S75 is executed until the close key 113 is touched. That is, when the user touches the close key 113 (step S76, YES), the CPU 51 closes the draft direction setting screen 110 (110a, 110b, 110c, or 110d). In a case where the draft image direction setting screen 110 is closed, the display section 22 displays a setting screen which is to shift to the draft direction setting screen 110 in which the present set contents are reflected.

That is, in a case where the user touches the draft setting key 87 of the basic screen 70 to shift to the draft direction setting screen 110, when the user touches the close key 113 of the draft direction setting screen 110, the CPU 51 displays, in the display section 22, the basic screen 70 in which the set contents are reflected. In a case where the user touches the draft setting key of another setting screen to shift to the draft direction setting screen 110, when the user touches the close key of the draft direction setting screen 110, the CPU 51 displays, in the display section 22, the setting screen which is to shift to the draft direction setting screen 110 in which the set contents are reflected.

Moreover, in a case where the above-described draft set processing sets the direction of the image in the draft to be different from the default setting, the CPU 51 displays, in the basic screen 70 or another setting screen, the draft setting key 87 in a specific color which is different from that of the default setting state. For example, in the default setting state, the draft setting key 87 is displayed in white. In a setting state which is different from the default setting state, the draft setting key 87 is displayed in blue.

As described above, in the basic screen 70 and another setting screen, there is displayed, in the specific color, the setting key corresponding to the setting particular brought into a setting different from the default setting. In consequence, the user can easily recognize the setting particular brought into the setting different from the default setting.

Next, there will be described setting of a photocopy side (single-sided/double-sided).

Here, the photocopy side means the surface of the draft to be read (single-sided or double-sided) and the surface of the sheet to be printed (single-sided or double-sided). That is, photocopy side set processing sets the surface of the draft to be read (single-sided or double-sided) and the surface of the sheet to be printed (single-sided or double-sided).

Figure 14:
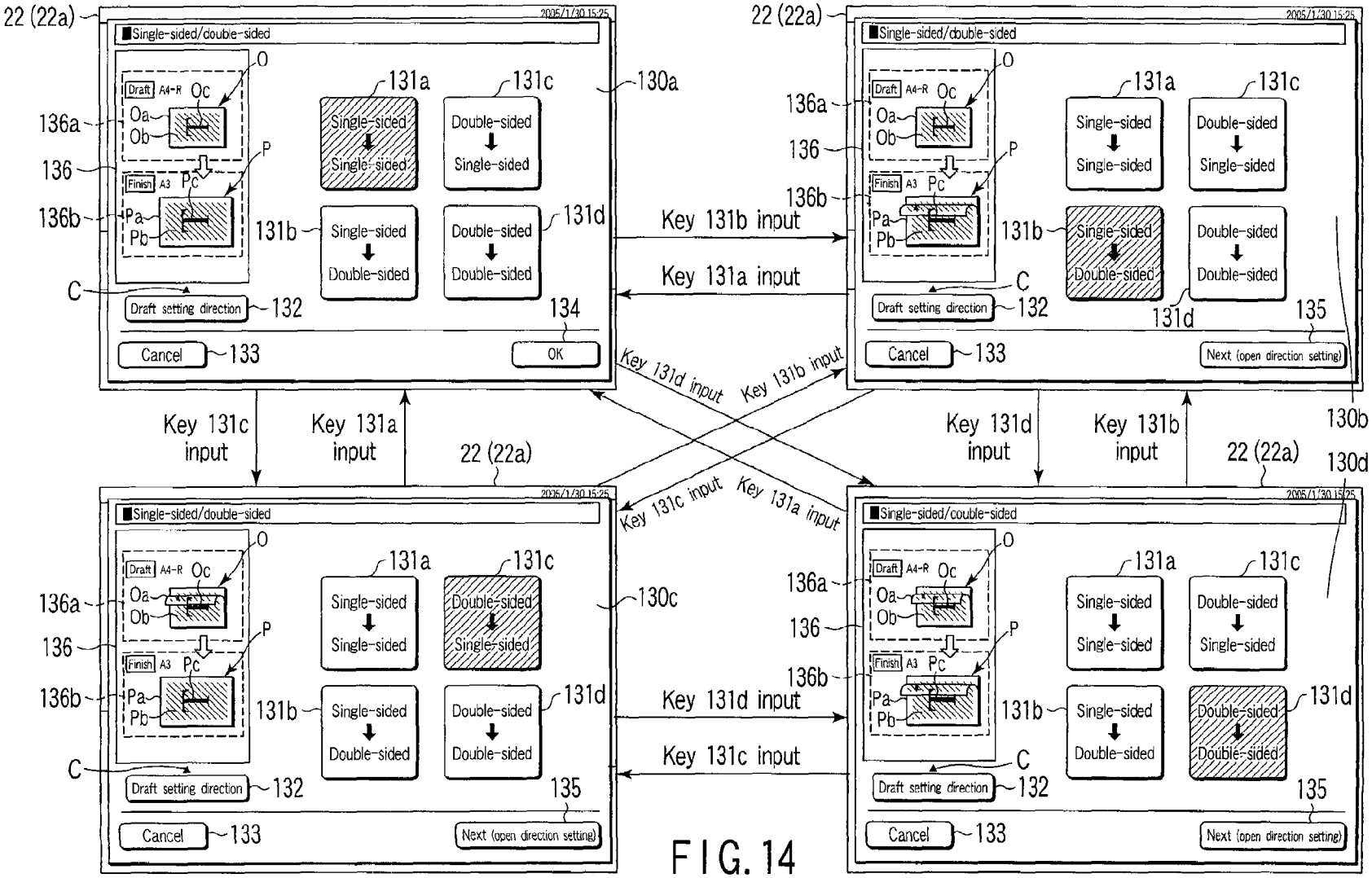
FIG. 14 is a diagram showing a display example of a photocopy side setting screen for setting a photocopy side.

FIG. 14 is a diagram showing display examples of a photocopy side setting screen 130 (130a, 130b, 130c, and 130d) for setting the photocopy side. It is to be noted that the draft setting is "A4 and horizontal" and the sheet setting is "A3 and horizontal" in the display examples of the respective photocopy side setting screens 130a, 130b, 130c and 130d shown in FIG. 14.

In the photocopy side setting screen 130, as shown in FIG. 14, there are displayed touch keys such as: a single-sided to single-sided key 131a; a single-sided to double-sided key 131b; a double-sided to single-sided key 131c; a double-sided to double-sided key 131d; a draft setting key 132; a cancel key 133; an "OK" key 134; and an open direction setting key 135. Furthermore, the photocopy side setting screen 130 is provided with a display area 136 having a first display area 136a and a second display area 136b.

The single-sided to single-sided key 131a is a touch key for instructing a mode to successively photocopy an image of the single side of the draft to the single side of the sheet. The single-sided to double-sided key 131b is a touch key for instructing a mode to successively photocopy the image of the single side of the draft to the double sides of the sheet. The double-sided to single-sided key 131c is a touch key for instructing a mode to successively photocopy images of the double sides of the draft to the single side of the sheet. The double-sided to double-sided key 131d is a touch key for instructing a mode to successively photocopy the images of the double sides of the draft to the double sides of the sheet.

The draft setting key 132 is a key to be touched in a case where the direction of the image in the draft is set. The draft setting key 132 is disposed in the vicinity of the display area 136 in which the draft graphical image O and the finished graphical image P are displayed. Furthermore, the draft setting key 132 is associated with the display area 136 by the graphic C.

The cancel key 133 is a key to be touched in a case where the setting of the photocopy side is stopped. The "OK" key 134 is a key to be touched in a case where the setting of the photocopy side is completed. The open direction setting key 135 is constituted of an icon in which "next (open direction setting)" is displayed. The open direction setting key 135 is a key to be touched in a case where an open direction of the double-sided draft or an open direction of the double-sided sheet is set.

It is to be noted that either the "OK" key 134 or the open direction setting key 135 is selectively displayed. That is, in a case where both of the draft setting and the sheet setting are single-sided, in the photocopy side setting screen 130, the open direction setting key 135 is not displayed, and the "OK" key 134 is displayed. When either the draft setting or the sheet setting is double-sided, in the photocopy side setting screen 130, the "OK" key 134 is not displayed, and the open direction setting key 135 is displayed.

The display area 136 has a constitution similar to that of the display area 72 of the basic screen 70. A position (upper left area in a screen) of the display area 136 in the photocopy side setting screen 130 is substantially similar to that (upper left area in a screen) of the display area 72 in the basic screen 70.

In the first display area 136a, the draft graphical image O and the like are displayed as information indicating the present draft setting in the same manner as in the first display area 72a. In the second display area 136b, the finished graphical image P and the like are displayed as information indicating the present sheet setting in the same manner as in the second display area 72b.

For example, when the draft is set to be single-sided, that is, the single-sided to single-sided key 131a or the single-sided to double-sided key 131b is selected, in the first display area 136a, the draft graphical image O is displayed which indicates that the draft is single-sided as shown in the photocopy side setting screen 130a or 130b of FIG. 14. When the draft is set to be double-sided, that is, the double-sided to single-sided key 131c or the double-sided to double-sided key 131d is selected, in the first display area 136a, the draft graphical image O is displayed which indicates that the draft is double-sided as shown in the photocopy side setting screen 130c or 130d of FIG. 14.

Moreover, in a case where a sheet (finish) is set to be single-sided, that is, the single-sided to single-sided key 131a or the double-sided to single-sided key 131c is selected, in the second display area 136b, the finished graphical image P is displayed which indicates that the sheet is single-sided as shown in the photocopy side setting screen 130a or 130c of FIG. 14. In a case where the sheet (finish) is set to be double-sided, that is, the single-sided to double-sided key 131b or the double-sided to double-sided key 131d is selected, in the second display area 136b, the finished graphical image P is displayed which indicates that the draft is double-sided as shown in the photocopy side setting screen 130b or 130d of FIG. 14.

Moreover, as shown in FIG. 14, the draft setting key (icon) 132 is disposed in a position close to the display area 136 in which the draft graphical image O and the finished graphical image P are displayed. Furthermore, the draft setting key 132 is associated with the display area 136 by the triangular graphic C. Accordingly, in the photocopy side setting screen 130, the draft graphical image O and the finished graphical image P are displayed in the display area 136, and the draft setting key (icon) 132 for setting the draft is associated and displayed with the display area 136.

Furthermore, when the user indicates the draft setting key 132, the CPU 51 displays, in the display section 22, the draft direction setting screen 110 as a popup screen associated with the draft graphical image O to set the direction of the image in the draft. That is, in a case where the draft setting key 132 is displayed in the photocopy side setting screen 130, when the user sets the photocopy side, the user can immediately set the direction of the image in the draft without once ending the photocopy side setting screen 130. In a case where the image direction set processing is completed, the display section 22 closes the image direction setting screen 110 and displays the photocopy side setting screen 130. In other words, in the operation device of the present digital multifunctional photocopier, the direction of the image in the draft can be set during the setting of the photocopy side.

Next, there will be described a processing example of the photocopy side set processing.

Figure 15:
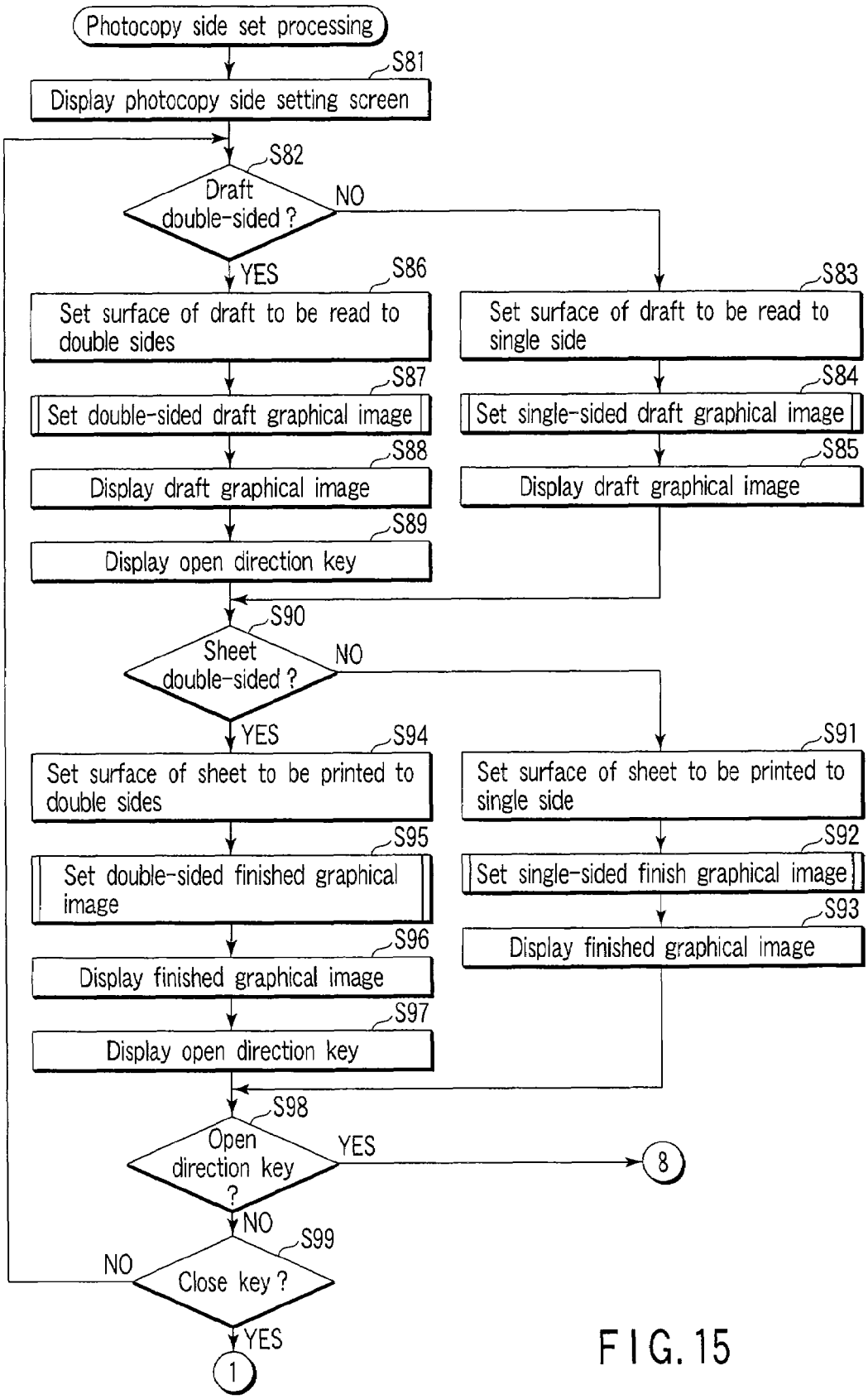
FIG. 15 is a flowchart showing a processing example of photocopy side set processing.

FIG. 15 is a flowchart showing a processing example of the photocopy side set processing in a state in which the photocopy side setting screen 130 is displayed as shown in FIG. 14.

When the photocopy side (single-sided/double-sided) key 83 is touched in the basic screen 70, the CPU 51 of the system control unit 11 displays, in the display section 22, the photocopy side setting screen 130 set beforehand to the photocopy side key 83 as described above.

For example, when the draft setting is "A4, horizontal" and the sheet setting is "A3, horizontal", the display section 22 displays the photocopy side setting screen 130 (the photocopy side setting screen 130a, 130b, 130c or 130d shown in FIG. 14, which corresponds to the present photocopy side setting) corresponding to the present photocopy side setting. For example, in a case where the default setting is that the draft is single-sided and the sheet is single-sided, when the single-sided/double-sided key 83 is touched in the default setting state, the display section 22 displays the photocopy side setting screen 130a (step S81). In a state in which such photocopy side setting screen 130 is displayed, the CPU 51 sets the photocopy side in response to an input into each key.

In a state in which the photocopy side setting screen 130 is displayed in the display section 22, the CPU 51 detects whether or not the draft setting key 132 has been touched. In a case where it is detected that the draft setting key 132 has been touched, the CPU 51 displays the draft direction setting screen in the display section 22, and sets the direction of the image in the draft as described above.

Moreover, when the single-sided to single-sided key 131a or the single-sided to double-sided key 131b is brought into the selected state (the user touches the single-sided to single-sided key 131a or the single-sided to double-sided key 131b) in the photocopy side setting screen 130c or 130d shown in FIG. 14, the CPU 51 judges that the single side is selected as the surface of the draft to be read (step S82, NO). When it is judged that the single side is selected as the surface of the draft to be read, the CPU 51 sets, as the draft setting, the surface of the draft to be read to the single side (step S83).

When the surface of the draft to be read is set to the single side, that is, the draft setting is changed, the CPU 51 sets the draft graphical image O in accordance with the present draft setting (step S84). In this case, the CPU 51 sets the single-sided graphical image as the draft graphical image O. When the draft graphical image O is set, the CPU 51 displays the set draft graphical image O in the first display area 136a (step S85).

Moreover, when the double-sided to single-sided key 131c or the double-sided to double-sided key 131d is brought into the selected state (the user touches the double-sided to single-sided key 131c or the double-sided to double-sided key 131d) in the photocopy side setting screen 130c or 130d shown in FIG. 14, the CPU 51 judges that double sides are selected as the surfaces of the draft to be read (step S82, YES). When it is judged that the double sides are selected as the surfaces of the draft to be read, the CPU 51 sets, as the draft setting, the surfaces of the draft to be read to the double sides (step S83).

When the surface of the draft to be read is set to the double sides, that is, the draft setting is changed, the CPU 51 sets the draft graphical image O in accordance with the present draft setting (step S84). In this case, the CPU 51 sets the double-sided graphical image as the draft graphical image O. When the draft graphical image O is set, the CPU 51 displays the set graphical image O in the first display area 136a (step S85).

Furthermore, when the surface of the draft to be read is set to the double sides, in the screen, the CPU 51 displays the open direction setting key 135 as shown in the photocopy side setting screen 130c or 130d of FIG. 14 (step S86).

When the single-sided to single-sided key 131a or the double-sided to single-sided key 131c is brought into the selected state (the user touches the single-sided to single-sided key 131a or the double-sided to single-sided key 131c) in the photocopy side setting screen 130a or 130c shown in FIG. 14, the CPU 51 judges that the single side is selected as the surface of the sheet to be printed (step S90, NO). When it is judged that the single side is selected as the surface of the sheet to be printed, the CPU 51 sets, as the sheet setting, the surface of the sheet to be printed to the single side (step S91).

When the surface of the sheet to be printed is set to the single side, the CPU 51 sets the finished graphical image P in accordance with the present sheet setting (step S92). In this case, the CPU 51 sets the single-sided graphical image as the finished graphical image P by the set processing of the finished graphical image P. When the finished graphical image P is set, the CPU 51 displays the set finished sheet graphical image in the second display area 136b (step S93).

In addition, when the single-sided to double-sided key 131b or the double-sided to double-sided key 131d is brought into the selected state (the user touches the single-sided to double-sided key 131b or the double-sided to double-sided key 131d) in the photocopy side setting screen 130b or 130d shown in FIG. 14, the CPU 51 judges that the double sides are selected as the surfaces of the sheet to be printed (step S90, YES). When it is judged that the double sides are selected as the surfaces of the sheet to be printed, the CPU 51 sets, as the sheet setting, the surfaces of the sheet to be printed to the double sides (step S94).

When the surface of the sheet to be printed is set to the double sides, that is, the sheet setting is changed, the CPU 51 sets the finished graphical image P in accordance with the present sheet setting. In this case, the CPU 51 sets the double-sided graphical image as the finished sheet graphical image P by the set processing of the finished graphical image P (step S95). When the finished graphical image P is set, the CPU 51 displays the set finished graphical image P in the second display area 136b (step S96).

Furthermore, when the surface of the sheet to be printed is set to the double sides, the CPU 51 displays the open direction setting key 135 in the screen as shown by the photocopy side setting screen 130b or 130d of FIG. 14 (step S97).

Moreover, when the open direction setting key 135 is touched in the photocopy side setting screen 130 in the step S89 or S97 (step S98, YES), the CPU 51 performs the open direction set processing as described later. When the cancel key 133 is touched, the CPU 51 closes the photocopy side setting screen 130 to end the photocopy side set processing, and displays the basic screen 70 in the display section 22.

Next, open direction set processing will be described.

Figure 16:
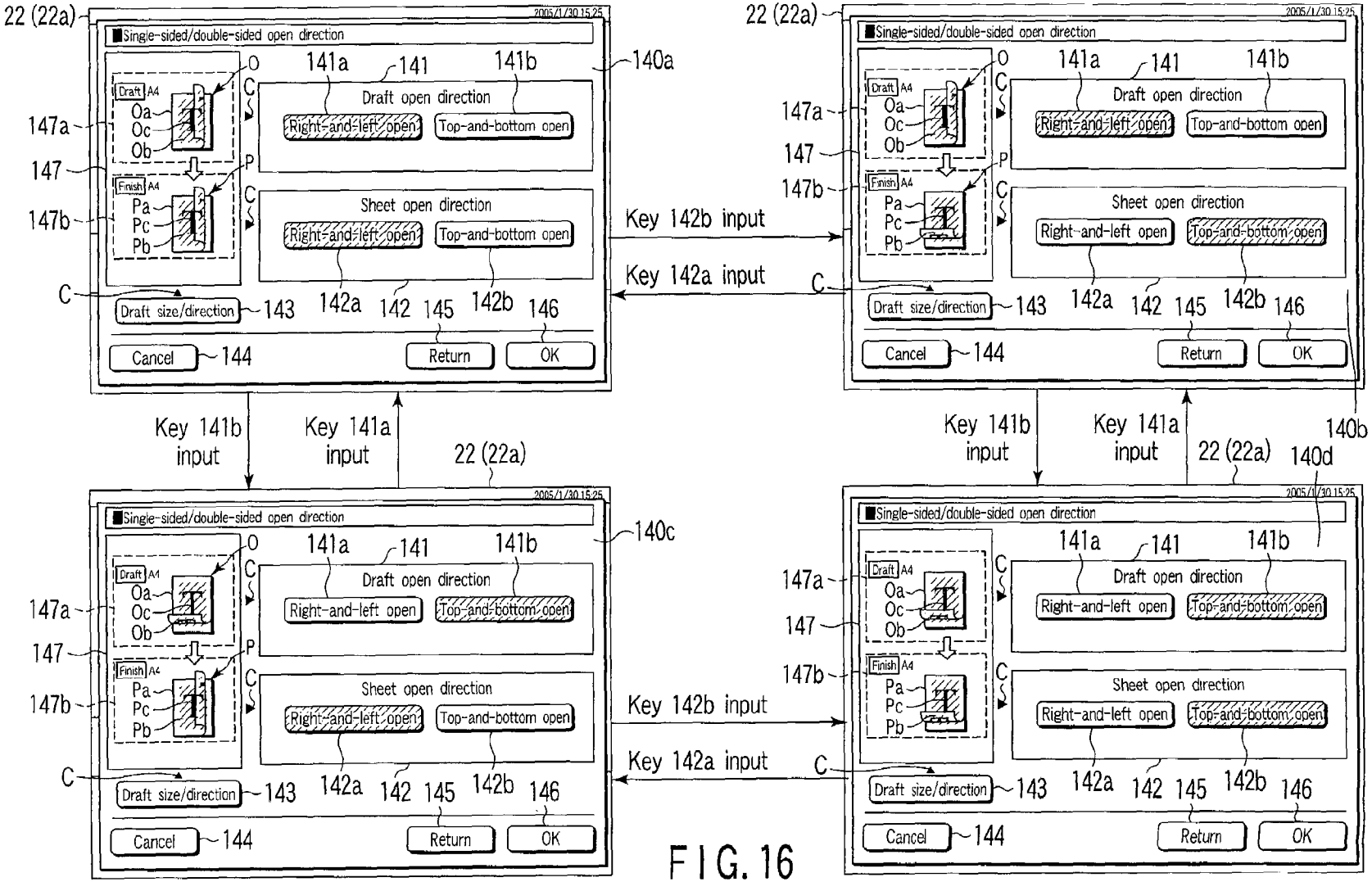
FIG. 16 is a diagram showing a display example of an open direction setting screen for setting an open direction.

FIG. 16 is a diagram showing display examples of an open direction setting screen 140 (140a, 140b, 140c, and 140d) for setting an open direction. It is assumed that in FIG. 16, the draft setting is "A4, horizontal and single-sided", and the sheet setting is "A3, horizontal and double-sided".

In the display example shown in FIG. 16, the open direction setting screen 140 displays: a draft open direction setting portion 141; a sheet open direction setting portion 142; a draft setting key 143; a cancel key 144; a "return" key 145; an "OK" key 146; a display area 147 and the like.

The draft open direction setting portion 141 is a display area for setting the open direction of the draft which is set to be double-sided. The draft open direction setting portion 141 is displayed only in a case where the draft is set to be double-sided. That is, when the draft is set to be single-sided and the sheet is set to be double-sided, the draft open direction setting portion 141 is not displayed in the open direction setting screen 140. The draft open direction setting portion 141 displays a right-and-left open key 141a and a top-and-bottom open key 141b together with a guidance "draft open direction".

Furthermore, the open direction setting screen 140 displays the draft open direction setting portion 141 which is associated with a first display area 147a where the draft graphical image O is displayed. In the example shown in FIG. 16, the draft open direction setting portion 141 is disposed in the vicinity of the first display area 147a where the draft graphical image O is displayed. Furthermore, the draft open direction setting portion 141 is associated and displayed with the first display area 147a (or the draft graphical image O displayed in the first display area 147a) by the triangular graphic C. In consequence, the user can intuitively and visually recognize that the draft open direction setting portion 141 indicates a setting concerning the draft.

The sheet open direction setting portion 142 is a display area for setting the open direction of the sheet which is set to be double-sided. The sheet open direction setting portion 142 is displayed only in a case where the sheet is set to be double-sided. That is, when the draft is set to be double-sided and the sheet is set to be single-sided, the sheet open direction setting portion 142 is not displayed in the open direction setting screen. The sheet open direction setting portion 142 displays a right-and-left open key 142a and a top-and-bottom open key 142b together with a guidance "sheet open direction".

Furthermore, the open direction setting screen 140 displays the sheet open direction setting portion 142 which is associated with a second display area 147b where the finished graphical image P is displayed. In the example shown in FIG. 16, the sheet open direction setting portion 142 is disposed in the vicinity of the second display area 147b where the finished graphical image P is displayed. Furthermore, the sheet open direction setting portion 142 is associated and displayed with the second display area 147b (or the finished graphical image P displayed in the second display area 147b) by the triangular graphic C. In consequence, the user can intuitively and visually recognize that the sheet open direction setting portion 142 indicates a setting concerning the finish (sheet).

The draft setting key 143 is a key to be touched in a case where the direction of the image in the draft is set in the same manner as in the draft setting key 87. The draft setting key 143 is disposed in the vicinity of the display area 147 where the draft graphical image O and the finished graphical image P are displayed. Furthermore, the draft setting key 143 is associated with the display area 147 by the graphic C.

The cancel key 144 is a key to be touched in a case where the setting of the photocopy side is stopped. The "return" key 145 is a key to be touched in returning to the photocopy side setting screen 130. The "OK" key 146 is a key to be touched in completing the setting of the photocopy side.

The display area 147 has a constitution similar to that of the display area 136 (or the first display area 72a). The first display area 147a displays the draft graphical image O and the like as information indicating the present draft setting in the same manner as in the first display area 136a (or the first display area 72a). The second display area 147b displays the finished graphical image P and the like as information indicating the present sheet setting in the same manner as in the second display area 136b (or the second display area 72b).

In a case where the sheet (finish) open direction is set to a right-and-left open direction, that is, the right-and-left open key 142a is selected, the second display area 147b displays the finished graphical image P indicating that the sheet is right-and-left open and double-sided as shown in the open direction setting screen 140a of FIG. 16. When the sheet (finish) open direction is set to a top-and-bottom open direction, that is, the top-and-bottom open key 142b is selected, the second display area 147b displays the finished graphical image P indicating that the sheet is top-and-bottom open and double-sided as shown in the open direction setting screen 140b of FIG. 16.

It is to be noted that when the draft is set to be single-sided and the sheet is set to be double-sided, the draft open direction setting portion 141 is not displayed, and the sheet open direction setting portion 142 is displayed in the open direction setting screen 140. When the draft is set to be double-sided and the sheet is set to be single-sided, the sheet open direction setting portion 142 is not displayed and the draft open direction setting portion 141 is displayed in the open direction setting screen 140. When the draft is set to be double-sided and the sheet is set to be double-sided, both of the draft open direction setting portion 141 and the sheet open direction setting portion 142 are displayed in the open direction setting screen 140.

Furthermore, as shown in FIG. 16, the draft setting key (icon) 143 is disposed in a position close to the display area 147 in which the draft graphical image O and the finished graphical image P are displayed. Furthermore, the draft setting key 143 is associated with the display area 147 by the triangular graphic C. Accordingly, in the open direction setting screen 140, the draft graphical image O and the finished graphical image P are displayed in the display area 147, and the draft setting key (icon) 143 for setting the draft is displayed in association with the display area 147.

Furthermore, when the user indicates the draft setting key 143, the CPU 51 displays, in the display section 22, the draft direction setting screen 110 as a popup screen associated with the draft graphical image O to set the direction of the image in the draft. That is, in a case where the draft setting key 143 is displayed in the photocopy side setting screen 140 as described above, when the user sets the open direction, the user can immediately set the direction of the image in the draft without once ending the open direction setting screen 140. In a case where the image direction set processing is completed, the display section 22 closes the image direction setting screen 110 and displays the open direction setting screen 140. In other words, in the operation device of the present digital multifunctional photocopier, the direction of the image in the draft can be set during the setting of the open direction.

Next, there will be described a processing example of open direction set processing.

Figure 17:
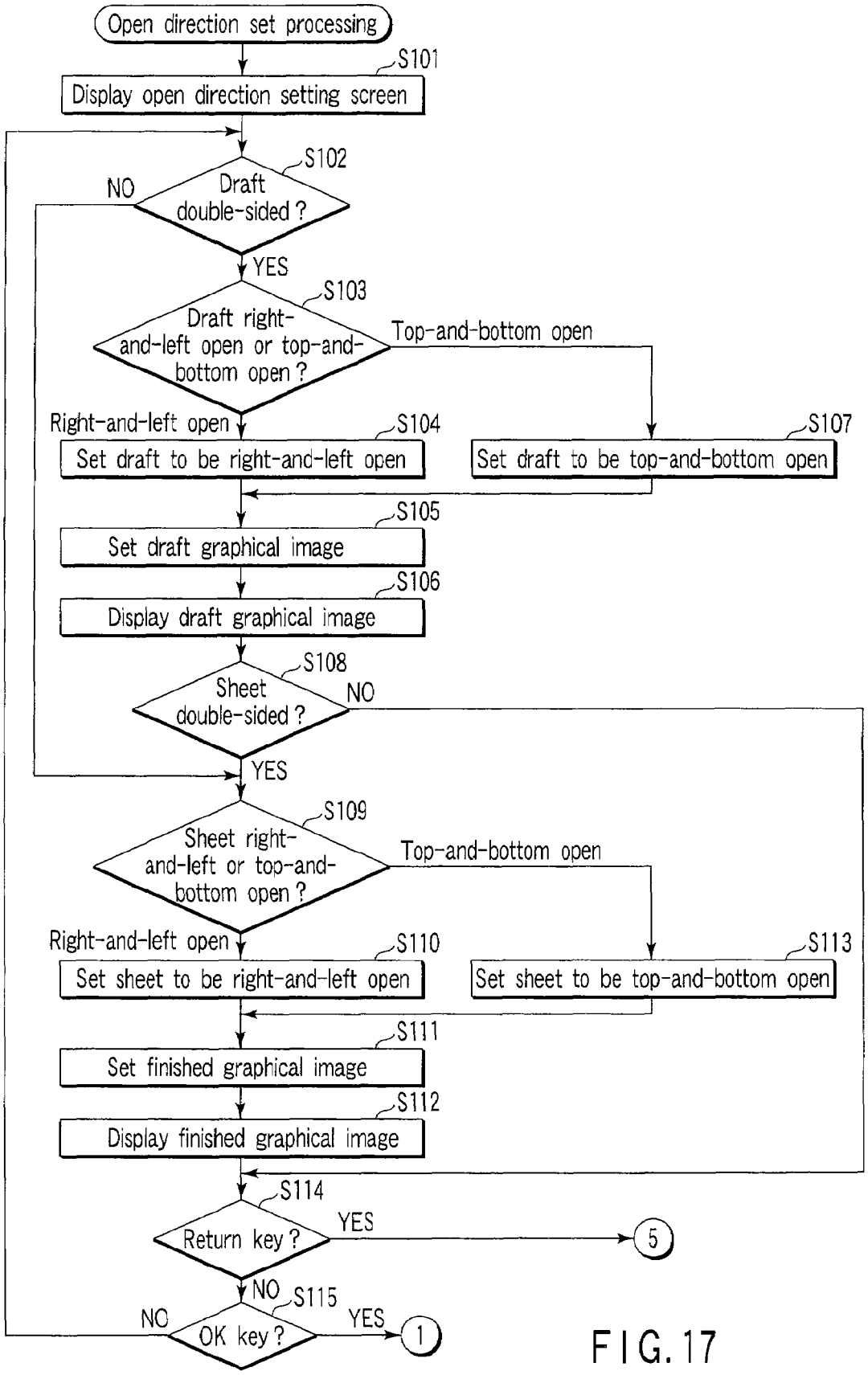
FIG. 17 is a flowchart showing a processing example of open direction set processing.

FIG. 17 is a flowchart showing a processing example of the open direction set processing in a state in which the open direction setting screen 140 is displayed as shown in FIG. 16.

In the open direction set processing, there are presumed: a case where the draft only is set to be double-sided; a case where the sheet only is set to be double-sided; and a case where both of the draft and the sheet are set to be double-sided.

In the following open direction set processing, it is assumed that the user selects the draft open direction by use of a right-and-left open key 141a of the draft open direction setting portion 141 for setting the draft to be right-and-left open or a top-and-bottom open key 141b of the draft open direction setting portion 141 for setting the draft to be top-and-bottom open. It is also assumed that the user selects the sheet open direction by the right-and-left open key 142a or the top-and-bottom open key 142b of the sheet open direction setting portion 142.

When the open direction setting key 135 is touched in the photocopy side setting screen 130, the CPU 51 of the system control unit 11 displays, in the display section 22, the open direction setting screen 140 as the second setting screen set beforehand to the open direction setting key 135 (step S101). In this open direction setting screen 140, the draft open direction setting portion 141 is displayed in the case where the draft only is double-sided, the sheet open direction setting portion 142 is displayed in the case where the sheet only is double-sided, and both of the draft open direction setting portion 141 and the sheet open direction setting portion 142 are displayed in the case where both of the draft and the sheet are double-sided.

In a state in which the open direction setting screen 140 is displayed in the display section 22, the CPU 51 detects whether or not the draft setting key 143 has been touched. In a case where it is detected that the draft setting key 143 has been touched, the CPU 51 displays the draft direction setting screen 110 as the popup screen in the open direction setting screen 140, and sets the direction of the image in the draft as described above.

Moreover, in a case where the draft is set to be double-sided (step S102, YES), when the right-and-left open key 141a is brought into a selected state in the draft open direction setting portion 141 of the open direction setting screen 140, the CPU 51 judges that the right-and-left open direction is selected as the draft open direction (step S103, right-and-left open). When it is judged that the right-and-left open direction is selected as the draft open direction, the CPU 51 sets the draft open direction to the right-and-left open direction as the draft setting (step S104).

When the draft open direction is set to the right-and-left open direction, that is, the draft setting is changed, the CPU 51 sets the draft graphical image O in accordance with the present draft setting (step S105). In this case, the CPU 51 sets, as the draft graphical image O, a graphical image indicating the right-and-left open and double-sided draft. When the draft graphical image O is set, the CPU 51 displays the set draft graphical image O in the first display area 147a (step S106).

Moreover, in a case where the draft is set to be double-sided (step S102, YES), when the top-and-bottom open key 141b is brought into a selected state in the draft open direction setting portion 141 of the open direction setting screen 140, the CPU 51 judges that the top-and-bottom open direction is selected as the draft open direction (step S103, top-and-bottom open). When it is judged that the top-and-bottom open direction is selected as the draft open direction, the CPU 51 sets the draft open direction to the right-and-left open direction as the draft setting (step S107).

When the draft open direction is set to the top-and-bottom open direction, that is, the draft setting is changed, the CPU 51 sets the draft graphical image O in accordance with the present draft setting (step S105). In this case, the CPU 51 sets, as the draft graphical image O, a graphical image indicating the top-and-bottom open and double-sided draft. When the draft graphical image O is set, the CPU 51 displays the set draft graphical image O in the first display area 147a (step S106).

Moreover, in a case where the draft is set to be double-sided (NO in step S102 or YES in step S108), when the right-and-left open key 142a is brought into the selected state in the sheet open direction setting portion 142 of the open direction setting screen 140, the CPU 51 judges that the right-and-left open direction is selected as the sheet open direction (step S109, right-and-left open). When it is judged that the right-and-left open direction is selected as the sheet open direction, the CPU 51 sets the sheet open direction to the right-and-left open direction as the sheet setting (step S110).

When the sheet open direction is set to the right-and-left open direction, that is, the sheet setting is changed, the CPU 51 sets the finished graphical image P in accordance with the present sheet setting (step S111). In this case, the CPU 51 sets, as the finished graphical image P, a graphical image indicating a right-and-left open and double-sided sheet. When the finished graphical image P is set, the CPU 51 displays the set finished graphical image P in the second display area 147b (step S112).

Moreover, in a case where the sheet is set to be double-sided (NO in step S102 or YES in step S108), when the top-and-bottom open key 142b is brought into the selected state in the sheet open direction setting portion 142 of the open direction setting screen 140, the CPU 51 judges that the top-and-bottom open direction is selected as the sheet open direction (step S109, top-and-bottom open). When it is judged that the top-and-bottom open direction is selected as the sheet open direction, the CPU 51 sets the sheet open direction to the top-and-bottom open direction as the sheet setting (step S113).

When the sheet open direction is set to the top-and-bottom open direction, that is, the sheet setting is changed, the CPU 51 sets the finished graphical image P in accordance with the present sheet setting (step S111). In this case, the CPU 51 sets, as the finished graphical image P, a graphical image indicating a top-and-bottom open and double-sided sheet. When the finished graphical image P is set, the CPU 51 displays the set finished graphical image P in the second display area 147b (step S112).

Furthermore, when the user touches the return key 145 (step S114, YES), the CPU 51 closes the open direction setting screen 140, and returns to the step S81. In this case, the display section 22 displays the photocopy side setting screen 130 in which the set open direction is reflected. When the user touches the OK key 134 (step S115, YES), the CPU 51 closes the open direction setting screen, and completes the open direction set processing and the photocopy side set processing. In this case, the display section 22 displays the basic screen 70 in which the photocopy side setting and the open direction setting are reflected.

Moreover, in a case where the above-described photocopy side set processing sets the photocopy side (single-sided/double-sided) to be different from the default setting, the CPU 51 displays, in the basic screen 70, the photocopy side key 83 in a specific color which is different from that of the default setting state. For example, in the default setting state, the photocopy side key 83 is displayed in white. In a setting state different from the default setting state, the photocopy side key 83 is displayed in blue.

It is to be noted that the above-described various types of set processing can be performed in an arbitrary order. The contents set by the set processing are reflected in the draft graphical image O and the sheet graphical image P displayed in various setting screens displayed in the display section 22, every time the contents are set. In other words, every time the draft setting or the sheet setting is changed, the draft graphical image O or the sheet graphical image P are set and updated. In consequence, the user can perform various settings while referring to the present set contents.

Next, there will be described set processing of the draft graphical image O and set processing of the finished graphical image P.

First, there will be described the set processing of the draft graphical image.

Figure 18:
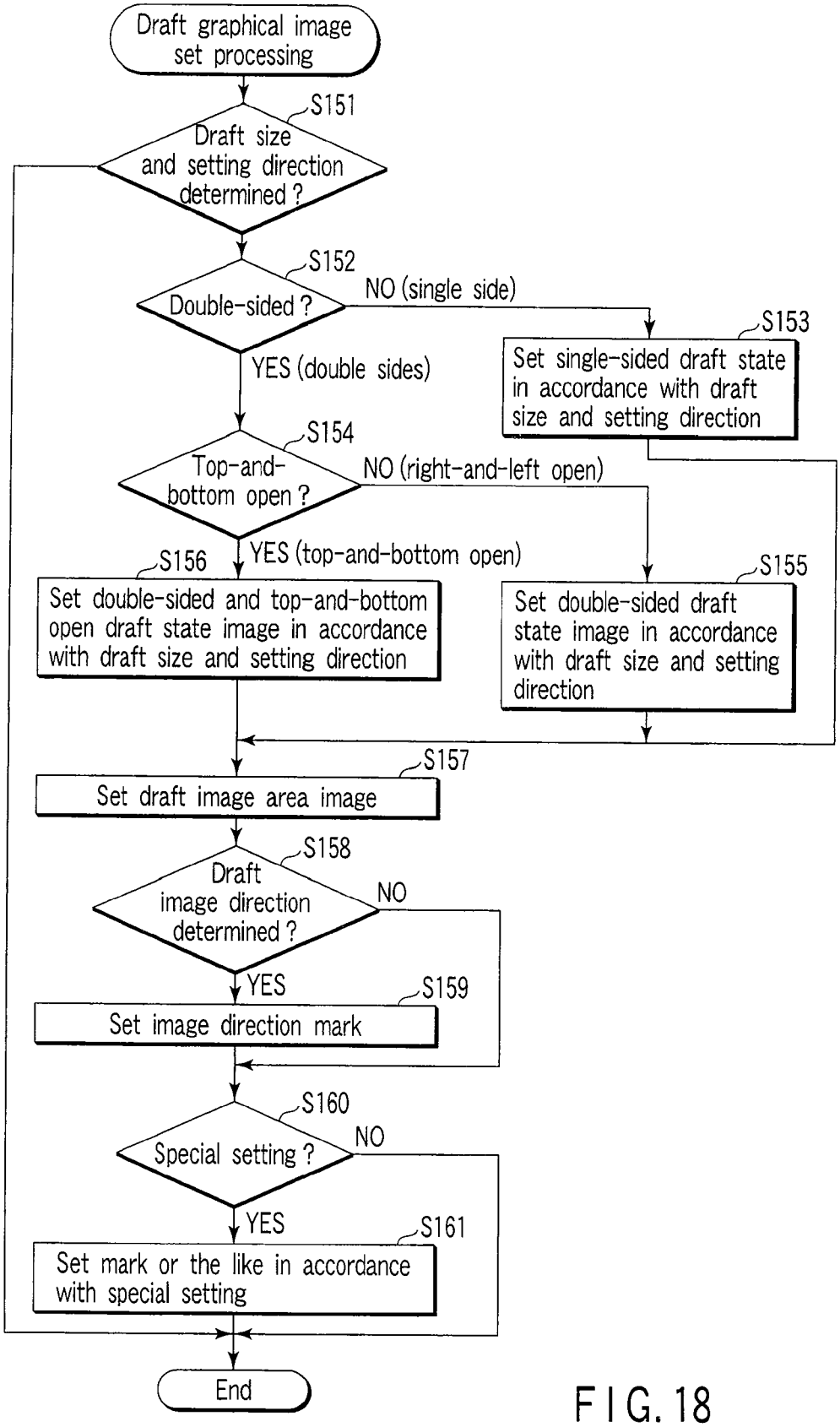
FIG. 18 is a flowchart showing a processing example of draft graphical image set processing.

FIG. 18 is a flowchart showing a processing example of the set processing of the draft graphical image O.

When the draft setting is changed by the various types of set processing as described above, the CPU 51 judges whether or not the draft size and the draft direction (setting direction) are determined (step S151). In a case where this judgment results in judgment that the draft size and the draft setting direction are not determined (step S151, NO), the CPU 51 assumes that the draft graphical image is displayed in the whiteout state (thinly displayed state) in the first display area 72a. For example, since the draft size and the draft setting direction are not determined in a standby state, as shown in the basic screen 70a of FIG. 4, the CPU 51 sets the draft graphical image O so that the draft state image Oa of the default setting is displayed in the whiteout state.

In a case where it is judged that the draft size and the draft setting direction are determined (step S151, YES), the CPU 51 sets the draft state image Oa (steps S151 to S153).

That is, in a case where it is judged that the draft size and the draft setting direction are determined (step S151, YES), the CPU 51 judges whether or not the draft is set to be double-sided (step S152). In a case where it is judged that the draft is not set to be double-sided, that is, it is judged that the draft is set to be single-sided (step S152, NO), the CPU 51 sets the single-sided graphical image as the draft state image Oa in accordance with the draft size and the setting direction (step S153).

Moreover, in a case where it is judged that the draft is set to be double-sided (step S152, YES), the CPU 51 judges whether the open direction of the double-sided draft is set to be right-and-left open or top-and-bottom open (step S154). When the open direction of the double-sided draft is set to be right-and-left open (step S154, NO (right-and-left open)), the CPU 51 sets a right-and-left open and double-sided graphical image as the draft state image Oa in accordance with the draft size and the setting direction (step S155). When the open direction of the double-sided draft is set to the top-and-bottom open direction (step S154, YES (top-and-bottom open)), the CPU 51 sets the top-and-bottom open and double-sided graphical image as the draft state image Oa in accordance with the draft size and setting direction (step S156).

Here, it is assumed that various graphical images settable (displayable) as the finished state image Pa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S153, the CPU 51 selects, from various single-sided graphical images, the single-sided graphical image having the size and direction matched with the draft size and setting direction. In the step S155, the CPU 51 selects, from various right-and-left open and double-sided graphical images, the right-and-left open and double-sided graphical image having the size and direction matched with the draft size and setting direction. In the step S156, the CPU 51 selects, from various top-and-bottom open and double-sided graphical images, the top-and-bottom open and double-sided graphical image having the size and direction matched with the draft size and setting direction.

Moreover, the CPU 51 may select, as the draft state image Oa, the graphical image having the size associated with a certain draft size (e.g., A3, A4, B4, . . . ). The CPU 51 may determine the size of the graphical image selected as the draft state image Oa based on a relative draft size (photocopy magnification) with respect to the sheet size. The CPU 51 may select the graphical image matched with the draft size, and rotate the selected graphical image in accordance with the draft setting direction to thereby set the image as the draft state image Oa.

On setting the draft state image Oa, the CPU 51 sets the draft image area image Ob (step S157). Here, it is assumed that the CPU 51 superimposes (synthesizes) the draft image area image Ob on the set draft state image Oa. A draft area which is valid as the image of the draft to be printed is usually a predetermined area of the whole draft. Therefore, the draft image area image Ob is set to the predetermined area with respect to the draft state image Oa.

Moreover, the draft image area image Ob may be synthesized with the draft state image Oa beforehand. In this case, a storage section such as the HDD 55, the nonvolatile memory 54 or the ROM 53 may store beforehand a graphical image in which the draft image area image Ob is synthesized with the draft state image Oa. In this case, it is assumed that the CPU 51 sets the graphical image from the O graphical image in which the draft state image Oa is synthesized with the draft image area image Ob in accordance with the draft setting.

On setting the draft image area image Ob, the CPU 51 sets the draft image direction mark Oc indicating the direction of the image in the draft (steps S158, S159). That is, the CPU 51 judges whether or not the direction of the image in the draft (portrait or landscape is set (step S158). When this judgment results in judgment that the direction of the image in the draft is set, the CPU 51 sets the draft image area image Ob (step S159). Here, it is assumed that the CPU 51 superimposes (synthesizes) the image direction mark Oc in accordance with the set draft image direction on the draft image area image Ob.

Moreover, the draft image area image Ob and the image direction mark Oc may be synthesized beforehand. In this case, a storage section such as the HDD 55, the nonvolatile memory 54 or the ROM 53 may store beforehand various graphical images in which the draft image area images Ob are synthesized with the image direction marks Oc, respectively. In this case, the CPU 51 sets the graphical image in accordance with the draft setting (draft size, draft setting direction and image direction) from various graphical images in which the draft image area images Ob are synthesized with the image direction marks Oc.

The processing of the steps S151 to S159 sets the draft graphical image O in which the draft state image Oa, the draft image area image Ob and the image direction mark Oc are set. On setting such draft graphical image O, the CPU 51 judges whether or not there is set a function (hereinafter referred to as the special setting) of adding a mark to the draft graphical image O to be stapled or finished otherwise (step S160).

In a case where this judgment results in judgment that the special setting is set (step S160, YES), the CPU 51 sets the mark or the like in accordance with the set contents on the draft graphical image O (step S161).

For example, when the staple is set, the CPU 51 adds the mark showing a staple region corresponding to the set position to be stapled in the draft graphical image O.

The above-described processing sets the draft graphical image O in which the present set contents have been reflected every time the set contents are changed. In other words, every time the set contents of the photocopy processing are changed, the draft graphical image O set by such set processing is displayed in the first display area 72a, 105a, 136a, 147a or 157a.

Next, there will be described set processing of the finished graphical image P.

Figure 19:
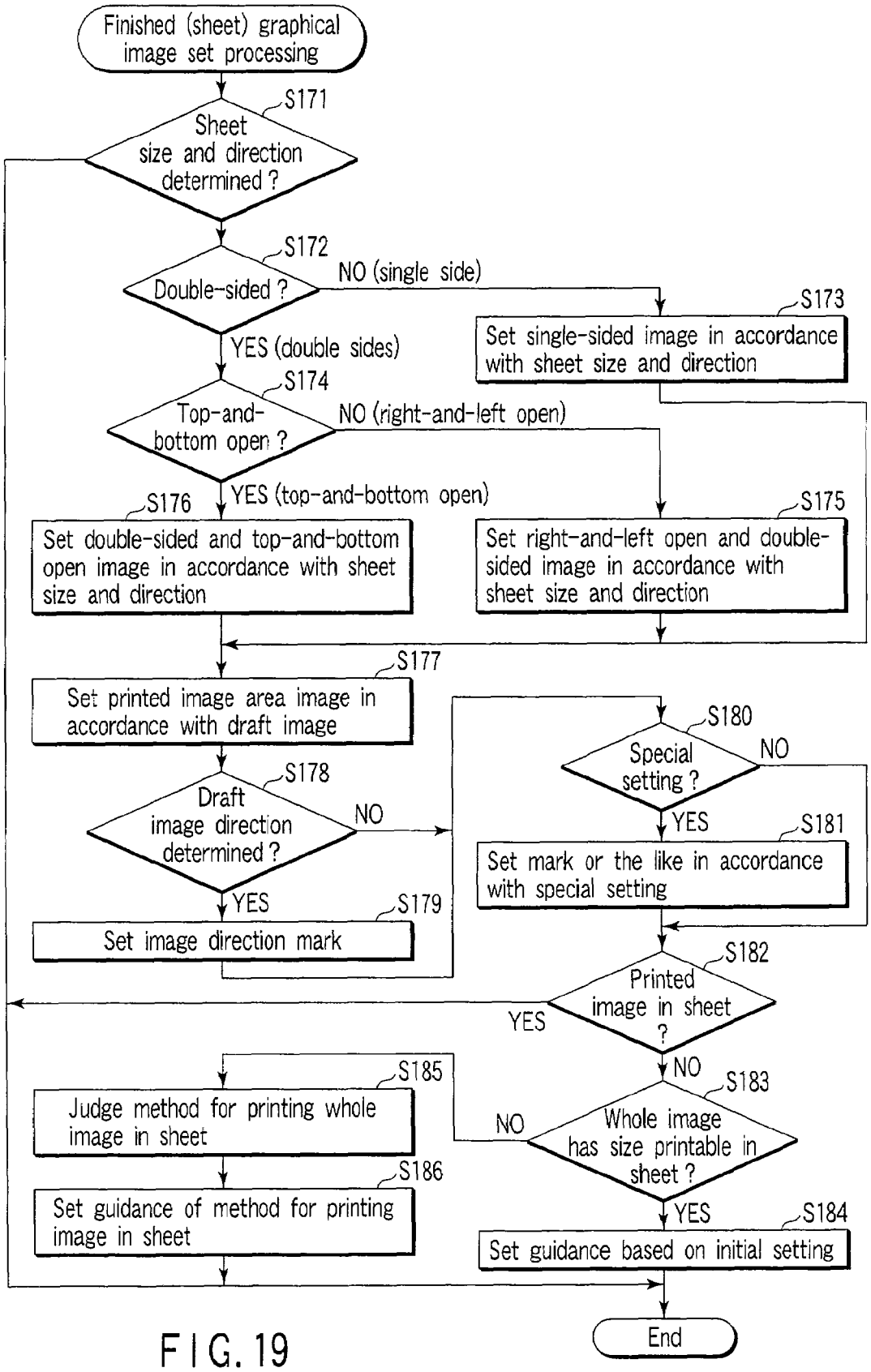
FIG. 19 is a flowchart showing a processing example of finished graphical image set processing.

FIG. 19 is a flowchart showing a processing example of the set processing of the finished graphical image P.

When the sheet setting is changed by the various types of set processing as described above, the CPU 51 judges whether or not the sheet size and the sheet direction are determined (step S171). In a case where this judgment results in judgment that the sheet size and the sheet setting direction are not determined (step S171, NO), the CPU 51 assumes that the finished graphical image is displayed in the whiteout state (thinly displayed state) in the second display area 72b in the same manner as in the draft graphical image, For example, since the sheet size and the sheet direction are not determined in a standby state as shown in the basic screen 70a of FIG. 4, the CPU 51 sets the finished graphical image P so that the only finished state image Pa of the default setting is displayed in the whiteout state.

In a case where it is judged that the sheet size and the sheet direction are determined (step S171, YES), the CPU 51 sets the finished state image Pa indicating a sheet state such as the sheet size, the sheet direction or the surface to be printed (single-sided or double-sided) (steps S171 to S175).

That is, in a case where it is judged that the sheet size and the sheet direction are determined (step S171, YES), the CPU 51 judges whether or not the sheet is set to be double-sided (step S172). In a case where it is judged that the sheet is not set to be double-sided, that is, it is judged that the sheet is set to be single-sided (step S172, NO), the CPU 51 sets the single-sided graphical image as the sheet state image Pa in accordance with the sheet size and the sheet direction (step S173).

Moreover, in a case where it is judged that the sheet is set to be double-sided (step S172, YES), the CPU 51 judges whether the open direction of the double-sided sheet is set to be right-and-left open or top-and-bottom open (step S174). When the open direction of the double-sided sheet is set to be right-and-left open (step S174, NO (right-and-left open)), the CPU 51 sets a right-and-left open and double-sided graphical image as the sheet state image Pa in accordance with the sheet size and the sheet direction (step S175). When the open direction of the double-sided sheet is set to the top-and-bottom open direction (step S174, YES (top-and-bottom open)), the CPU 51 sets the top-and-bottom open and double-sided graphical image as the sheet state image Pa in accordance with the sheet size and sheet direction (step S176).

Here, it is assumed that various graphical images settable (displayable) as the sheet state image Pa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S173, the CPU 51 selects, from various single-sided graphical images, the single-sided graphical image having the size matched with the sheet size and direction. In the step S175, the CPU 51 selects, from right-and-left open and double-sided graphical images having various sizes, the right-and-left open and double-sided graphical image having the size matched with the sheet size and direction. In the step S176, the CPU 51 selects, from top-and-bottom open and double-sided graphical images having various sizes, the top-and-bottom open and double-sided graphical image having the size matched with the sheet size and direction.

Moreover, the CPU 51 may select, as the sheet state image Pa, the graphical image having the size associated with a sheet size (e.g., A3, A4, B4, . . . ). The CPU 51 may determine the size of the graphical image selected as the sheet state image Pa based on a relative draft size (photocopy magnification) with respect to the draft size. The CPU 51 may select the graphical image matched with the sheet size, and rotate the selected graphical image in accordance with the sheet direction to thereby set the image as the sheet state image Pa.

On setting the sheet state image Pa, the CPU 51 sets the printed image area image Pb (step S177). It is assumed that in this step S177, the CPU 51 superimposes (synthesizes) the printed image area image Pb on the set sheet state image Pa. That is, the CPU 51 sets, as the printed image area image Pb, an image showing a printed image generated based on set contents such as the draft image and photocopy magnification, The CPU 51 superimposes the printed image area image on the sheet state image Pa in accordance with a position of the sheet to be printed. For example, in a case where a printing start position is the upper left of the sheet, the CPU 51 aligns an upper left position of the printed image area image with the upper left position of the sheet state image Pa which is a reference, and superimposes the printed image area image Pb on the sheet state image Pa.

On setting the printed image area image Pb, the CPU 51 sets the image direction mark Pc indicating the direction of the image to be printed on the sheet (steps S178, S179). That is, the CPU 51 judges whether or not the direction of the image to be printed on the sheet (portrait or landscape is set (step S178). When this judgment results in judgment that the direction of the image to be printed on the sheet is set (step S178, YES), the CPU 51 sets the printed image area image Pb (step S179). It is assumed that in this step S179, the CPU 51 superimposes (synthesizes), on the printed image area image Pb, the image direction mark Pc in accordance with the set direction of the image to be printed. That is, the CPU 51 superimposes the image direction mark Pc in a direction corresponding to the direction of the image to be printed on the basis of the central position of the printed image area image Pb.

Moreover, the printed image area image Pb may be synthesized beforehand with the image direction mark Pc. In this case, a storage section such as the HDD 55, the nonvolatile memory 54 or the ROM 53 may store beforehand various graphical images in which the printed image area images OP are synthesized with the image direction marks Pc, respectively. In this case, the CPU 51 sets the graphical image in accordance with the sheet setting (sheet size, sheet direction and image direction) from various graphical images in which the printed image area images Pb are synthesized with the image direction marks Pc.

The processing of the steps S171 to S179 sets the finished graphical image P in which the sheet state image Pa, the printed image area image Pb and the image direction mark Pc are set. On setting such finished graphical image, the CPU 51 judges whether or not there is set a function (hereinafter referred to as the special setting) of adding a mark such as the staple to the graphical image P stapled or setting a graphical image (the insertion sheet image) that shows insertion sheet as the finished graphical image (step S180).

In a case where this judgment results in judgment that the special setting is set (step S180, YES), the CPU 51 sets the mark or the like in accordance with the set contents on the finished graphical image P (step S181). For example, when the staple is set, the CPI) 51 adds the mark showing the staple position to a position corresponding to the set position to be stapled in the finished graphical image P.

Moreover, when the insertion sheet is set, the CPU 51 sets the insertion sheet image Pp (refer to FIG. 29, FIG. 31, and FIG. 32 or FIG. 33) that shows insertion sheet as the finished graphical image P. In this case, processing by which the insertion sheet image Pp as a graphical image which shows insertion sheet is set as the finished graphical image P corresponding to the sheet state image Pa, the printed image area image Pb, and the image direction mark Pc is performed.

The above-described processing of the steps S171 to S181 sets the sheet graphical image P in which the present set contents have been reflected every time the set contents are changed. In other words, every time the set contents of the photocopy processing are changed, the sheet graphical image P set by such set processing is displayed in the second display area 72b, 105b, 136b, 147b or 157b.

Moreover, on setting the finished graphical image P as described above, the CPU 51 further judges whether or not the whole printed image (the image of the draft) falls in the sheet (step S182). This judges whether or not the printed image area image Pb protrudes from the sheet state image Pa.

In a case where this judgment results in judgment that the whole printed image does not fall in the sheet (step S182, NO), the CPU 51 judges whether or not the whole printed image has a size printable on the sheet (step S183). This is judged based on the draft size and direction as the draft setting and the sheet size and direction as the sheet setting. In the judgment, for example, when the draft image to be printed on the sheet is rotated, it is judged whether or not the whole printed image falls in the sheet (step S183).

In a case where the judgment results in judgment that the whole printed image has a size printable on the sheet (step S183, YES), the CPU 51 sets a message to be displayed in the guidance display section G based on initial setting (step S184).

Here, the nonvolatile memory 54 stores a plurality of types of messages that can be displayed in the guidance display section G. Among the messages stored in the nonvolatile memory 54, the message to be displayed in the guidance display section G is judged in accordance with the set contents. Furthermore, in a case where a plurality of types of messages are stored, in the nonvolatile memory 54, as messages which can be displayed on the same conditions (with the same set contents), the message to be displayed in the guidance display section G is determined based on the initial setting stored in the initial setting storage section 54a.

Here, it is assumed that a plurality of types of messages are stored, in the nonvolatile memory 54, as messages to be displayed in a case where the set contents indicate that the whole image to be printed has a size printable on the sheet but that a part of the image to be printed protrudes from the sheet (i.e., YES in the step S183). Examples of the message to be displayed in such case include: a message which urges the user to change the way to set the draft; and a message which urges the user to rotate the draft image and change the setting so that the image is printed on the sheet.

As the message which urges the user to change the way to set the draft, as shown in, for example, FIG. 10, the message has contents indicating "when the way to set the draft (vertically or horizontally) is changed, a printed finish region will change". As the message which urges the user to rotate the draft image and change the setting so that the image is printed on the sheet, the message has contents indicating, for example, "when the draft image is rotated, the printed finish region will change". In this case, it is to be noted that an icon for instructing the rotation of the image to be printed (the draft image) may be displayed together with the message.

Moreover, in a case where a plurality of types of messages are stored, in the nonvolatile memory 54, as the messages which can be displayed on the same conditions (with the same set contents), the message to be displayed (set) is determined based on the initial setting. It is assumed that this initial setting is set in accordance with an operation situation of the digital multifunctional photocopier 1, user's idea or the like. It is assumed that the initial setting is stored in the initial setting storage section 54a of the nonvolatile memory 54.

For example, it is assumed that as the messages to be displayed in a case where the set contents indicate that the whole image to be printed has the size printable on the sheet but that a part of the image to be printed protrudes from the sheet (i.e., YES in the step S183), there are stored, in the nonvolatile memory 54, the message which urges the user to change the way to set the draft and the message which urges the user to rotate the draft image and change the setting so that the image is printed on the sheet. In this case, the message to be displayed is determined based on the initial setting stored in the initial setting storage section 54a.

Moreover, in the above-described example, when the digital multifunctional photocopier performs a complicated setting during the photocopying in many cases, a preferable initial setting is a setting that the message be displayed which urges the user to change the way to set the draft. On the other hand, when the digital multifunctional photocopier only performs simple photocopying in many cases, the preferable initial setting is a setting that the message be displayed which urges the user to rotate the draft image and change the setting for printing the image on the sheet. As described above, in the digital multifunctional photocopier, it is possible to display the message in accordance with the operation situation of the digital multifunctional photocopier or the user's idea.

Furthermore, when the above judgment results in judgment that the whole image to be printed does not have a printable size with respect to the sheet (step S183, NO), the CPU 51 judges a method for printing the whole image to be printed in the sheet (step S185). Accordingly, on judging the method for printing the whole image to be printed in the sheet, the CPU 51 sets a guidance of the judged method for printing the whole image to be printed in the sheet as the guidance to be displayed in the guidance display section G (step S186).

Next, there will be described the insertion sheet setting as one of application settings.

Figure 20:
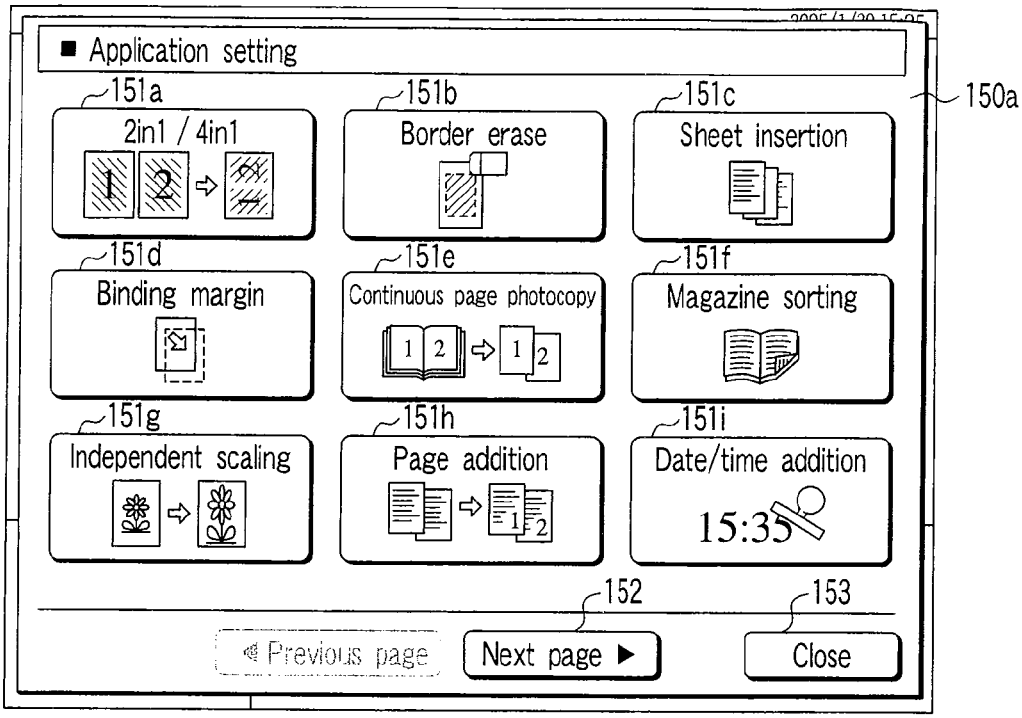
FIG. 20 is a diagram showing a display example of an application menu screen for selecting an application setting function of performing set processing.
Figure 21:
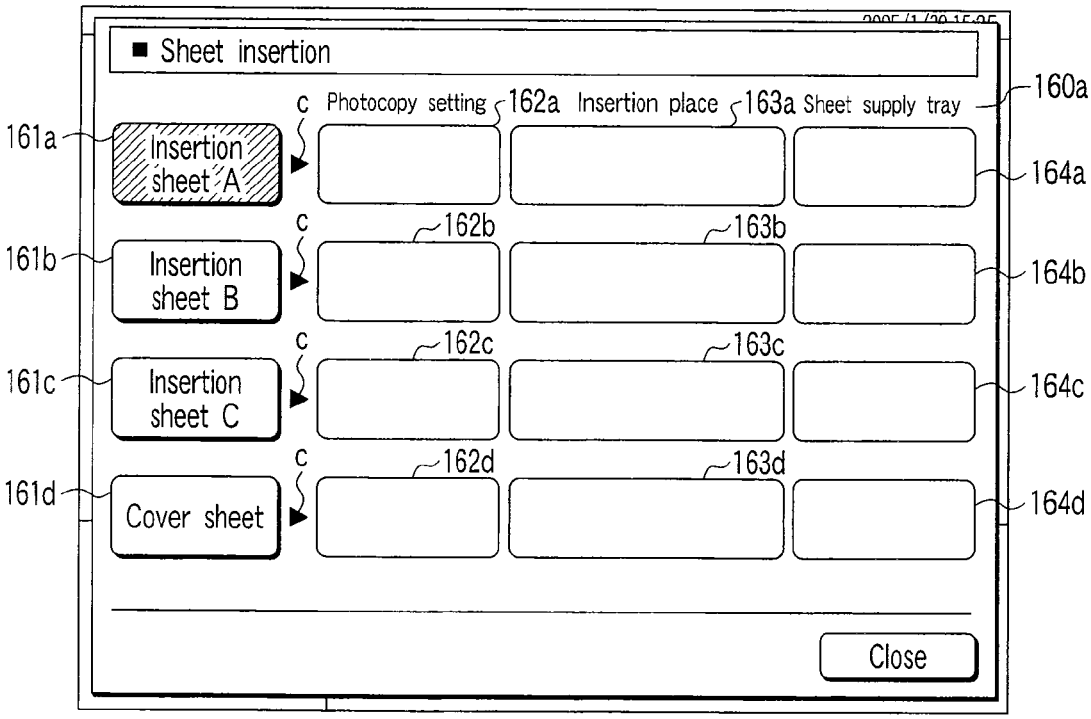
FIG. 21 is a diagram showing a display example of a basic screen to set an insertion sheet.
Figure 26:
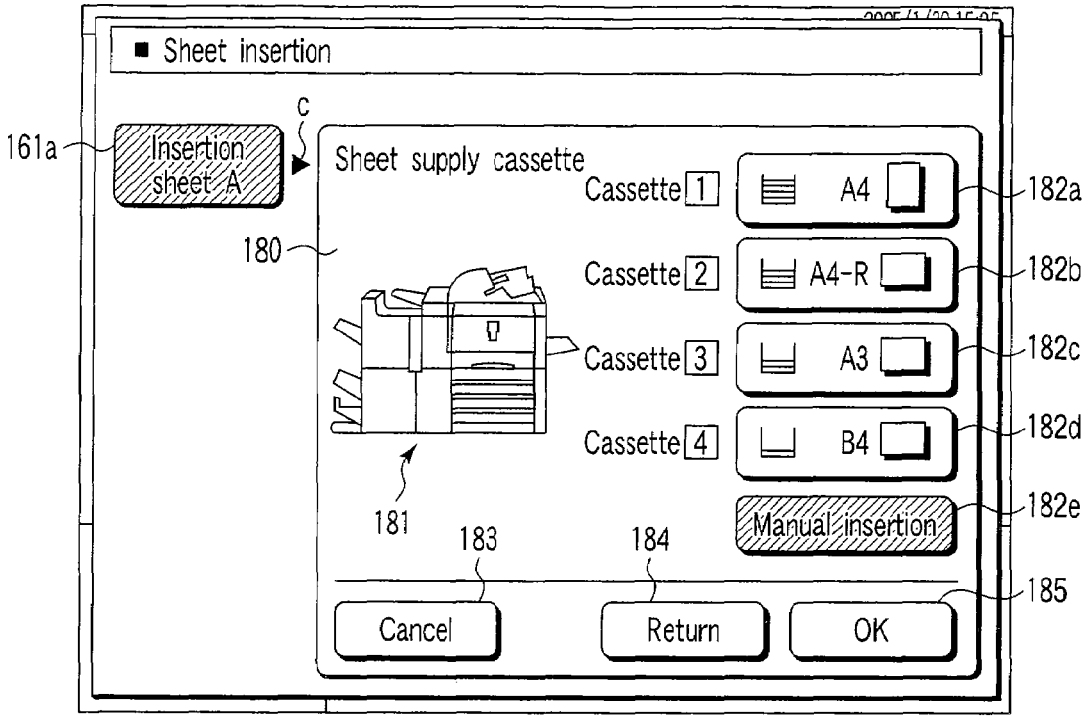
FIG. 26 is a diagram showing a display example of an insertion sheet supply setting screen for setting supply of the insertion sheet.
Figure 27:
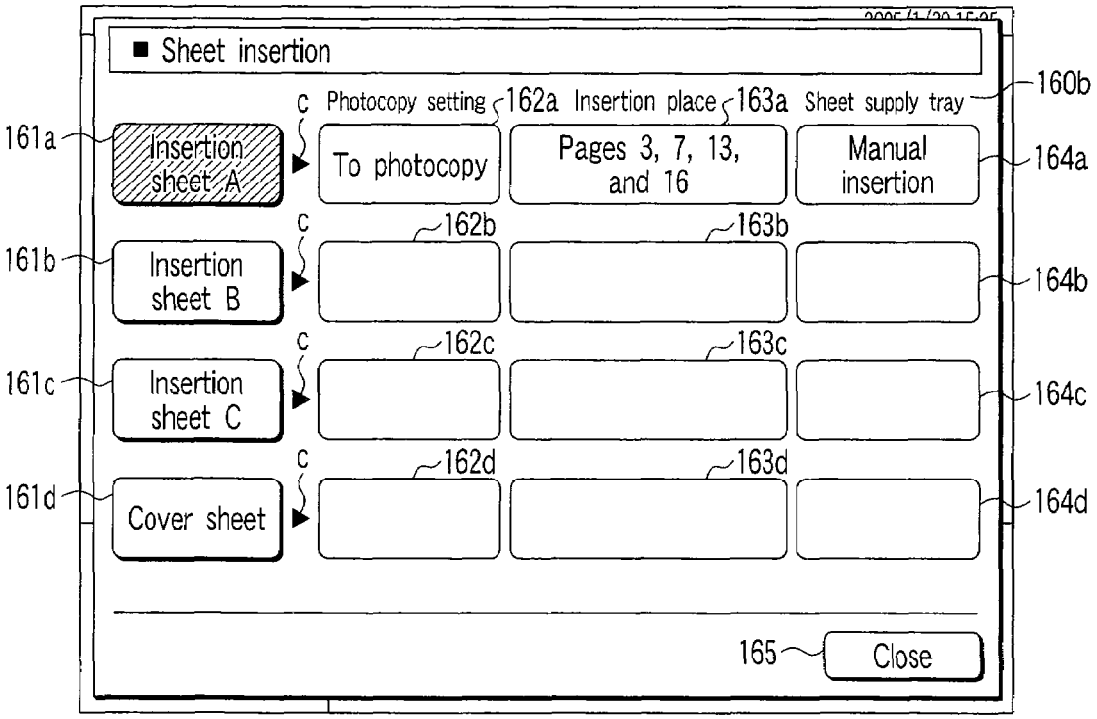
FIG. 27 is a diagram showing a display example of an insertion sheet setting basic screen in a state in which a list of various set contents of the insertion sheet is displayed.

FIG. 20 shows a display example of an application menu screen 150 (150a). FIG. 21 is a display example of a basic screen (check screen) 160 (160a) of the insertion sheet setting. FIGS. 22, 23, 24 and 25 show display examples of an insertion sheet setting input screen 170 (170a, 170b, 170c, and 170d) for inputting a photocopy setting and an insertion position of the insertion sheet. FIG. 26 is a diagram showing a display example of an insertion sheet supply setting screen 180. FIG. 27 is a display example of the insertion sheet setting basic screen (check screen) 160 (160b).

When the user touches the application setting key 86 in the basic screen 70, the CPU 51 displays the application menu screen 150 in the display section 22. This application menu screen 150 displays icons for setting, as the application setting, various functions (e.g., border erase, sheet insertion, binding margin, continuous page photocopy, magazine sorting, independent scaling, addition of pages, addition of date and time and the like.

As shown in FIG. 20, the application menu screen 150 displays, as keys for setting the functions as the application settings, various keys such as: an Nin1 key 151a; a border erase key 151b; a sheet insertion key 151c; a binding margin key 151d; a continuous page photocopy key 151e; a magazine sorting key 151f; an independent scaling key 151g; a page addition key 151h; and a date and time addition key 151i.

Moreover, the application menu screen 150 displays a next page key 152, a close key 153 and the like. The next page key 152 is a key to be touched in a case where an application menu screen of the next page is displayed to display extra keys which cannot be displayed in the application menu screen 150a shown in FIG. 20. The close key 153 is a key to be touched in closing the application menu screen.

The Nin1 key 151a, the border erase key 151b, the sheet insertion key 151c, the binding margin key 151d, the continuous page photocopy key 151e, the magazine sorting key 151f, the independent scaling key 151g, the page addition key 151h and the date and time additio key 151i are keys to be touched in setting functions such as Nin1 photocopy, border erase, sheet insertion, binding margin, continuous page photocopy, magazine sorting, independent scaling, page addition and date and time addition, respectively.

Next, there will be described the insertion sheet setting basic screen (check screen) 160.

When the user sets the insertion sheet in the application menu screen 150 as described above, the user touches the sheet insertion key 151c. When the sheet insertion key 151c is touched in the application menu screen 150, the CPU 51 displays the insertion sheet setting basic screen (check screen) 160 in the display section 22.

FIG. 21 shows a display example of the insertion sheet setting basic screen (check screen) 160 (160a). The insertion sheet setting basic screen 160 displays: a plurality of insertion sheet keys 161 (161a, 161b, 161c, and 161d); a plurality of first display columns 162 (162a, 162b, 162c, and 162d); a plurality of second display columns 163 (163a, 163b, 163c, and 163d); a plurality of third display columns 164 (164a, 164b, 164c, and 164d); and a close key 165.

The insertion sheet keys 161 are associated and displayed with the first display columns 162, the second display columns 163 and the third display columns 164 by triangular graphics C, respectively. For example, set contents displayed in the first display column 162a, the second display column 163a and the third display column 164a correspond to the insertion sheet key 161a for setting "insertion sheet A".

The first display column 162 displays information indicating the photocopy setting onto the corresponding insertion sheet. That is, the first display column 162 displays whether or not to photocopy the corresponding insertion sheet. The second display column 163 displays information indicating a position where the corresponding insertion sheet is to be inserted. The third display column 164 displays information indicating a place where a sheet for use as the corresponding insertion sheet is to be supplied. It is to be noted that display examples displayed in the first display column 162, the second display column 163 and the third display column 164 will be described later in detail.

Next, there will be described the insertion sheet setting input screen 170.

When the user touches any insertion sheet key 161 in the above-described insertion sheet setting basic screen 160, the insertion sheet setting input screen 170 is displayed in the display section 22.

FIGS. 22, 23, 24 and 25 show display examples of the insertion sheet setting input screen 170 (170a, 170b, and 170c). The insertion sheet setting input screen 170 is a screen for the user to input (instruct) a setting of the insertion sheet corresponding to the insertion sheet key 161 touched by the user in the insertion sheet setting basic screen.

This insertion sheet setting input screen 170 is displayed as a popup screen on the insertion sheet setting basic screen 160. For example, in a case where the insertion sheet key 161a is indicated, there is not displayed the insertion sheet key 161b, 111c or 111d other than the insertion sheet key 161a in the insertion sheet setting basic screen 160. That is, when the insertion sheet key 161a is indicated, the display section 22 displays the insertion sheet setting input screen 170 associated with the insertion sheet key 161a by the graphic C.

The insertion sheet setting input screen 170 displays a "photocopy" key 171a, a "not-photocopy" key 171b, a guidance display portion 172, an insertion position setting portion 173, a cancel key 174, a next (sheet supply setting) key 175 and the like.

The "photocopy" key 171a is a key to be selected in photocopying the insertion sheet. The "not-photocopy" key 171b is a key to be selected in a case where the insertion sheet is not to be photocopied. The guidance display portion 172 displays a guidance of information to be input into the insertion sheet place setting portion. The insertion position setting portion 173 is provided with an input column for inputting the insertion position. The cancel key 174 is a key to be touched in canceling the insertion sheet setting. The next (sheet supply setting) key 175 is a key to be touched in setting sheet supply.

Moreover, in the insertion position setting portion 173, the insertion position can be designated with respect to each of the plurality of insertion sheets. That is, the insertion position setting portion 173 is provided with a first (second, third, fourth, . . . ) input portion 173a (173b, 173c, 173d, . . . ) for designating the insertion position of a first (second, third, fourth, . . . ) insertion sheet. Each of the input portions 173a, 173b, 173c, 173d, . . . is provided with an input column F or input columns F1 and F2. It is to be noted that as to the input column F or the input columns F1 and F2, each input column capable of inputting or changing a value is displayed in a specific color (e.g., yellow). In a case where the user touches the input column (F, F1, or F2) capable of inputting or changing the value, the display area can be selected. Therefore, when the user is to input or change the value, the user touches the input column (F, F1, or F2), and inputs or changes the value by use of ten keys or a clear key.

Moreover, in the insertion sheet setting input screen 170, display contents are changed in accordance with the present setting state. First, in a case where the surface of the sheet to be printed is double-sided or single-sided as the sheet setting, there is changed a constitution of the input column for inputting an insertion sheet setting place. Contents displayed in the input portions 173a, . . . of the insertion position setting portion 173 differ with a case where the photocopy key is selected and a case where the not-photocopy key is selected.

Figure 22:
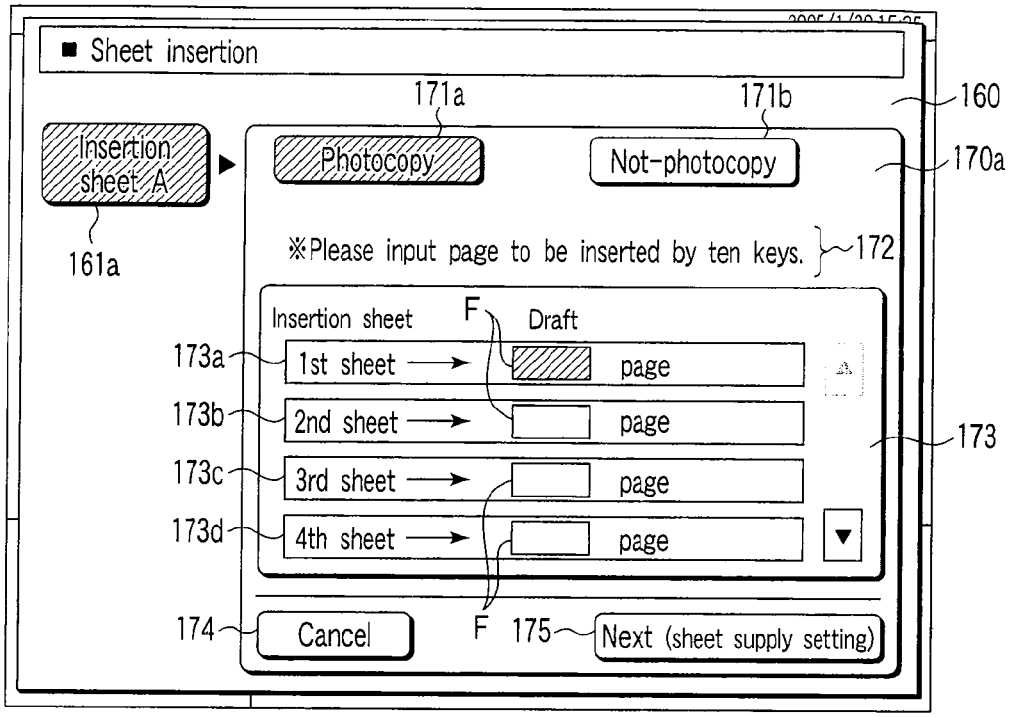
FIG. 22 is a diagram showing a display example of an input screen to set the insertion sheet in a case where photocopying of the insertion sheet in a single-sided printing mode is selected.
Figure 23:
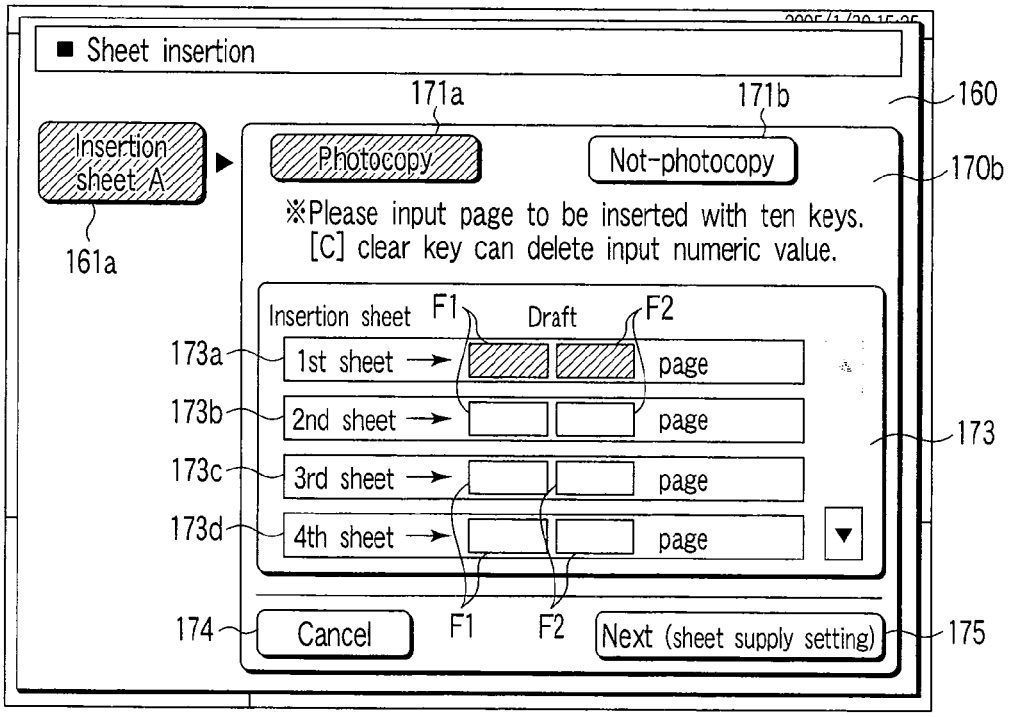
FIG. 23 is a diagram showing a display example of an input screen to set the insertion sheet in a case where photocopying of the insertion sheet in a double-sided printing mode is selected.
Figure 24:
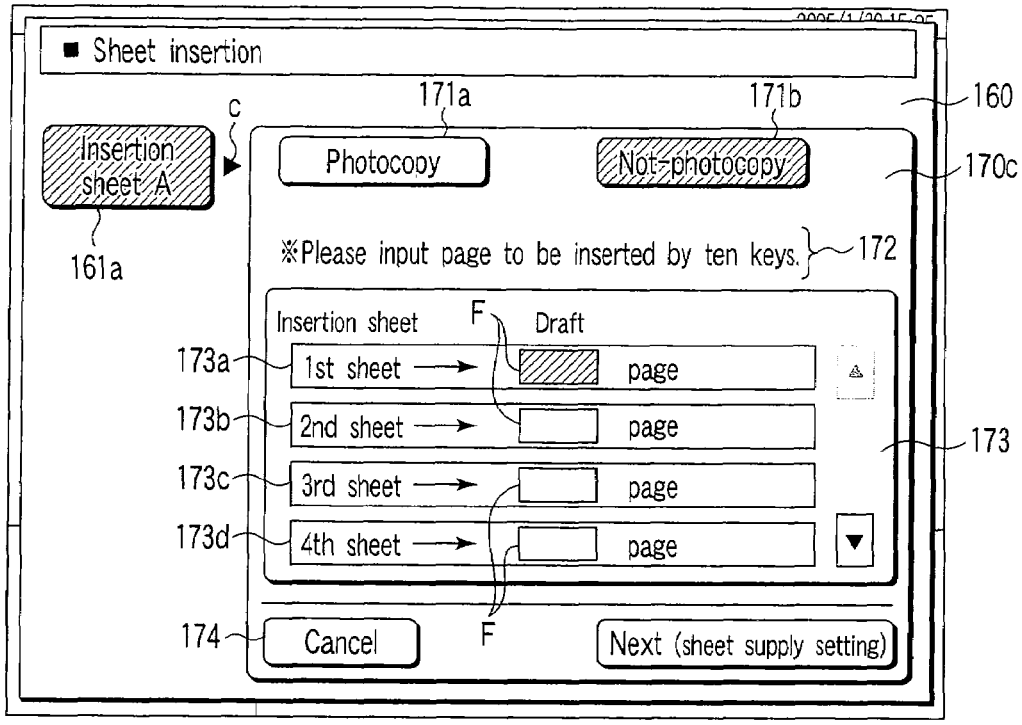
FIG. 24 is a diagram showing a display example of an input screen to set the insertion sheet in a case where not-photocopying of the insertion sheet in the single-sided printing mode is selected.

FIG. 22 shows a display example in a case where the "photocopy" key A 171a is selected in a state in which the single-sided photocopy is set as the sheet setting. FIG. 23 shows a display example in a case where the "photocopy" key 171a is selected in a state in which the double-sided photocopy is set as the sheet setting. FIG. 24 shows a display example in a case where the "not-photocopy" key 171b is selected.

That is, when the sheet setting is single-sided, and the "photocopy" key is brought into the selected state, as shown in FIG. 22, one input column F is displayed in each of the input portions 173a, . . . of the insertion position setting portion 173. Further in each of the input portions 173a, . . . , a guidance "page" is displayed with respect to the input column F. This indicates that a specific page of the draft is to be photocopied onto the insertion sheet. For example, when "2" is input into the input column F, the second page of the draft is photocopied to a single side of the insertion sheet. Furthermore, in this case, the surface of the insertion sheet is inserted as the second page in the finish of the photocopy processing.

Moreover, when the sheet setting is double-sided, and the "photocopy" key is brought into the selected state, as shown in FIG. 23, two input columns F1 and F2 are displayed in each of the input portions 173a, . . . of the insertion position setting portion 173. Further in each of the input portions 173a, . . . , a guidance "page" is displayed with respect to the input columns F1 and F2. This indicates that two pages of the draft designated by the input columns F1 and F2 are to be photocopied onto front and back surfaces of the insertion sheet. In other words, the input column F1 designates an image to be photocopied onto the front surface of the insertion sheet, and the input column F2 designates an image to be photocopied onto the back surface of the insertion sheet.

For example, when "3" is input into the input column F1, and "4" is input into the input column F2, the third page of the draft is photocopied to the front surface of the insertion sheet, and the fourth page of the draft is photocopied onto the back surface. In the finish of such setting result, the sheet onto whose front surface the third page of the draft has been photocopied and onto whose back surface the fourth page of the draft has been photocopied are inserted into positions corresponding to the third and fourth pages of the draft.

Moreover, in each of the input portions 173a, . . . , one input column F2 (or F1) may be set to be blank. In this case, it is assumed that the only single side of the specific insertion sheet can be set to be photocopied.

For example, when "3" is input into the input column F1, and the input column F2 is set to be blank, the image of the third page of the draft is photocopied onto the front surface of the insertion sheet, and nothing is set to be photocopied onto the back surface of the insertion sheet. In this case, even when the sheet setting is double-sided, the third page of the draft is photocopied onto the front surface of the insertion sheet, and nothing is photocopied onto the back surface of the insertion sheet. In such finish as the setting result, the insertion sheet onto whose front surface the third page of the draft has been photocopied is inserted into a position corresponding to the third page of the draft, and images of fourth and subsequent pages of the draft are photocopied onto double sides of the insertion sheet and the subsequent sheets.

Furthermore, when the sheet setting is double-sided, and the "photocopy" key is brought into the selected state, a numeric value input into the input column F1 may be reflected in the input column F2. That is, in a case where the numeric value is input into the input column F1, the CPU 51 may set, to the input column F2, a numeric value indicating a page next to the page (numeric value) input into the input column F1.

For example, when "3" is input into the input column F1, "4" can be displayed in the input column F2. Furthermore, when "3" is input into the input column F1, "back surface" may be displayed in the input column F2. According to such control, when the user simply inputs the value into one input column, the insertion position of the insertion sheet is set. Even in this case, when the user deletes the value displayed in one input column F2, the single-sided photocopy can be set with respect to the insertion sheet.

Moreover, when the "not-photocopy" key is brought into the selected state, as shown in FIG. 24, one input column F is displayed in each of the input portions 173a, . . . of the insertion position setting portion 173, and a guidance "after X page" is displayed with respect to the input column F. This indicates that the insertion sheet is to be inserted after the draft page designated in the input column F. For example, when "2" is input into the input column F, any image is not photocopied onto the insertion sheet, and the second page of the draft is inserted after the photocopied sheet in the finish of the photocopy processing.

Figure 25:
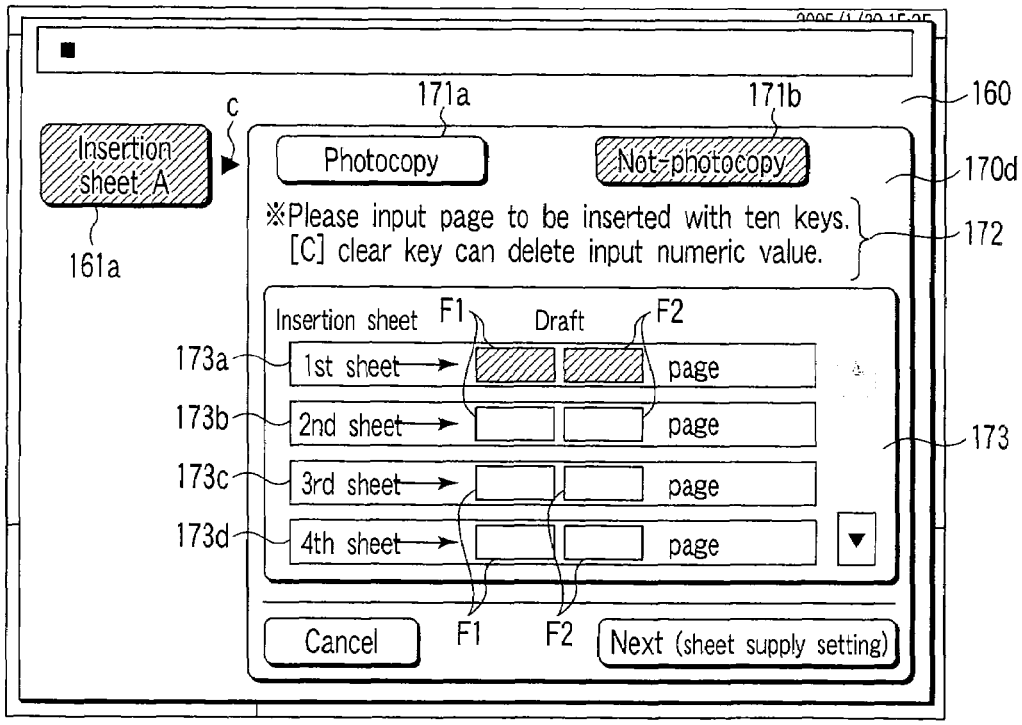
FIG. 25 is a diagram showing a display example of an input screen to set the insertion sheet in a case where not-photocopying of the insertion sheet in the double-sided printing mode is selected.

It is to be noted that even in a case where the "not-photocopy" key 171b is brought into the selected state, when the sheet setting is double-sided, two input columns may be displayed in each of the input portions 173a, . . . as shown in FIG. 25. That is, when the sheet setting is double-sided, the second page of the draft is photocopied onto the front and back surfaces of each sheet. Therefore, even when the insertion position is designated on the basis of the draft page, the user may designate two pages of the draft to be photocopied on the front and back surfaces of the sheet immediately before the insertion sheet. In this case, it is possible to designate the draft page to be printed on the sheet immediately before the insertion sheet.

Furthermore, in the display example shown in FIG. 25, the user may designate, in the input column F1, the draft page number to be photocopied onto the front surface of the sheet immediately before the insertion sheet to be inserted, and designate, in the input column F2, the draft page number to be photocopied onto the back surface of the sheet immediately before the insertion sheet to be inserted. In this case, for example, when the draft page number is input into one input column F1 (or F2), and the other input column F2 (or F1) is set to be blank, it is possible to photocopy the draft page designated in the input column F1 onto the front surface (or the back surface) only of the sheet immediately before the insertion sheet to be inserted.

As shown in FIG. 22, 23, 24 or 25, in the insertion setting input screen, the guidance in designating the insertion position of the insertion sheet is changed in accordance with whether or not the insertion sheet is to be photocopied. In consequence, the guidance in accordance with the setting situation is possible, and mistakes in setting the insertion can be reduced.

Moreover, in the input screen of the insertion sheet setting, one input column for designating one page of the draft to set the insertion position of the insertion sheet is disposed in a case where the sheet setting is single-sided. In a case where the sheet setting is double-sided, the input screen is provided with two input columns for designating two pages of the draft to set the insertion position of the insertion sheet. Accordingly, it is possible to directly designate the draft page number to be photocopied onto the insertion sheet, in a case where the insertion sheet is to be photocopied. It is possible to directly designate the draft page number to be photocopied onto the sheet immediately before the insertion sheet to be inserted, in a case where the insertion sheet is not photocopied. As a result, the user can exactly designate the insertion position of the insertion sheet.

Furthermore, in the input screen of the insertion sheet setting, there are disposed two input columns for designating two pages of the draft to set the insertion position of the insertion sheet, in a case where the sheet setting is double-sided. One of the input columns may be designated as a blank column. In consequence, even in a state in which the sheet setting is double-sided, when the insertion sheet is photocopied, the designated draft page can be set to be photocopied onto the only single side of the insertion sheet. Furthermore, when the insertion sheet is not photocopied, the designated draft page can be set to be photocopied onto the only single side of the sheet immediately before the insertion sheet to be inserted, The draft page is designated by the number.

Next, there will be described the insertion sheet supply setting screen 180.

When the user touches the next key 175 in the insertion sheet setting input screen 170 as described above, the display section 22 displays the insertion sheet supply setting screen 180 for setting the sheet supply place of the sheet for use as the insertion sheet.

FIG. 26 is a diagram showing a display example of the insertion sheet supply setting screen 180. As shown in FIG. 26, the sheet supply setting screen 180 is displayed in association with the insertion sheet key 161 selected in the insertion sheet setting basic screen 160 by the graphic C. For example, in the display example shown in FIG. 26, there is displayed the sheet supply setting screen 180 associated with the insertion sheet key 161a by the graphic C.

In the insertion sheet supply setting screen 180, there are displayed: a sheet supply place guidance portion 181; sheet supply place selection keys 182 (182a, 182b, 182c, 182d, and 182e); a cancel key 183; a return key 184; and an OK key 185.

In the sheet supply place guidance portion 181, a selected sheet supply place is displayed together with a graphical image of the whole digital multifunctional photocopier. For example, the sheet supply place selected in the sheet supply place guidance portion 181 is displayed in a specific color in the graphical image of the whole digital multifunctional photocopier.

The selection keys 182a, 182b, 182c and 182d are keys to be touched in setting the sheet supply place of the sheet for use as the insertion sheet to "first cassette", "second cassette", "third cassette" and "fourth cassette", respectively. The selection key 182e is a key to be touched in setting the sheet supply place of the sheet for use as the insertion sheet to "manual insertion tray". It is to be noted that in a case where the selection key 182e ("manual insertion tray") is selected as the supply place of the sheet for use as the insertion sheet, the display section 22 displays a setting screen (not shown) for selecting the sheet size.

The cancel key 183 is a key to be touched in discontinuing the insertion sheet setting. The return key 184 is a key to be touched in closing the insertion sheet supply setting screen 180 to return to the insertion sheet setting input screen 170. The OK key 185 is a key to be touched in completing the insertion sheet supply setting.

Next, there will be described the insertion sheet setting basic screen (check screen) 160 (160b) in a state in which the set contents of the insertion sheet setting are displayed.

FIG. 27 is a display example of the insertion sheet setting basic screen (check screen) 160 (160b) in a state in which the set contents of the insertion sheet setting are displayed. FIG. 27 shows a display example of the insertion sheet setting basic screen (check screen) 160b displayed in a case where there are completed the insertion sheet setting in the input screen 170 and the sheet supply setting in the sheet supply setting screen 180.

The RAM 52 or the like retains, as insertion sheet setting information which is a part of photocopy setting information, the insertion sheet setting contents input in the insertion sheet setting input screen 170 and the insertion sheet supply setting contents designated in the insertion sheet supply setting screen.

In the insertion sheet setting, with respect to each insertion sheet, the insertion sheet setting (photocopy setting and insertion position setting) is designated in the insertion sheet setting input screen 170. Next, the sheet supply place is designated in the sheet supply setting screen 180. When the OK key 185 is touched in the sheet supply setting screen 180, the setting is completed with respect to one type of insertion sheet.

Even time the setting is completed with respect to one type of insertion sheet in this manner, the display section 22 displays the basic screen 160 in a state in which there are reflected the set contents designated in the insertion sheet setting input screen 170 and the sheet supply setting screen 180. In other words, in a case where the OK key 185 is touched in the sheet supply setting screen 180, the display section 22 displays the insertion sheet setting basic screen (check screen) 160 in which the present insertion sheet setting is reflected.

As shown in FIG. 27, such insertion sheet setting basic screen 160 displays a list of the insertion sheet setting contents with respect to a plurality of types of insertion sheets. Therefore, every time the setting is completed with respect to one type of insertion sheet, the user can confirm the set contents with respect to all of the insertion sheets.

In the display example shown in FIG. 27, the insertion sheet setting indicates that as the set contents concerning "insertion sheet A", the photocopy setting is set to "photocopy", the insertion positions are "pages 3, 7, 13, and 16", and the sheet supply place (tray) is "manual insertion". It is to be noted that in the display example shown in FIG. 27, the only set contents concerning "insertion sheet A" are displayed. However, if the insertion sheet setting is performed with respect to "insertion sheet B", "insertion sheet C" or "cover sheet", a list of the set contents is also displayed in the insertion sheet setting basic screen 160.

As described above, in the insertion sheet setting basic screen 160, the set contents concerning various insertion sheets are displayed in a list. In consequence, even when a plurality of types of insertion sheets are set, the user can confirm the set contents of the plurality of insertion sheets in one check screen. As a result, mistakes in setting the insertion sheet can be reduced, and operability concerning the insertion sheet setting can be improved.

Moreover, every time the setting is completed with respect to one type of insertion sheet, the insertion sheet setting basic screen 160 is surely displayed in a state in which the present set contents (set contents of each type of insertion sheet) are displayed in the list. In other words, every time the setting is completed with respect to one type of insertion sheet, the display section 22 displays the check screen in which the list of the present set contents is displayed so that the user confirms the present set contents. As a result, the mistakes in setting the insertion sheet can be reduced, and the operability concerning the insertion sheet setting can be improved.

Figure 28:
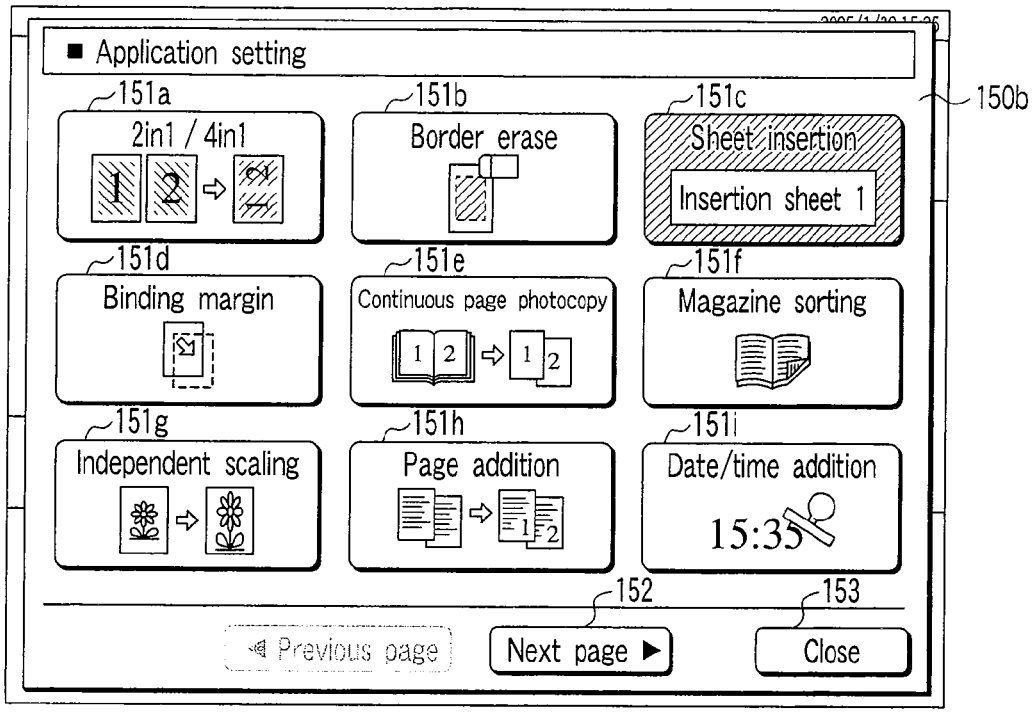
FIG. 28 is a diagram showing a display example of an application menu screen in a state in which the insertion sheet is set.

In a case where the user touches the close key 165 in the insertion sheet setting basic screen 160, the display section 22 displays the application menu screen 150b shown in FIG. 28. FIG. 28 shows a display example of the application menu screen 150a in a state in which the insertion sheet is set. In the display example shown in FIG. 28, the sheet insertion icon 151c is displayed in a specific color (e.g., blue) indicating a state in which the setting has been completed. Furthermore, "insertion sheet 1" is displayed in the sheet insertion icon 151c. According to such application menu screen 150b, the user can confirm that the insertion sheet is set.

Figure 29:
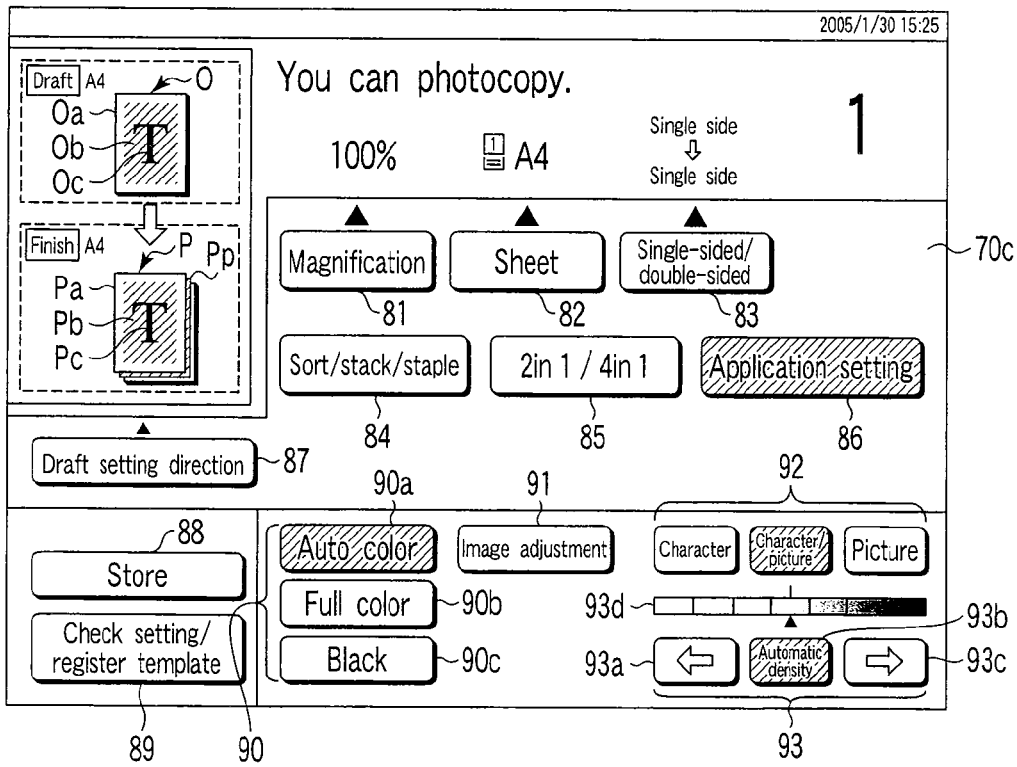
FIG. 29 is a diagram showing a display example of a basic screen in a state in which the insertion sheet is set.
Figure 30:
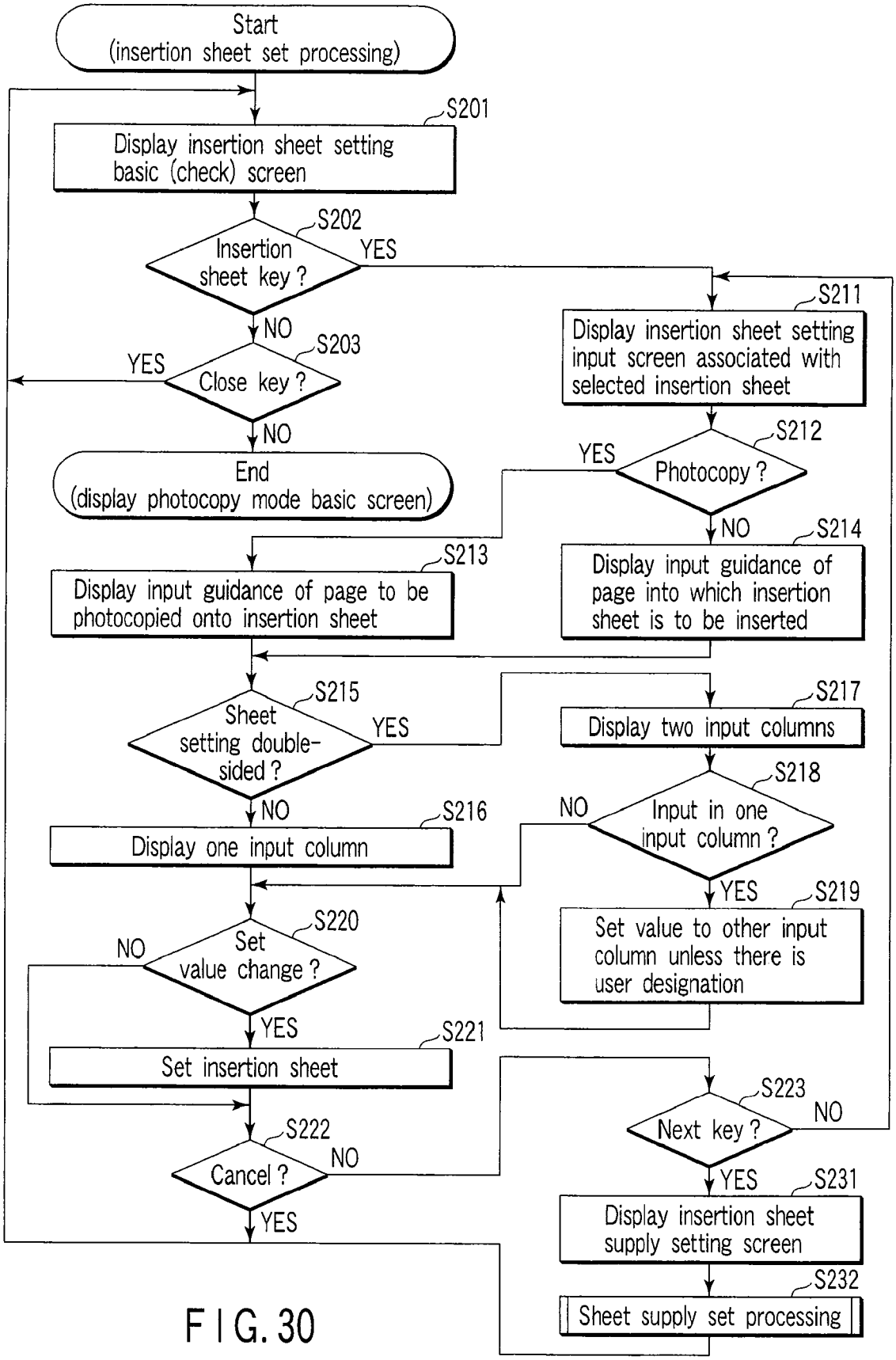
FIG. 30 is a flowchart showing a processing example of an insertion sheet set processing.

Moreover, when the user touches the close key 153 in the application menu screen 150b, the display section 22 displays a basic screen 70c of the photocopy mode as shown in FIG. 29. FIG. 29 shows a display example of the basic screen 70c of the photocopy mode in a state in which the insertion sheet is set. In the display example shown in FIG. 29, it is assumed that the draft setting is "A4, vertical, portrait, and single-sided", the sheet setting is "A4, vertical, portrait, and single-sided", and the insertion sheet is set.

In the basic screen 70c of the photocopy mode shown in FIG. 29, the application setting key is displayed in a specific color (e.g., blue). This indicates that a certain function of the application setting is set. That is, in the photocopy mode basic screen 70c shown in FIG. 29, the user can visually recognize the application setting in accordance with a display state of the application setting key 86.

Furthermore, in the display area 72b of the photocopy mode basic screen 70c shown in FIG. 29, the finished graphical image P is displayed which indicates that the insertion sheet is inserted. In this case, as shown in FIG. 29, the finished graphical image P is constituted of a sheet state image Pa, a printed image area image Pb, an image direction mark Pc, and an insertion sheet image Pp. That is, in a case where the insertion sheet is set, in the finished graphical image set processing, a graphical image indicates that the insertion sheet image Pp is inserted together with the sheet state image Pa, the printed image area image Pb and image direction mark Pc.

Next, there will be described insertion sheet set processing.

First, in a case where the user touches the sheet insertion key 151c in the application menu screen 150 as described above, the CPU 51 displays the insertion sheet setting basic screen 160 in the display section 22 (step S201).

In a case where the user touches one of the insertion sheet keys 161 (161a, 161b, 161c, 161d, . . . ) in the insertion sheet setting basic screen 160 (step S202, YES), the CPU 51 displays, in the display section 22, the insertion sheet setting input screen 170 for setting the insertion sheet corresponding to the selected insertion sheet key 161 (step S211).

In this insertion sheet setting input screen 170, it is designated whether or not to photocopy the insertion sheet, and the position where the insertion sheet is to be inserted is designated.

That is, when the "photocopy" key 171a is indicated, the CPU 51 displays a guidance in inputting the page to be photocopied onto the insertion sheet. As shown in FIGS. 22 to 25, in the insertion sheet setting input screen 170, the page to be photocopied onto the insertion sheet is designated on the basis of the draft image page. Therefore, in a case where the "photocopy" key 171a is brought into the selected state (step S212, YES), in each of the input portions 173a, . . . of the insertion sheet setting input screen 170, the CPU 51 displays a guidance "X-th page" with respect to each input column F (or F1 and F2) (step S213).

Moreover, when the "not-photocopy" key 171b is indicated (step S213, NO), the CPU 51 displays the input guidance of the page to be photocopied onto the sheet immediately before the insertion sheet to be inserted. As shown in FIGS. 22 to 25, in the insertion sheet setting input screen 170, the place where the insertion sheet is to be inserted is designated on the basis of the draft image page. Therefore, in a case where the "not-photocopy" key 171b is brought into the selected state (step S213, NO), in each of the input portions 173a, . . . of the insertion sheet setting input screen 170, the CPU 51 displays a guidance "after X-th page" with respect to each input column F (or F1 and F2) (step S214).

Furthermore, the CPU 51 judges whether the present sheet setting (printing mode) is single-sided (single-sided printing mode) or double-sided (double-sided printing mode) (step S215). In a case where this judgment judges that the sheet setting is the single-sided printing mode (step S215, NO), the CPU 51 displays one input column F in the insertion sheet setting input screen 170 (step S216).

When the "photocopy" key 171a is brought into the selected state, the page number of the draft to be photocopied (printed) onto the insertion sheet is input into the input column F. In a case where the "not-photocopy" key 171b is brought into the selected state, there is input, into the input column F, the page number of the draft to be photocopied (printed) onto the sheet immediately before the insertion sheet to be inserted.

Moreover, the input column F is displayed in association with the input guidance displayed in the step S213 or S214. In consequence, it is possible to easily recognize whether the value to be input into the input column F indicates the page number of the draft to be photocopied (printed) onto the insertion sheet or the page number of the draft to be photocopied (printed) onto the sheet immediately before the insertion sheet to be inserted.

For example, when the user touches the desired input column F among the input columns F of the respective input portions 173a, . . . , the input column F is brought into the selected state (turns to a focus color). When the user inputs desired numerals (draft page number) by the ten keys 63 in this state, the input column F displays the numeric value input by the ten keys 63.

Furthermore, in a case where the above judgment judges that the sheet setting is the double-sided printing mode (step S215, YES), the CPU 51 displays two input columns F1 and F2 in the insertion sheet setting input screen 170 (step S217).

When the "photocopy" key is brought into the selected state, there are input, into the input columns F1 and F2, the page numbers of the draft to be photocopied (printed) onto the front and back surfaces of the insertion sheet, respectively. When the "not-photocopy" key 171b is brought into the selected state, there are input, into the input columns F1 and F2, the page numbers of the draft to be photocopied (printed) onto the front and back surfaces of the sheet immediately before the insertion sheet to be inserted, respectively.

In addition, the input columns F1 and F2 are displayed in association with the input guidance displayed in the step S213 or S214. In consequence, it is possible to easily recognize whether the values to be input into the input columns F1 and F2 indicate the page numbers of the draft to be photocopied (printed) onto the front and back surfaces of the insertion sheet or the page numbers of the draft to be photocopied (printed) onto the front and back surfaces of the sheet immediately before the insertion sheet to be inserted.

For example, when the user touches the desired input column F1 or F2 among the input columns F of the respective input portions 173a, . . . , the input column F1 or F2 is brought into the selected state (turns to the focus color). When the user inputs desired numerals (draft page number) by the ten keys 63 in this state, the input column F1 or F2 displays the numeric value input by the ten keys 63.

Moreover, in a case where the numeric value is input into one of the input columns F1 and F2 (step S218, YES), unless the user designates the numeric value in the other input column F2 or F1, the CPU 51 automatically displays, in the other input column F2 or F1, the numeric value in accordance with the numeric value input into the input column F1 or F2 (step S219).

For example, in a case where the user inputs "3" into the input column F1, unless the numeric value is input into the corresponding input column F2, the CPU 51 displays a value such as "4" or "the back surface of 3" in the input column F2 (step S219). The user can selectively delete the value displayed in the input column F2 or F1. In a case where the user brings the input column F2 into the selected state, and inputs the clear key in a state in which the input column F1 displays "3" and the input column F2 displays "4", "4" displayed in the input column F2 is cleared (i.e., the input column F2 is set to be blank). In this case, only "3" (i.e., the third page of the draft) displayed in the input column F1 is valid as the insertion sheet setting. In this case, when the "photocopy" key 171a is brought into the selected state, it is indicated that the third page of the draft is photocopied (printed) onto the only front surface of the insertion sheet. In other words, this indicates such a setting that when one of the input columns F1 and F2 is blank, the only page having the page number of the draft displayed in the other input column is printed onto the single side of the insertion sheet.

The processing of the steps S211 to S219 controls the display contents of the insertion sheet setting input screen 170 displayed in the display section 22.

The CPU 51 monitors the presence of change of the set value in a state in which the insertion sheet setting input screen 170 is displayed as described above.

For example, in a case where the "photocopy" key 171a (or the "not-photocopy" key 171b) is brought into the selected state, when the user touches the "not-photocopy" key 171b (or the "photocopy" key 171a), the CPU 51 judges that the insertion sheet photocopy setting is changed to "not-photocopy" (or "photocopy"). In a case where the numeric value is input into the input column F or the input columns F1 and F2 of each of the input portions 173a, . . . , the CPU 51 judges that the insertion position of the insertion sheet has been designated. In this case, the CPU 51 judges the insertion sheet whose insertion position has been designated based on the input of the numeric value into the input column of each input portion.

In a case where it is judged that such insertion sheet setting has been changed, the CPU 51 updates the insertion sheet setting in accordance with change contents (step S221). The information indicating this insertion sheet setting is retained as the insertion sheet setting information in a memory such as the RAM 52.

Moreover, the CPU 51 detects an input into the cancel key 174 or the next (sheet supply setting) key 175 in a state in which the insertion sheet setting input screen 170 is displayed (steps S222, S223).

That is, when the user touches the cancel key 174 (step S222, YES), the CPU 51 closes the insertion sheet setting input screen 170, and displays the insertion sheet setting basic screen 160 in the display section 22. It is to be noted that when the user touches the cancel key 174, the CPU 51 may end the insertion sheet set processing, and display the photocopy mode basic screen 70 in the display section 22.

Furthermore, when the user touches the next (sheet supply setting) key 175 (step S223, YES), the CPU 51 ends the photocopy setting and the insertion position setting with respect to the insertion sheet, and displays, in the display section 22, the insertion sheet supply setting screen 180 for setting the supply of the insertion sheet (insertion sheet corresponding to the insertion sheet key 161 brought into the selected state) (step S231).

When the insertion sheet supply setting screen 180 is displayed, the user selects one of the sheet supply setting keys 182a, . . . as the supply place of the sheet for use as the insertion sheet. When the user designates one of the sheet supply setting keys 182a, . . . , the CPU 51 sets, as the insertion sheet supply place, a sheet supply cassette or a manual insertion tray corresponding to the user's designated sheet supply setting key among the sheet supply setting keys 182a, . . . (step S232). When the user touches the OK key 185 in the insertion sheet supply setting screen 180, the CPU 51 ends the sheet supply set processing with respect to the insertion sheet. Here, as the insertion sheet setting with respect to each insertion sheet, there are presumed a photocopy setting, an insertion position setting and a sheet supply place setting. Therefore, when the sheet supply setting is ended, the CPU 51 judges that the insertion sheet setting has been completed with respect to the corresponding insertion sheet.

When the sheet supply set processing is ended, the CPU 51 displays the insertion sheet setting basic screen 160 in which the present insertion sheet setting contents are displayed in the list. That is, when the OK key 185 is touched in the sheet supply setting screen 180, the display section 22 displays the insertion sheet setting basic screen 160 as the check screen in which the list of the present set contents concerning various insertion sheets is displayed.

Every time the insertion sheet setting ends with respect to a specific insertion sheet, the display section 22 surely displays the check screen in which the list of the set contents of the insertion sheet is displayed. In consequence, every time the set contents of the specific insertion sheet are input, the user can confirm the insertion sheet set contents. Every time the insertion sheet setting is ended with respect to the specific insertion sheet, the list of the set contents concerning various insertion sheets is displayed in the check screen displayed in the display section 22. In consequence, every time the set contents concerning the specific insertion sheet are input, the user can confirm the set contents concerning various insertion sheets in the list. As a result, the user can easily and securely confirm the set contents of the insertion sheet, and the mistakes in setting the insertion sheet can be reduced.

It is to be noted that an order of each processing in the above-described insertion sheet set processing can be appropriately changed. That is, in the insertion sheet set processing, after the sheet supply setting is performed, the photocopy setting and the insertion position setting may be performed.

Next, there will be described a case where set contents other than those of the insertion sheet setting are changed after the insertion sheet is set.

Here, there will be described a case where the single-sided to single-sided photocopy mode including the single-sided reading mode and the single-sided printing mode is changed to the double-sided to double-sided photocopy mode including the double-sided reading mode and the double-sided printing mode in a state in which the insertion sheet is set with the set contents (the photocopy setting is "photocopy", the insertion positions are "pages 3, 7, 13, and 16", and the sheet supply tray is "manual insertion") as shown in FIG. 27.

Figure 31:
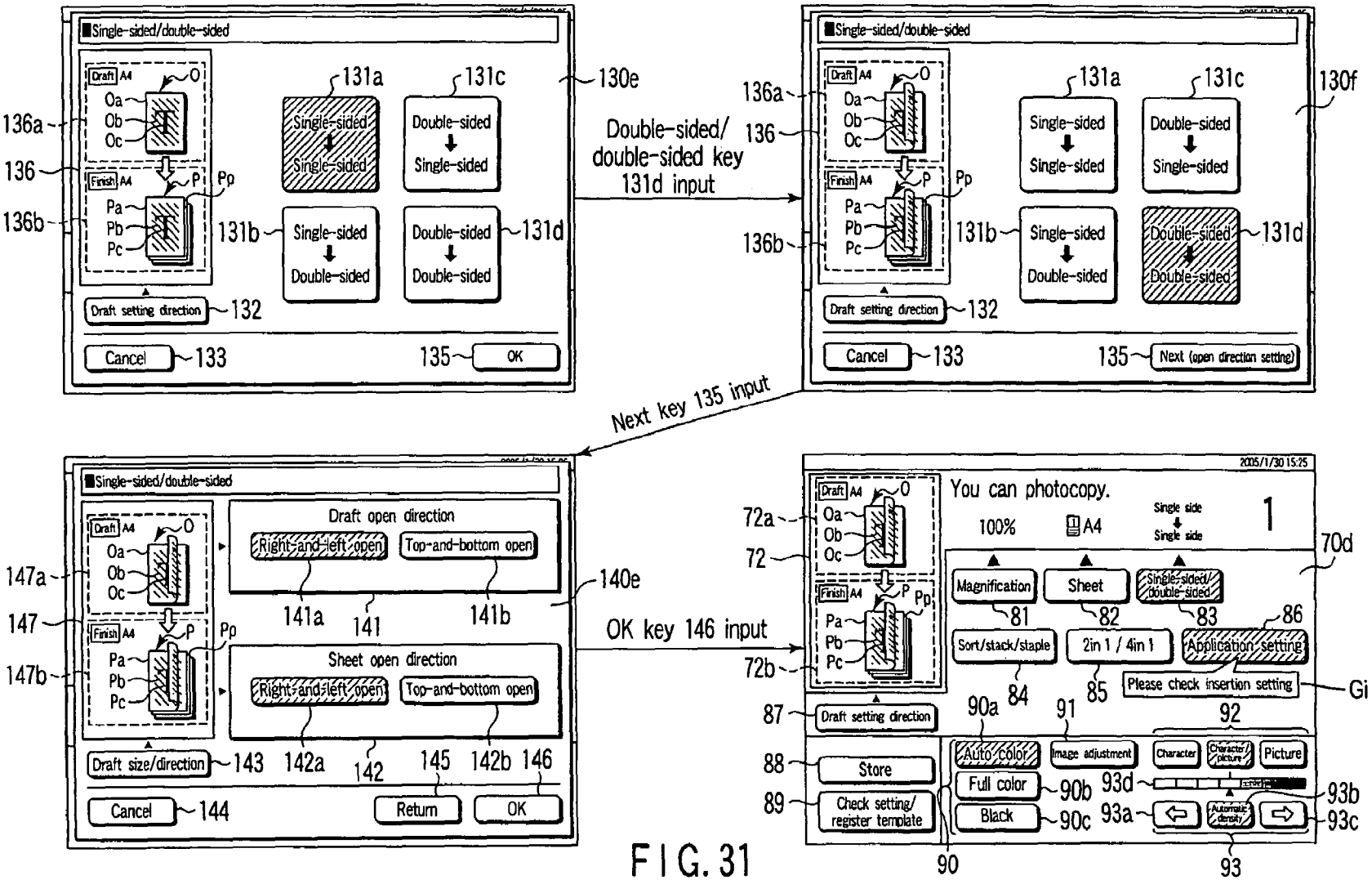
FIG. 31 is a diagram showing various display examples of a procedure in a case where a single-sided to single-sided photocopy mode is changed to a double-sided to double-sided photocopy mode in a state in which the insertion sheet is set.

FIG. 31 is a diagram showing various display examples in a case where the single-sided to single-sided photocopy mode is changed to the double-sided to double-sided photocopy mode in a state in which the insertion sheet is set with the set contents shown in FIG. 27.

A photocopy side setting screen 130e shown in FIG. 31 is a display example in a case where the photocopy side key 83 is touched in the photocopy mode basic screen 70c (see FIG. 29) in a state in which both of the draft setting and the sheet setting are single-sided (single-sided reading mode and single-sided printing mode), and the set contents (the photocopy setting is "photocopy", the insertion positions are "pages 3, 7, 13, and 16", and the sheet supply tray is "manual insertion") shown in FIG. 27 are set as the insertion sheet setting.

In the photocopy side setting screen 130e shown in FIG. 31, the single-sided to single-sided key 131a is selected (displayed in a specific color). In the photocopy side setting screen 130e shown in FIG. 31, the finished graphical image P displayed in the display area 136b indicates that the printing mode is single-sided, and the insertion sheet image Pp indicates that the insertion sheet is set. In the photocopy side setting screen 130e shown in FIG. 31, the draft graphical image O displayed in the display area 136a indicates that the draft reading mode is single-sided.

When the user touches the double-sided to double-sided key 131d in such photocopy side setting screen 130e, the CPU 51 brings the double-sided to double-sided key 131d into the selected state (displayed in the specific color) as shown in a photocopy side setting screen 130f of FIG. 31. In this case, in the finished graphical image P displayed in the display area 136b of the photocopy side setting screen 130f, the sheet state image Pa indicates that the printing mode is double-sided, and the insertion sheet image Pp indicates that the insertion sheet is set. In the draft graphical image O displayed in the display area 136a of the photocopy side setting screen 130f, the draft state image Oa indicates that the draft image reading mode is double-sided.

When the user touches the "next (open direction setting)" key 135 in such photocopy side setting screen 130e, the CPU 51 displays an open direction setting screen 140e as shown in FIG. 31. In the open direction setting screen 140e shown in FIG. 31, the right-and-left open key 141a indicating that the draft open direction is the right-and-left open direction is brought into the selected state. Moreover, the top-and-bottom open key 141b indicating that the sheet open direction is right-and-left open is brought into the selected state. In this case, in the finished graphical image P displayed in the display area 147b of the open direction setting screen 140e, the sheet state image Pa and the image direction mark Pc indicate that the printing mode is set to be "double-sided" and "right-and-left open", and the insertion sheet image Pp indicates that the insertion sheet is set. In the draft graphical image O displayed in the display area 147a of the photocopy side setting screen 130f, the draft state image Oa and the image direction mark Oc indicate that the draft image reading mode is double-sided.

When the user touches the OK key 146 in such open direction setting screen 140e, the CPU 51 displays a photocopy mode basic screen 70d in the display section 22 as shown in FIG. 31. When the OK key 146 is touched in the open direction setting screen 140e, the CPU 51 judges that the printing mode has been changed in a state in which the insertion sheet is set. The CPU 51 changes the insertion sheet setting based on this judgment.

Here, in the state in which the insertion sheet is set, the draft reading mode and the sheet printing mode are changed from the single-sided mode to the double-sided mode. Therefore, in this case, the CPU 51 changes the insertion sheet setting set on the assumption of the single-sided reading mode and the single-sided printing mode to set the set contents corresponding to the double-sided reading mode and the double-sided printing mode. When the insertion sheet setting is changed in this manner, the CPU 51 brings the single-sided/double-sided key 83 and the application setting key 86 into the selected state in the basic screen 70d, and there is displayed a guidance Gi indicating that the insertion sheet setting be confirmed.

Moreover, even when the insertion sheet setting is not changed, the CPU 51 may display the guidance in the photocopy mode basic screen 70. For example, when the only draft reading mode is changed from the single-sided mode to the double-sided mode, the insertion sheet setting may not be changed. Even in this case, since the insertion sheet is set on the basis of the draft page number, there is a high possibility that the finish cannot be obtained as intended by the user. Therefore, in such case, the CPU 51 may display, in the photocopy mode basic screen 70, the guidance Gi indicating that the insertion sheet setting be confirmed.

That is, in a case where the setting other than the insertion sheet setting is changed in a state in which the insertion sheet setting has been set, the CPU 51 judges whether or not the changed set contents influence the insertion sheet setting. In a case where this judgment judges that the changed set contents influence the insertion sheet setting, the CPU 51 displays, in the photocopy mode basic screen 70, the guidance Gi indicating that the insertion sheet setting be confirmed.

Such guidance Gi can notify the user that the insertion sheet setting be confirmed, even in a case where the setting other than the insertion sheet setting is changed after the insertion sheet is set. As a result, it is possible to reduce the mistakes in a case where the user sets the insertion sheet, and the insertion sheet can efficiently be set.

Moreover, the guidance Gi is displayed in association with the application setting key 86 by a graphic, a mark or the like. Such guidance Gi can allow the user to immediately and visually recognize that the insertion sheet setting is set by the application setting key 86.

Next, there will be described a change example of the insertion sheet setting in a case where the above-described guidance is displayed.

Here, there will be described a procedure and a display example in a case where the photocopy mode basic screen 70d is displayed in a situation shown in FIG. 31 until the user confirms the present insertion sheet setting.

Figure 32:
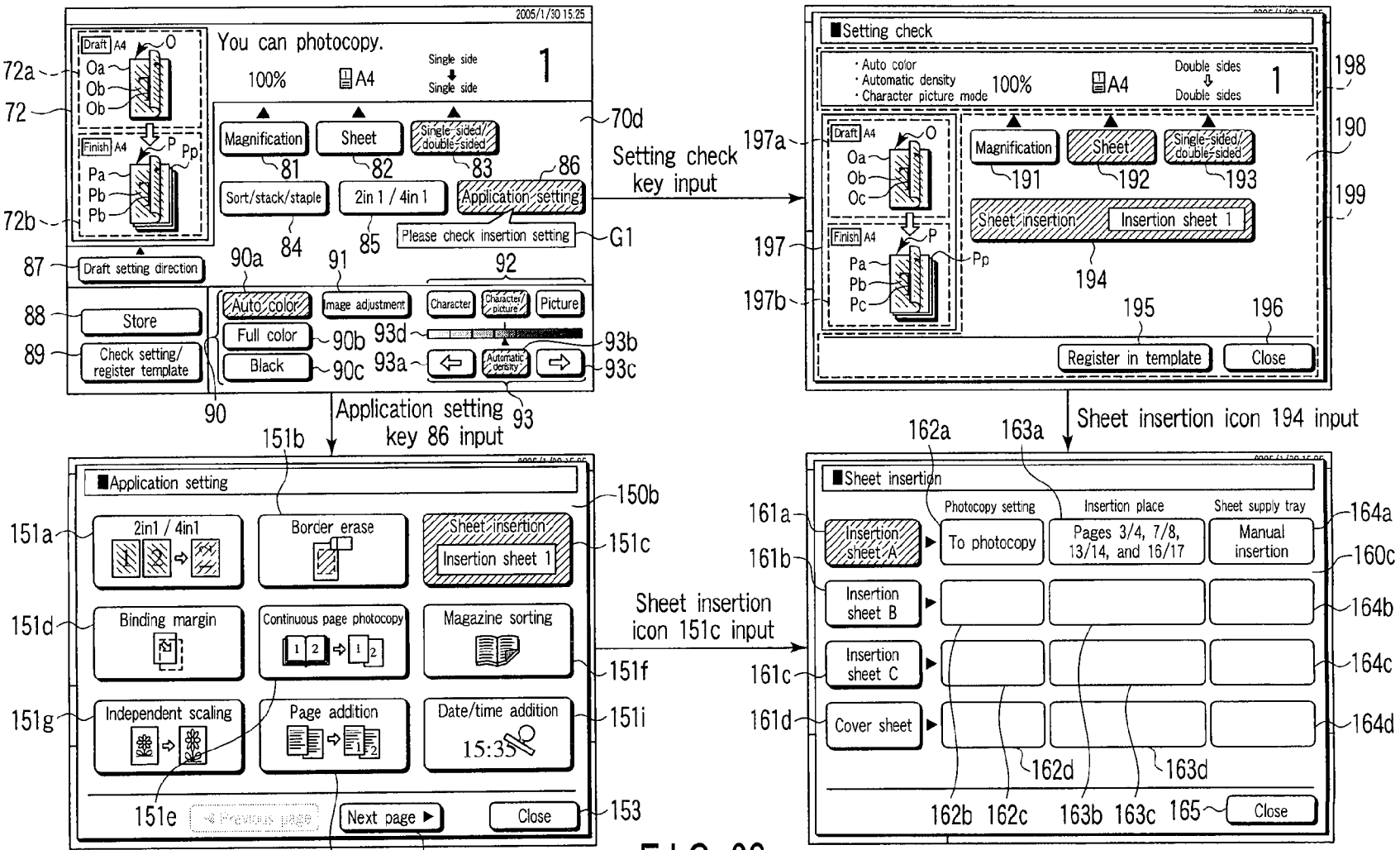
FIG. 32 is a diagram showing various display examples of a procedure to check an insertion sheet setting in a case where there is displayed a guidance indicating that the insertion sheet setting be checked.

FIG. 32 is a diagram showing the procedure and the display example in a case where the guidance indicating that the insertion sheet be set is displayed in the photocopy mode basic screen 70c until there is displayed the insertion sheet setting basic screen 160c for confirming the insertion sheet setting.

In a case where the guidance Gi indicating that the insertion sheet setting be confirmed is displayed in the photocopy mode basic screen 70c as shown in FIG. 32, the user touches the application setting key 86 associated with the guidance Gi, or the setting check key 89.

For example, when the application setting key 86 is touched in the photocopy mode basic screen 70d, the CPU 51 displays the application menu screen 150b in the display section 22 as shown in FIG. 32. As described with reference to FIG. 28, in the application menu screen 150b, the sheet insertion icon 151c is displayed in a color to indicate the set state, and further "insertion sheet 1" is displayed.

When the user touches the sheet insertion icon 151c in such application menu screen 150b, the CPU 51 displays, in the display section 22, the insertion sheet setting basic screen 160c in which the list of the present set contents of various insertion sheets is displayed as shown in FIG. 32.

Moreover, when the setting check key 89 is touched in the photocopy mode basic screen 70d, the CPU 51 displays the setting check screen 190 in the display section 22 as shown in FIG. 32. The setting check screen 190 shown in FIG. 32 has a graphical image display area 197, a setting information display area 198 and an icon display area 199.

The setting information display area 198 displays a photocopy magnification, a sheet size, a photocopy side mode and the number of sheets to be photocopied. Furthermore, a color mode, a density setting, a draft image mode and the like are displayed. The graphical image display area 197 has a layout constitution similar to that of the display area 72 of the photocopy mode basic screen 70. The display area 197 is constituted of: a first display area 197a in which the draft graphical image O is displayed; and a second display area 197b in which the finished graphical image is displayed.

Moreover, the icon display area 199 displays a magnification icon 191, a sheet icon 192, a single-sided/double-sided icon 193, a sheet insertion icon 194 and the like. Furthermore, a template register key 195 and a close key 196 are displayed. The magnification icon 191, the sheet icon 192 and the single-sided/double-sided icon 193 are associated with the photocopy magnification, the sheet size and the photocopy side mode displayed in the setting display area by triangular graphics C, respectively. When the magnification icon 191, the sheet icon 192, the single-sided/double-sided icon 193 and the sheet insertion icon 194 are touched, the CPU 51 displays a magnification setting screen, a sheet setting screen, a photocopy side setting screen, an insertion sheet setting screen and the like, respectively.

The sheet insertion icon 194 indicates that "insertion sheet 1" is set as the insertion sheet. In a case where the user touches the sheet insertion icon 194, the CPU 51 displays, in the display section 22, the insertion sheet setting basic screen 160c in which the list of the present set contents of various insertion sheets is displayed as shown in FIG. 32.

Here, there will be described a case where the printing mode is changed to the double-sided printing mode in a state in which the insertion sheet is set in the single-sided printing mode with reference to FIG. 31.

In a case where the single-sided printing mode is changed to the double-sided printing mode in a state in which the insertion sheet is set, the CPU 51 changes the insertion sheet setting to the set contents corresponding to the double-sided printing mode. For example, in a case where the single-sided printing mode is changed to the double-sided printing mode, each draft page number set as the insertion position in the single-sided printing mode is set as the page number to be printed onto the front surface of the sheet, and the next page is set as the page number to be printed onto the back surface of the sheet.

In a specific example, in a case where the single-sided printing mode is changed to the double-sided printing mode, "pages 3, 7, 13, and 16" set as the insertion positions in the single-sided printing mode are changed to "pages 3/4, 7/8, 13/14, and 16/17" as shown in the insertion sheet setting basic screen 160c of FIG. 32. This indicates such a setting that "pages 3 and 4 of the draft" are printed onto the front and back surfaces of the first insertion sheet, "pages 7 and 8 of the draft" are printed onto the front and back surfaces of the second insertion sheet, "pages 13 and 14 of the draft" are printed onto the front and back surfaces of the third insertion sheet, and "pages 16 and 17 of the draft" are printed onto the front and back surfaces of the fourth insertion sheet.

Figure 33:
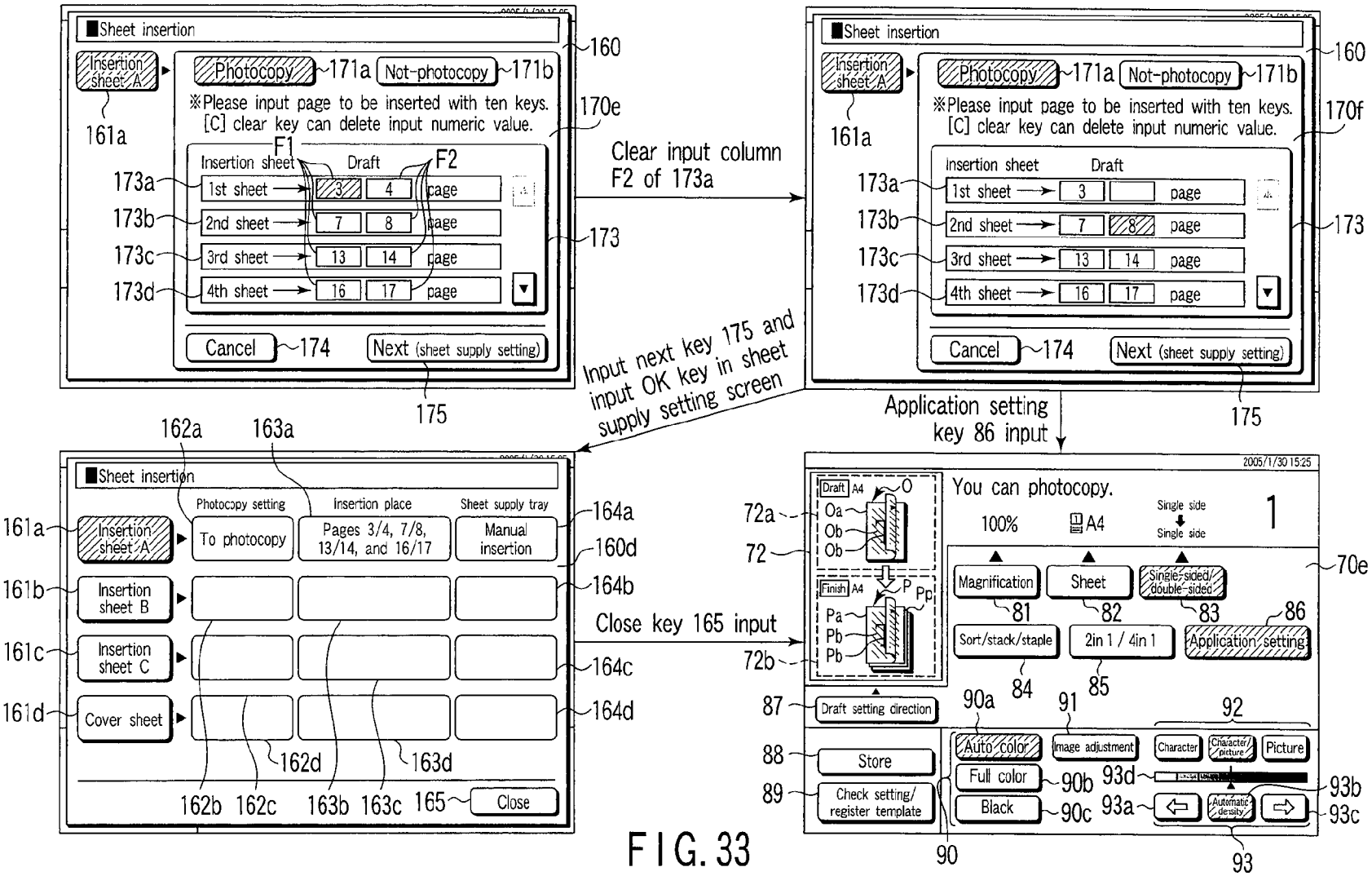
FIG. 33 is a diagram showing various display examples of a procedure to set single-sided printing on a specific insertion sheet in a double-sided printing mode.

When the insertion sheet key 161a is touched in such insertion sheet setting basic screen 160c, the CPU 51 displays an insertion sheet setting input screen 170e as shown in FIG. 33. In the insertion sheet setting input screen 170e shown in FIG. 33, the input columns F1 and F2 display the insertion positions displayed as the set contents of the insertion sheet A in the insertion sheet setting basic screen 160c shown in FIG. 32. In such insertion sheet setting input screen 170e, the user can input desired change contents.

Here, there is presumed a case where the image of the third page of the draft is printed on the only front surface of the first insertion sheet, and anything is not printed onto the back surface of the sheet. In this case, the user touches the input column F2 of the designating portion 173a for designating the insertion position of the first insertion sheet. Accordingly, when the input column F2 of the designating portion 173a is touched, the CPU 51 brings the input column F2 into the selected state (specific focus color) to obtain a state in which a value can be input. In this state, the user inputs the clear key of the ten keys 72, and the CPU 51 clears the numeric value displayed in the input column F2 brought into the selected state. In this case, the insertion sheet setting input screen displayed in the display section 22 is brought into a state of the insertion sheet setting input screen 170f shown in FIG. 33.

The state of the insertion sheet setting input screen 170f shown in FIG. 33 indicates such a setting that anything is not printed onto the back surface of the first insertion sheet. That is, in the insertion sheet setting input screen 170f shown in FIG. 33, the single-sided printing is set to the only first insertion sheet. Even if the printing mode is the double-sided printing mode in the insertion sheet setting input screen 170 in this manner, the single-sided printing can selectively be designated with respect to the specific insertion sheet. In such insertion sheet setting input screen 170, the insertion sheet can appropriately be set as intended by the user.

Furthermore, when the user touches the "next" key 175 in the insertion sheet setting input screen 170f shown in FIG. 33, the CPU 51 displays the insertion sheet supply setting screen 180. When the user touches the OK key 185 in this sheet supply setting screen 180, the CPU 51 displays the insertion sheet setting basic screen 160d in the display section 22 as shown in FIG. 33. The insertion sheet setting basic screen 160d shown in FIG. 33 displays display contents in which there are reflected set contents of the insertion sheet setting input screen 170f displayed as shown in FIG. 33.

That is, the insertion sheet setting basic screen 160d shown in FIG. 33 indicates such a setting that the third page of the draft is printed onto the front surface of the first "insertion sheet A", and anything is not printed onto the back surface of the sheet. In the insertion sheet setting basic screen 160d shown in FIG. 33, "3/□" is displayed as the insertion position of the first "insertion sheet A", wherein "□" indicates that anything is not printed. That is, "3/□" indicates that the third page of the draft is printed onto the front surface of the sheet, and anything is not printed onto the back surface of the sheet.

In such insertion sheet setting basic screen 160d, the list of set contents of various insertion sheets is displayed. In a case where the double-sided printing mode is set, and the printing of the image onto the insertion sheet is set, there is displayed the draft page number to be printed onto the front and back surfaces of each insertion sheet. It is also displayed that anything is not printed onto the single side of the specific insertion sheet. In consequence, even in a state in which the specific insertion sheet only is set to the single-sided printing, this state can be displayed in the list of the set contents.

Moreover, when the user touches the close key 165 in the insertion sheet setting basic screen 160d, the CPU 51 displays the photocopy mode basic screen 70e as shown in FIG. 33. In the photocopy mode basic screen 70e shown in FIG. 33, the guidance Gi disappears which indicates that the insertion sheet setting be confirmed, This is because the user confirms the insertion sheet setting in accordance with the guidance Gi displayed in the insertion sheet setting basic screen 160d of FIG. 31 or 32. That is, when the CPU 51 displays the insertion sheet setting basic screen 160 after displaying the guidance Gi, the guidance is controlled to be erased. It is to be noted that in accordance with an operation mode, the guidance Gi may be displayed as such even after the insertion sheet setting basic screen (check screen) 160 is displayed (after the insertion sheet setting is confirmed).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus comprising:

a printer which prints an image on an image forming medium;

a display unit which displays a setting screen of print processing to print, on the image forming medium by the printer, an image of a draft including a plurality of pages;

an operation unit to input setting information on the print processing in a state in which the setting screen is displayed in the display unit;

a first display control unit to display, in the display unit, an input screen which inputs setting information on an insertion sheet designated by a user in the operation unit;

a setting unit which sets the insertion sheet based on contents input in the input screen of an insertion sheet setting displayed in the display unit by the first display control unit; and a second display control unit to display, in the display unit, a check screen which displays, in a list, set contents of the insertion sheet set by the setting unit, in a case where the input of the setting information on the insertion sheet by the user ends in the input screen.

2. The image forming apparatus according to claim 1, wherein the second display control unit further displays in the display unit, the check screen, in a case where a key to set the insertion sheet by the operation unit is indicated.

3. The image forming apparatus according to claim 1, wherein the first display control unit displays an input column to designate an insertion position of the insertion sheet on the basis of a draft image page number in the input screen.

4. The image forming apparatus according to claim 1, wherein the first display control unit displays, in the input screen, a guidance indicating that a page number of the draft image to be printed onto the insertion sheet be designated, in a case where the draft image is printed onto the insertion sheet, and the first display control unit displays, in the input screen, a guidance indicating that a position to insert the insertion sheet be designated by the draft image page number, in a case where the draft image is not printed onto the insertion sheet.

5. The image forming apparatus according to claim 1, wherein the first display control unit displays, in the input screen, one input column to designate an insertion position of the insertion sheet on the basis of a draft image page number, in a case where a printing mode is a single-sided printing mode, and the first display control unit displays, in the input screen, two input columns to designate the insertion position of the insertion sheet on the basis of the draft image page number, in a case where the printing mode is a double-sided printing mode.

6. The image forming apparatus according to claim 1, wherein the first display control unit displays, in the input screen, two input columns to designate an insertion position of the insertion sheet on the basis of a draft image page number, in a case where a printing mode is a double-sided printing mode, and the first display control unit further displays, in one of the input columns, a value corresponding to the page number input in the other input column, in a case where a value indicating the draft image page number is input into the other input column.

7. The image forming apparatus according to claim 1, wherein the first display control unit displays, in the input screen, two input columns to designate an insertion position of the insertion sheet on the basis of a draft image page number, in a case where a printing mode is a double-sided printing mode, and the setting unit sets single-sided printing onto an only page in which a print setting has been designated with respect to the insertion sheet, in a case where a value is input into only one of the two input columns in the input screen.

8. The image forming apparatus according to claim 1, wherein the setting unit further changes the setting of the insertion sheet in accordance with set contents, in a case where a setting other than the insertion sheet setting is changed in a state in which the insertion sheet is set.

9. The image forming apparatus according to claim 1, further comprising:

a third display control unit which displays a guidance indicating that the insertion sheet setting be confirmed in accordance with set contents, in a case where a setting other than the insertion sheet setting is changed in a state in which the insertion sheet is set.

10. An image forming apparatus having: a printer which prints an image on an image forming medium; a display unit which displays a setting screen of print processing to print, on the image forming medium by the printer, an image of a draft including a plurality of pages; and an operation unit to input setting information on the print processing in a state in which the setting screen is displayed in the display unit, the apparatus comprising:

first display control means for displaying, in the display unit, an input screen which inputs setting information on an insertion sheet designated by a user in the operation unit;

setting means for setting the insertion sheet based on contents input in the input screen of an insertion sheet setting displayed in the display unit; and second display control means for displaying, in the display unit, a check screen which displays, in a list, set contents of the insertion sheet set by setting means, in a case where the input of the setting information on the insertion sheet by the user ends in the input screen.

11. The image forming apparatus according to claim 10, wherein the second display control means further displays, in the display unit, the check screen, in a case where a key to set the insertion sheet by the operation unit is indicated.

12. The image forming apparatus according to claim 10, wherein the first display control means displays an input column to designate an insertion position of the insertion sheet on the basis of a draft image page number in the input screen.

13. The image forming apparatus according to claim 10, wherein the first display control means displays, in the input screen, a guidance indicating that a page number of the draft image to be printed onto the insertion sheet be designated, in a case where the draft image is printed onto the insertion sheet, and the first display control means displays, in the input screen, a guidance indicating that a position to insert the insertion sheet be designated by the draft image page number, in a case where the draft image is not printed onto the insertion sheet.

14. The image forming apparatus according to claim 10, wherein the first display control means displays, in the input screen, one input column to designate an insertion position of the insertion sheet on the basis of a draft image page number, in a case where a printing mode is a single-sided printing mode, and the first display control means displays, in the input screen, two input columns to designate the insertion position of the insertion sheet on the basis of the draft image page number, in a case where the printing mode is a double-sided printing mode.

15. The image forming apparatus according to claim 10, wherein the first display control means displays, in the input screen, two input columns to designate an insertion position of the insertion sheet on the basis of a draft image page number, in a case where a printing mode is a double-sided printing mode, and the first display control means further displays, in one of the input columns, a value corresponding to the page number input in the other input column, in a case where a value indicating the draft image page number is input into the other input column.

16. The image forming apparatus according to claim 10, wherein the first display control means displays, in the input screen, two input columns to designate an insertion position of the insertion sheet on the basis of a draft image page number, in a case where a printing mode is a double-sided printing mode, and the setting means sets single-sided printing onto an only page in which a print setting has been designated with respect to the insertion sheet, in a case where a value is input into only one of the two input columns in the input screen.

17. The image forming apparatus according to claim 10, wherein the setting means further changes the setting of the insertion sheet in accordance with set contents, in a case where a setting other than the insertion sheet setting is changed in a state in which the insertion sheet is set.

18. The image forming apparatus according to claim 10, further comprising:

third display control means for displaying a guidance indicating that the insertion sheet setting be confirmed in accordance with set contents, in a case where a setting other than the insertion sheet setting is changed in a state in which the insertion sheet is set.

19. A method of setting an image forming apparatus having: a printer which prints an image on an image forming medium; a display unit which displays a setting screen of print processing to print, on the image forming medium by the printer, an image of a draft including a plurality of pages; and an operation unit to input setting information on the print processing in a state in which the setting screen is displayed in the display unit, the method comprising:

displaying, in the display unit, an input screen which inputs setting information on an insertion sheet designated by a user in the operation unit;

setting the insertion sheet based on contents input in the input screen of an insertion sheet setting displayed in the display unit; and displaying, in the display unit, a check screen which displays, in a list, set contents of the set insertion sheet, in a case where the input of the setting information on the insertion sheet by the user ends in the input screen.

20. The method of setting the image forming apparatus according to claim 19, wherein the displaying of the check screen further comprises: displaying, in the display unit, the check screen, in a case where a key to set the insertion sheet by the operation unit is indicated.

21. The method of setting the image forming apparatus according to claim 19, wherein the displaying of the input screen comprises: displaying an input column to designate an insertion position of the insertion sheet on the basis of a draft image page number in the input screen.

22. The method of setting the image forming apparatus according to claim 19, wherein the displaying of the input screen comprises: displaying, in the input screen, a guidance indicating that a page number of the draft image to be printed onto the insertion sheet be designated, in a case where the draft image is printed onto the insertion sheet; and displaying, in the input screen, a guidance indicating that a position to insert the insertion sheet be designated by the draft image page number, in a case where the draft image is not printed onto the insertion sheet.

23. The method of setting the image forming apparatus according to claim 19, wherein the displaying of the input screen comprises: displaying, in the input screen, one input column to designate an insertion position of the insertion sheet on the basis of a draft image page number, in a case where a printing mode is a single-sided printing mode; and displaying, in the input screen, two input columns to designate the insertion position of the insertion sheet on the basis of the draft image page number, in a case where the printing mode is a double-sided printing mode.

24. The method of setting the image forming apparatus according to claim 19, wherein the displaying of the input screen comprises: displaying, in the input screen, two input columns to designate an insertion position of the insertion sheet on the basis of a draft image page number, in a case where a printing mode is a double-sided printing mode; and further displaying, in one of the input columns, a value corresponding to the page number input in the other input column, in a case where a value indicating the draft image page number is input into the other input column.

25. The method of setting the image forming apparatus according to claim 19, wherein the displaying of the input screen comprises: displaying, in the input screen, two input columns to designate an insertion position of the insertion sheet on the basis of a draft image page number, in a case where a printing mode is a double-sided printing mode, and the setting comprises: setting single-sided printing onto an only page in which a print setting has been designated with respect to the insertion sheet, in a case where a value is input into only one of the two input columns in the input screen.

26. The method of setting the image forming apparatus according to claim 19, wherein the setting further comprises: changing the setting of the insertion sheet in accordance with set contents, in a case where a setting other than the insertion sheet setting is changed in a state in which the insertion sheet is set.

27. The method of setting the image forming apparatus according to claim 19, further comprising:

displaying a guidance indicating that the insertion sheet setting be confirmed in accordance with set contents, in a case where a setting other than the insertion sheet setting is changed in a state in which the insertion sheet is set.

*28. A setting apparatus for an image forming apparatus, comprising:*

*a display to display a setting screen of a print process to print an image of a draft including a plurality of pages;*

*an operation unit to input setting information on the print process in a state in which the setting screen is displayed in the display;*

*a first controller to display, on the display, an input screen which inputs setting information for an insertion sheet selected by the operation unit;*

*a memory to store the setting information input in the input screen; and*

*a second controller to display, on the display, a check screen which displays the setting information for a multiple number of insertion sheets.*

*29. The setting apparatus according to claim 28, wherein the second controller further displays the check screen on the display in a case where a key to set the insertion sheet by the operation unit is indicated.*

*30. The setting apparatus according to claim 28, wherein the first controller displays an input column to designate an insertion position of the insertion sheet on the basis of a draft image page number in the input screen.*

*31. The setting apparatus according to claim 28, wherein the first controller displays, in the input screen, a guidance indicating that a page number of the draft image to be printed onto the insertion sheet be designated, in a case where the draft image is printed onto the insertion sheet, and*

*the first controller displays, in the input screen, a guidance indicating that a position to insert the insertion sheet be designated by the draft image page number, in a case where the draft image is not printed onto the insertion sheet.*

*32. The setting apparatus according to claim 28, wherein the first controller displays, in the input screen, one input column to designate an insertion position of the insertion*

*sheet on the basis of a draft image page number, in a case where a printing mode is a single-sided printing mode, and*

*the first controller displays, in the input screen, two input columns to designate the insertion position of the insertion sheet on the basis of the draft image page number, in a case where the printing mode is a double-sided printing mode.*

*33. The setting apparatus according to claim 28, wherein the first controller displays, in the input screen, two input columns to designate an insertion position of the insertion sheet on the basis of a draft image page number, in a case where a printing mode is a double-sided printing mode, and*

*the first controller further displays, in one of the input columns, a value corresponding to the page number input in the other input column, in a case where a value indicating the draft image page number is input into the other input column.*

*34. The setting apparatus according to claim 28, wherein the first controller displays, in the input screen, two input columns to designate an insertion position of the insertion sheet on the basis of a draft image page number, in a case where a printing mode is a double-sided printing mode, and*

*a setting unit sets single-sided printing onto an only page in which a print setting has been designated with respect to the insertion sheet, in a case where a value is input into only one of the two input columns in the input screen.*

*35. The setting apparatus according to claim 28, wherein a setting unit further changes the setting of the insertion sheet in accordance with set contents, in a case where a setting other than the insertion sheet setting is changed in a state in which the insertion sheet is set.*

*36. The setting apparatus according to claim 28, further comprising:*

*a third controller which displays a guidance indicating that the insertion sheet setting be confirmed in accordance with set contents, in a case where a setting other than the insertion sheet setting is changed in a state in which the insertion sheet is set.*

*37. An image forming apparatus comprising:*

*a printer to print an image on an image forming medium;*

*a display to display a setting screen of a print process to print, on the image forming medium by the printer, an image of a draft including a plurality of pages;*

*an operation unit to input setting information on the print process in a state in which the setting screen is displayed on the display;*

*a first controller to display, on the display, an input screen which inputs setting information for an insertion sheet selected by the operation unit;*

*a memory to store the setting input in the input screen; and*

*a second controller to display, on the display, a check screen which displays, in a list, the setting information for a multiple number of insertion sheets stored in the memory.*

*38. The image forming apparatus according to claim 37, wherein the second controller further displays in the display, the check screen, in a case where a key to set the insertion sheet by the operation unit is indicated.*

*39. The image forming apparatus according to claim 37, wherein the first controller displays an input column to designate an insertion position of the insertion sheet on the basis of a draft image page number in the input screen.*

*40. The image forming apparatus according to claim 37, wherein the first controller displays, in the input screen, a guidance indicating that a page number of the draft image to be printed onto the insertion sheet be designated, in a case where the draft image is printed onto the insertion sheet, and*

*the first controller displays, in the input screen, a guidance indicating that a position to insert the insertion sheet be designated by the draft image page number, in a case where the draft image is not printed onto the insertion sheet.*

*41. The image forming apparatus according to claim 37, wherein the first controller displays, in the input screen, one input column to designate an insertion position of the insertion sheet on the basis of a draft image page number, in a case where a printing mode is a single-sided printing mode, and*

*the first controller displays, in the input screen, two input columns to designate the insertion position of the insertion sheet on the basis of the draft image page number, in a case where the printing mode is a double-sided printing mode.*

*42. The image forming apparatus according to claim 37, wherein the first controller displays, in the input screen, two input columns to designate an insertion position of the insertion sheet on the basis of a draft image page number, in a case where a printing mode is a double-sided printing mode, and*

*the first controller further displays, in one of the input columns, a value corresponding to the page number input in the other input column, in a case where a value indicating the draft image page number is input into the other input column.*

*43. The image forming apparatus according to claim 37, wherein the first controller displays, in the input screen, two input columns to designate an insertion position of the insertion sheet on the basis of a draft image page number, in a case where a printing mode is a double-sided printing mode, and*

*a setting unit sets single-sided printing onto an only page in which a print setting has been designated with respect to the insertion sheet, in a case where a value is input into only one of the two input columns in the input screen.*

*44. The image forming apparatus according to claim 37, wherein a setting unit further changes the setting of the insertion sheet in accordance with set contents, in a case where a setting other than the insertion sheet setting is changed in a state in which the insertion sheet is set.*

*45. The image forming apparatus according to claim 37, further comprising:*

*a third controller which displays a guidance indicating that the insertion sheet setting be confirmed in accordance with set contents, in a case where a setting other than the insertion sheet setting is changed in a state in which the insertion sheet is set.*

*46. A method of setting an image forming apparatus having: a printer to print an image on an image forming medium: a display to display a setting screen of a print process to print, on the image forming medium by the printer, an image of a draft including a plurality of pages; and an operation unit to input setting information on the print process in a state in which the setting screen is displayed in the display, the method comprising:*

*displaying an input screen which inputs setting information for an insertion sheet selected by the operation unit;*

*storing the setting information input in the input screen in a memory; and*

*displaying a check screen which displays, in a list, the setting information for a multiple number of insertion sheets stored in the memory.*

*47. The method of setting the image forming apparatus according to claim 46, wherein the displaying of the check screen further comprises: displaying the check screen, in a case where a key to set the insertion sheet by the operation unit is indicated.*

*48. The method of setting the image forming apparatus according to claim 46, wherein the displaying of the input screen comprises: displaying an input column to designate an insertion position of the insertion sheet on the basis of a draft image page number in the input screen.*

*49. The method of setting the image forming apparatus according to claim 46, wherein the displaying of the input screen comprises: displaying, in the input screen, a guidance indicating that a page number of the draft image to be printed onto the insertion sheet be designated, in a case where the draft image is printed onto the insertion sheet; and*

*displaying, in the input screen, a guidance indicating that a position to insert the insertion sheet be designated by the draft image page number, in a case where the draft image is not printed onto the insertion sheet.*

*50. The method of setting the image forming apparatus according to claim 46, wherein the displaying of the input screen comprises: displaying, in the input screen, one input column to designate an insertion position of the insertion sheet on the basis of a draft image page number, in a case where a printing mode is a single-sided printing mode; and*

*displaying, in the input screen, two input columns to designate the insertion position of the insertion sheet on the basis of the draft image page number, in a case where the printing mode is a double-sided printing mode.*

*51. The method of setting the image forming apparatus according to claim 46, wherein the displaying of the input screen comprises: displaying, in the input screen, two input columns to designate an insertion position of the insertion sheet on the basis of a draft image page number, in a case where a printing mode is a double-sided printing mode; and*

*further displaying, in one of the input columns, a value corresponding to the page number input in the other input column, in a case where a value indicating the draft image page number is input into the other input column.*

*52. The method of setting the image forming apparatus according to claim 46, wherein the displaying of the input screen comprises: displaying, in the input screen, two input columns to designate an insertion position of the insertion sheet on the basis of a draft image page number, in a case where a printing mode is a double-sided printing mode, and*

*setting single-sided printing for the insertion sheet when a print setting has been designated with respect to the insertion sheet and a value is input into only one of the two input columns in the input screen.*

*53. The method of setting the image forming apparatus according to claim 46, further comprising:*

*changing the setting of the insertion sheet in accordance with set contents, in a case where a setting other than the insertion sheet setting is changed in a state in which the insertion sheet is set.*

*54. The method of setting the image forming apparatus according to claim 46, further comprising:*

*displaying a guidance indicating that the insertion sheet setting be confirmed in accordance with set contents, in a case where a setting other than the insertion sheet setting is changed in a state in which the insertion sheet is set.*

* * * * *